United States Patent
Purandare et al.

(10) Patent No.: US 10,867,128 B2
(45) Date of Patent: Dec. 15, 2020

(54) INTELLIGENTLY UPDATING A COLLABORATION SITE OR TEMPLATE

(71) Applicant: Microsoft Technology Licensing, LLC, Redmond, WA (US)

(72) Inventors: Sooraj Ashutosh Purandare, Woodinville, WA (US); Janet Longhurst, Redmond, WA (US); Tejas Pravin Mehta, Sammamish, WA (US); Wenvi Hidayat, Seattle, WA (US); John L. DeMaris, Seattle, WA (US); Dieter P. Jansen, Renton, WA (US); Mary Ellen Arndt, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 15/702,657

(22) Filed: Sep. 12, 2017

(65) Prior Publication Data
US 2019/0079909 A1 Mar. 14, 2019

(51) Int. Cl.
*G06F 3/048* (2013.01)
*G06F 40/197* (2020.01)
(Continued)

(52) U.S. Cl.
CPC .......... *G06F 40/197* (2020.01); *G06F 3/0482* (2013.01); *G06F 40/186* (2020.01);
(Continued)

(58) Field of Classification Search
CPC ....... G06F 3/0481–0489; G06F 40/197; G06F 40/186; G06F 3/0482; G06F 16/9535;
(Continued)

(56) References Cited

U.S. PATENT DOCUMENTS 6,684,369 B1 * 1/2004 Bernardo .............. G06F 17/211
715/205
7,203,909 B1 * 4/2007 Horvitz .............. G06Q 30/0256
715/765

(Continued)

OTHER PUBLICATIONS

Alirezaei, et al., "Professional SharePoint 2013 Development", Retrieved From: https://skdeveloper.files.wordpress.com/2015/11/professional-sharepoint-2013-development.pdf, Mar. 11, 2013, 145 Pages.

(Continued)

*Primary Examiner* — Steven B Theriault
(74) *Attorney, Agent, or Firm* — Wade IP Law LLC

(57) ABSTRACT

Techniques are described herein that are capable of intelligently updating a collaboration site or a template that may be used to create a new collaboration site. The collaboration site or the template may be updated to include new features based on (e.g., based at least in part on) a likelihood that the new features will be valuable to users. The likelihood that new features will be valuable to the users may be determined (e.g., derived) using heuristics, machine learning, intelligent user experiences, and/or an understanding of user behavior gathered by a service that provides the collaboration site or the template. The likelihood may be compared to a likelihood threshold to determine whether the collaboration site or the template is to be updated. In accordance with this example, the update may be made if the likelihood is greater than or equal to the likelihood threshold.

20 Claims, 19 Drawing Sheets

US 10,867,128 B2
Page 2

(51) Int. Cl.
*G06F 3/0482* (2013.01)
*G06N 20/00* (2019.01)
*G06Q 10/10* (2012.01)
*G06F 40/186* (2020.01)
*H04L 29/08* (2006.01)

(52) U.S. Cl.
CPC .......... *G06N 20/00* (2019.01); *G06Q 10/101* (2013.01); *H04L 67/10* (2013.01)

(58) Field of Classification Search
CPC ... G06F 16/9536; G06F 17/18; G06Q 10/101; G06Q 10/10
See application file for complete search history.

(56) References Cited

U.S. PATENT DOCUMENTS

| | | | |
|---|---|---|---|
| 7,818,194 B2* | 10/2010 | Yoshida | G06Q 10/10 705/7.32 |
| 7,933,871 B2* | 4/2011 | LaToza | G06F 17/248 707/640 |
| 8,046,696 B2* | 10/2011 | Bales | G06F 8/38 709/223 |
| 8,214,747 B1 | 7/2012 | Yankovich et al. | |
| 8,412,736 B1 | 4/2013 | Arnold et al. | |
| 8,464,161 B2* | 6/2013 | Giles | G06F 21/604 345/419 |
| 8,543,926 B2* | 9/2013 | Giles | G06Q 10/10 345/419 |
| 8,560,956 B2* | 10/2013 | Curtis | G06F 17/21 715/205 |
| 8,706,696 B2* | 4/2014 | Yoshida | G06Q 30/02 707/661 |
| 8,719,105 B2* | 5/2014 | Minnis | G06Q 30/02 705/26.1 |
| 8,732,101 B1 | 5/2014 | Wilson et al. | |
| 8,943,131 B2* | 1/2015 | Fontenot | G06Q 10/00 709/204 |
| 8,965,998 B1* | 2/2015 | Dicker | G06Q 30/0633 709/217 |
| 9,160,742 B1 | 10/2015 | Ackerman et al. | |
| 9,286,910 B1 | 3/2016 | Li et al. | |
| 9,313,098 B1 | 4/2016 | Lazarescu et al. | |
| 9,336,268 B1 | 5/2016 | Moudy et al. | |
| 9,418,337 B1 | 8/2016 | Elser et al. | |
| 9,461,972 B1 | 10/2016 | Mehta | |
| 9,491,187 B2 | 11/2016 | Sridhara et al. | |
| 9,697,016 B2 | 7/2017 | Jacob | |
| 9,710,142 B1 | 7/2017 | Vendrow et al. | |
| 9,779,084 B2 | 10/2017 | Danson et al. | |
| 9,916,538 B2 | 3/2018 | Zadeh et al. | |
| 9,985,916 B2 | 5/2018 | Cecchi et al. | |
| 10,051,044 B2* | 8/2018 | Culverhouse | H04L 67/10 |
| 10,063,582 B1 | 8/2018 | Feng et al. | |
| 10,091,322 B2 | 10/2018 | O'donoghue et al. | |
| 10,116,680 B1 | 10/2018 | Han et al. | |
| 10,154,460 B1 | 12/2018 | Miller et al. | |
| 10,204,307 B1 | 2/2019 | Dasgupta et al. | |
| 10,360,226 B2 | 7/2019 | Michelson et al. | |
| 10,365,962 B2 | 7/2019 | Sherlock et al. | |
| 2002/0129106 A1* | 9/2002 | Gutfreund | G06Q 10/10 709/205 |
| 2002/0149618 A1* | 10/2002 | Estrada | G06Q 10/10 715/760 |
| 2003/0163513 A1* | 8/2003 | Schaeck | G06Q 30/02 709/201 |
| 2004/0107249 A1* | 6/2004 | Moser | G06Q 10/107 709/204 |
| 2004/0122693 A1* | 6/2004 | Hatscher | G06Q 10/06313 705/319 |
| 2004/0243328 A1 | 12/2004 | Rapp et al. | |
| 2004/0267871 A1* | 12/2004 | Pratley | G06Q 10/10 709/200 |
| 2005/0204297 A1* | 9/2005 | Banatwala | G06Q 10/10 715/753 |
| 2005/0268230 A1* | 12/2005 | Bales | G06F 40/106 715/255 |
| 2006/0005163 A1* | 1/2006 | Huesken | G06F 9/465 717/107 |
| 2006/0122834 A1 | 6/2006 | Bennett | |
| 2006/0123334 A1* | 6/2006 | Balasubramanyan | G06F 16/958 715/274 |
| 2006/0147890 A1 | 7/2006 | Bradford et al. | |
| 2006/0166174 A1 | 7/2006 | Rowe et al. | |
| 2006/0218000 A1* | 9/2006 | Smith | G06Q 10/00 709/204 |
| 2007/0050360 A1 | 3/2007 | Hull et al. | |
| 2007/0124373 A1* | 5/2007 | Chatterjee | G06Q 10/10 709/204 |
| 2007/0150856 A1 | 6/2007 | Warner et al. | |
| 2007/0156479 A1 | 7/2007 | Long | |
| 2007/0179892 A1* | 8/2007 | Chan | G06Q 30/00 705/51 |
| 2008/0010615 A1* | 1/2008 | Curtis | G06F 16/954 715/846 |
| 2008/0133501 A1 | 6/2008 | Andersen et al. | |
| 2008/0228747 A1 | 9/2008 | Thrall et al. | |
| 2009/0156907 A1 | 6/2009 | Jung et al. | |
| 2009/0156955 A1 | 6/2009 | Jung et al. | |
| 2009/0157481 A1 | 6/2009 | Jung et al. | |
| 2009/0157482 A1 | 6/2009 | Jung et al. | |
| 2009/0157625 A1 | 6/2009 | Jung et al. | |
| 2009/0157660 A1 | 6/2009 | Jung et al. | |
| 2009/0157751 A1 | 6/2009 | Jung et al. | |
| 2009/0164401 A1 | 6/2009 | Jung et al. | |
| 2009/0182727 A1* | 7/2009 | Majko | G06F 16/248 |
| 2009/0183259 A1 | 7/2009 | Rinek et al. | |
| 2009/0217196 A1 | 8/2009 | Neff et al. | |
| 2009/0251457 A1 | 10/2009 | Walker et al. | |
| 2009/0299925 A1 | 12/2009 | Ramaswamy et al. | |
| 2009/0327101 A1 | 12/2009 | Sayed | |
| 2010/0030578 A1 | 2/2010 | Siddique et al. | |
| 2010/0251143 A1* | 9/2010 | Thomas | G06F 16/958 715/760 |
| 2011/0010332 A1 | 1/2011 | Vasudevan et al. | |
| 2011/0035323 A1* | 2/2011 | Hamilton | G06Q 10/06 705/301 |
| 2011/0047484 A1* | 2/2011 | Mount | G06Q 10/10 715/753 |
| 2011/0093309 A1 | 4/2011 | Dayasindhu et al. | |
| 2011/0153344 A1* | 6/2011 | Vesto | G06Q 10/10 705/2 |
| 2011/0196853 A1* | 8/2011 | Bigham | G06F 8/35 707/706 |
| 2011/0302503 A1* | 12/2011 | Cahill | G06Q 10/10 715/751 |
| 2012/0030289 A1* | 2/2012 | Buford | G06Q 10/10 709/205 |
| 2012/0123806 A1 | 5/2012 | Schumann et al. | |
| 2012/0144117 A1* | 6/2012 | Weare | G06F 12/0888 711/119 |
| 2012/0185942 A1 | 7/2012 | Dixon et al. | |
| 2012/0209795 A1 | 8/2012 | Glickman | |
| 2012/0221485 A1 | 8/2012 | Leidner et al. | |
| 2012/0221486 A1 | 8/2012 | Leidner et al. | |
| 2012/0259647 A1* | 10/2012 | Syed | G06Q 10/06 705/2 |
| 2012/0260195 A1* | 10/2012 | Hon | G06F 16/954 715/753 |
| 2012/0303559 A1 | 11/2012 | Dolan | |
| 2013/0031470 A1 | 1/2013 | Daly et al. | |
| 2013/0096892 A1 | 4/2013 | Essa et al. | |
| 2013/0097246 A1 | 4/2013 | Zifroni et al. | |
| 2013/0117368 A1 | 5/2013 | Dozier et al. | |
| 2013/0179438 A1* | 7/2013 | Coldicott | G06Q 10/10 707/723 |
| 2013/0246317 A1 | 9/2013 | Martin | |
| 2013/0298047 A1* | 11/2013 | Buehler | G06F 16/958 715/760 |

(56) References Cited

U.S. PATENT DOCUMENTS

| | | | |
|---|---|---|---|
| 2014/0033018 A1* | 1/2014 | Pallai | H04L 63/08 715/234 |
| 2014/0075336 A1 | 3/2014 | Curtis et al. | |
| 2014/0079297 A1 | 3/2014 | Tadayon et al. | |
| 2014/0101571 A1* | 4/2014 | Lewis | H04L 65/403 715/753 |
| 2014/0129493 A1 | 5/2014 | Leopold | |
| 2014/0143655 A1* | 5/2014 | Alon | G06Q 30/0202 715/234 |
| 2014/0156743 A1 | 6/2014 | Veda et al. | |
| 2014/0188585 A1 | 7/2014 | Thompson et al. | |
| 2014/0201126 A1 | 7/2014 | Zadeh et al. | |
| 2014/0205990 A1 | 7/2014 | Wellman et al. | |
| 2014/0222719 A1 | 8/2014 | Poulin et al. | |
| 2014/0227675 A1 | 8/2014 | Budhu | |
| 2014/0244664 A1 | 8/2014 | Verma | |
| 2014/0272911 A1 | 9/2014 | York et al. | |
| 2014/0282406 A1 | 9/2014 | Narasimhan et al. | |
| 2014/0308645 A1 | 10/2014 | Chaniotakis et al. | |
| 2014/0310729 A1 | 10/2014 | Chaniotakis et al. | |
| 2014/0325586 A1 | 10/2014 | Halliday et al. | |
| 2014/0330759 A1 | 11/2014 | Hegli et al. | |
| 2014/0337711 A1* | 11/2014 | Poole | G06F 16/958 715/234 |
| 2014/0358825 A1 | 12/2014 | Phillipps et al. | |
| 2014/0365349 A1* | 12/2014 | Kennon | G06Q 30/0269 705/34 |
| 2015/0039541 A1 | 2/2015 | Kapur et al. | |
| 2015/0046527 A1 | 2/2015 | Bank et al. | |
| 2015/0066813 A1 | 3/2015 | Andreatta et al. | |
| 2015/0100356 A1 | 4/2015 | Bessler et al. | |
| 2015/0100501 A1* | 4/2015 | Young | G06Q 10/101 705/300 |
| 2015/0113448 A1* | 4/2015 | Underwood | G06F 40/14 715/760 |
| 2015/0147728 A1 | 5/2015 | Hochenbaum et al. | |
| 2015/0161566 A1 | 6/2015 | Cai | |
| 2015/0163121 A1 | 6/2015 | Mahaffey et al. | |
| 2015/0178626 A1 | 6/2015 | Pielot et al. | |
| 2015/0193699 A1 | 7/2015 | Kil et al. | |
| 2015/0213037 A1* | 7/2015 | Baldwin | G06Q 10/103 715/234 |
| 2015/0310757 A1 | 10/2015 | Moon et al. | |
| 2015/0324459 A1 | 11/2015 | Chhichhia et al. | |
| 2015/0331578 A1* | 11/2015 | Keslin | G06F 3/04817 715/751 |
| 2015/0363190 A1 | 12/2015 | Bhatia et al. | |
| 2015/0379887 A1 | 12/2015 | Becker et al. | |
| 2016/0055132 A1* | 2/2016 | Garrison | G06F 40/186 706/12 |
| 2016/0104163 A1 | 4/2016 | Aquino et al. | |
| 2016/0110316 A1* | 4/2016 | Carter | G06F 40/166 715/273 |
| 2016/0132291 A1 | 5/2016 | Bai et al. | |
| 2016/0149843 A1* | 5/2016 | Spicer | G06Q 10/101 709/206 |
| 2016/0155069 A1 | 6/2016 | Hoover et al. | |
| 2016/0170996 A1 | 6/2016 | Frank et al. | |
| 2016/0179769 A1* | 6/2016 | Gershom | G06F 16/23 715/235 |
| 2016/0189074 A1* | 6/2016 | Gajdzinski | G06Q 10/06316 705/7.26 |
| 2016/0189078 A1* | 6/2016 | Gajdzinski | G06Q 10/06375 705/7.37 |
| 2016/0224803 A1 | 8/2016 | Frank et al. | |
| 2016/0224999 A1 | 8/2016 | Mukherjee et al. | |
| 2016/0239918 A1 | 8/2016 | Lambur et al. | |
| 2016/0262128 A1 | 9/2016 | Hailpern et al. | |
| 2016/0274893 A1 | 9/2016 | Thomas et al. | |
| 2016/0300252 A1 | 10/2016 | Frank et al. | |
| 2016/0307277 A1* | 10/2016 | Wengrower | G06F 16/958 |
| 2016/0314255 A1 | 10/2016 | Cook et al. | |
| 2016/0328698 A1 | 11/2016 | Kumaraguruparan et al. | |
| 2016/0364124 A1 | 12/2016 | Heater | |
| 2016/0366167 A1 | 12/2016 | Yumer | |
| 2016/0371618 A1 | 12/2016 | Leidner et al. | |
| 2017/0005868 A1 | 1/2017 | Scheines et al. | |
| 2017/0024531 A1 | 1/2017 | Malaviya | |
| 2017/0048285 A1 | 2/2017 | Pearl et al. | |
| 2017/0061344 A1 | 3/2017 | Han et al. | |
| 2017/0068895 A1 | 3/2017 | Kil et al. | |
| 2017/0076295 A1 | 3/2017 | Vasudev et al. | |
| 2017/0103133 A1* | 4/2017 | Xiong | G06F 16/9038 |
| 2017/0108995 A1 | 4/2017 | Ali et al. | |
| 2017/0109441 A1* | 4/2017 | Berk | G06F 16/2455 |
| 2017/0109442 A1* | 4/2017 | Berk | G06F 40/14 |
| 2017/0116552 A1* | 4/2017 | Deodhar | G06Q 10/06316 |
| 2017/0116581 A1 | 4/2017 | Shah et al. | |
| 2017/0118576 A1 | 4/2017 | Sharifi et al. | |
| 2017/0132185 A1* | 5/2017 | Basta | G06F 17/212 |
| 2017/0139762 A1 | 5/2017 | Sherlock et al. | |
| 2017/0154539 A1 | 6/2017 | King et al. | |
| 2017/0169532 A1 | 6/2017 | Appel et al. | |
| 2017/0178024 A1 | 6/2017 | Kida | |
| 2017/0185921 A1 | 6/2017 | Zhang | |
| 2017/0255867 A1 | 9/2017 | Ramachandran et al. | |
| 2017/0262635 A1 | 9/2017 | Strauss et al. | |
| 2017/0300816 A1 | 10/2017 | Ferrara et al. | |
| 2017/0322795 A1 | 11/2017 | Demaris et al. | |
| 2017/0339178 A1 | 11/2017 | Mahaffey et al. | |
| 2017/0344656 A1 | 11/2017 | Koren et al. | |
| 2017/0344915 A1* | 11/2017 | Delaney | G06Q 10/0633 |
| 2017/0366496 A1 | 12/2017 | Habermehl et al. | |
| 2017/0374425 A1* | 12/2017 | Disley | G06F 3/04842 |
| 2018/0005161 A1 | 1/2018 | Cong et al. | |
| 2018/0012460 A1 | 1/2018 | Heitz et al. | |
| 2018/0012462 A1 | 1/2018 | Heitz et al. | |
| 2018/0012463 A1 | 1/2018 | Chaudhry et al. | |
| 2018/0039779 A1 | 2/2018 | Li et al. | |
| 2018/0046609 A1 | 2/2018 | Agarwal et al. | |
| 2018/0060738 A1 | 3/2018 | Achin et al. | |
| 2018/0063062 A1 | 3/2018 | Burdakov et al. | |
| 2018/0096073 A1* | 4/2018 | Sun | G06Q 50/01 |
| 2018/0114135 A1 | 4/2018 | Schmidt-karaca | |
| 2018/0129960 A1 | 5/2018 | Caballero et al. | |
| 2018/0130032 A1 | 5/2018 | Bae | |
| 2018/0144256 A1 | 5/2018 | Saxena et al. | |
| 2018/0150464 A1 | 5/2018 | Ma et al. | |
| 2018/0165584 A1 | 6/2018 | Jha et al. | |
| 2018/0225605 A1 | 8/2018 | Fabara et al. | |
| 2018/0253661 A1 | 9/2018 | Strauss | |
| 2018/0293905 A1 | 10/2018 | Benz | |
| 2018/0316571 A1 | 11/2018 | Andrade et al. | |
| 2018/0367483 A1 | 12/2018 | Rodriguez et al. | |
| 2018/0367484 A1 | 12/2018 | Rodriguez et al. | |
| 2019/0028492 A1 | 1/2019 | Coleman et al. | |
| 2019/0028545 A1 | 1/2019 | Yang et al. | |
| 2019/0034060 A1 | 1/2019 | Ahmad et al. | |
| 2019/0034826 A1 | 1/2019 | Ahmad et al. | |
| 2019/0036775 A1 | 1/2019 | Ahmad et al. | |
| 2019/0068627 A1 | 2/2019 | Thampy | |
| 2019/0089581 A1 | 3/2019 | Purandare et al. | |

OTHER PUBLICATIONS

Arendt, et al., "Beyond Description: Converting Web Site Usage Statistics into Concrete Site Improvement Ideas", In Journal of Web Librarianship, vol. 4, Issue 1, Mar. 2010, 29 Pages.

Broughton, John, "Wikipedia: The Missing Manual", Retrieved From: http://shop.oreilly.com/product/9780596515164.do, Feb. 4, 2008, 4 Pages.

Budds, Diana, "Can You Teach AI to Design? Wix Thinks So", Retrieved From: https://www.fastcodesign.com/3060934/can-you-teach-ai-to-design-wix-is-trying, Jun. 17, 2016, 67 Pages.

Constine, Josh, "Facebook Messenger's AI 'M' Suggests Features to Use Based on Your Convos", Retrieved From:https://techcrunch.com/2017/04/06/facebook-messengers-ai-m-suggests-features-to-use-based-on-your-convos/, Apr. 6, 2017, 7 Pages.

Mezhoudi, Nesrine, "User Interface Adaptation based on User Feedback and Machine Learning", In Proceedings of the Companion Publication of the International Conference on Intelligent User Interfaces Companion, Mar. 19, 2013, pp. 25-28.

(56) References Cited

OTHER PUBLICATIONS

Nadkarni, Prakash M., "Metadata-Driven Software Systems in Biomedicine: Designing Systems that can Adapt to Changing Knowledge", Retrieved From: https://books.google.co.in/books?hl=en&lr=&id=CIIUIf36W-sC&oi=fnd&pg=PR3&ots=xXQQO0zvoq&sig=ITB5PxoISZM3rzFbxyGzNKgaPP8#v=onepage&q&f=false, Jun. 9, 2011, 152 Pages.

"International Search Report & Written Opinion Issued in PCT Application No. PCT/US18/037971", dated Aug. 7, 2018, 12 Pages.

"International Search Report & Written Opinion Issued in PCT Application No. PCT/US18/039202", dated Sep. 10, 2018, 12 Pages.

Ricci, et al., "Recommender Systems Handbook", Retrieved From: http://www.cs.ubbcluj.ro/~gabis/DocDiplome/SistemeDeRecomandare/Recommender_systems_handbook.pdf, Oct. 28, 2010, 845 Pages.

Ungerleider, Neal, "Adobe is Building an AI to Automate Web Design. Should You Worry?", Retrieved From: https://www.fastcodesign.com/3068884/adobe-is-building-an-ai-to-automate-web-design-should-you-worry, Mar. 13, 2017, 66 Pages.

"Non Final Office Action Issued in U.S. Appl. No. 15/709,634", dated Nov. 1, 2019, 23 Pages.

\* cited by examiner

500

Like what you are seeing? Change your team site homepage to this [Set as homepage]

Contoso Site

Your site is now mobile friendly!
Access the information you need while on the go

502

Search

Home
Documents
Notebook
Pages
Site Contents
Recycle Bin

Edit

+ New ∨

News
+ Add

Welcome to your new team site

From the new team site homepage you'll be able to quickly author a new News post – a status update SharePoint, a few minutes ago Activity
Team  My Published 6/21/2017    ○ Follow  ○ Share    ✏ Edit Quick links
○ Return to previous homepage
○ Learn about team sites
○ Learn how to add a page Files ∨    See all Documents
+ New ∨    ⬆ Upload
Name ∨
  Company principles
  Presentation June

FIG. 5

INTELLIGENTLY UPDATING A COLLABORATION SITE OR TEMPLATE

BACKGROUND

A collaboration site is a site that is configured to enable multiple users to perform collaborative operations with regard to content. For instance, the collaboration site may enable the users to share content, collaboratively edit the content, and/or provide comments regarding the content. Examples of a collaboration site include but are not limited to a collaborative group project work site (e.g., a team site), a blog, and a wiki. A service that provides the collaboration site may perform additional services, such as tracking (e.g., version history tracking), managing, and securing the content and synchronizing the content across multiple devices.

When a collaboration site is created, it typically is configured to provide the features (e.g., capabilities) that are considered to be the best (e.g., most useful) features that are available at the time. For instance, the collaboration site may have a homepage that shows information to site visitors about what is going on in the collaboration site and that helps the site visitors work together more effectively. As time goes on, the combination of features that is considered to be the best often changes. For example, new features may be added and existing features may be upgraded relatively often. In another example, how the users use the collaboration site (e.g., work together in the site) or an understanding of how the users use the collaboration site may change over time.

Updating a collaboration site with new and/or upgraded features may be challenging because users of the collaboration site get used to interacting with the collaboration site in a particular way, and the users may become disrupted when the collaboration site is changed suddenly, even if such changes are ultimately for the benefit of the users.

SUMMARY

Various approaches are described herein for, among other things, intelligently updating a collaboration site or a template that may be used to create a new collaboration site. For instance, the various approaches may intelligently update a default version of the collaboration site or the template, which is made available to users of a service by default. The collaboration site or the template may be updated to include new features based on (e.g., based at least in part on) a likelihood that the new features will be valuable to users. The likelihood that new features will be valuable to the users may be determined (e.g., derived) using heuristics, machine learning, intelligent user experiences, and/or an understanding of user behavior gathered by a service that provides the collaboration site or the template. The likelihood may be compared to a likelihood threshold to determine whether the collaboration site or the template is to be updated. In accordance with this example, the update may be made if the likelihood is greater than or equal to the likelihood threshold.

In a first example approach, a specified collaboration site that provides first features is generated. The specified collaboration site is configured to facilitate collaboration among users of the specified collaboration site. Usage data, which indicates operations performed by the users with regard to at least some of the first features provided by the specified collaboration site, and information regarding second features that are provided by other collaboration sites are correlated to identify feature(s) included in the second features that have a likelihood of adding value to the users that is greater than or equal to a likelihood threshold. An updated collaboration site, which is based at least in part on the specified collaboration site, is generated to provide the feature(s) in addition to at least some of the first features based at least in part on the feature(s) having the likelihood of adding value to the users that is greater than or equal to the likelihood threshold.

In a second example approach, a specified collaboration site that provides first features is generated. The specified collaboration site is configured to facilitate collaboration among users of the specified collaboration site. A determination is made that second feature(s) that are available to be provided by the specified collaboration site have a likelihood of adding value to the users that is greater than or equal to a likelihood threshold based at least in part on knowledge of operations performed by the users with regard to at least some of the first features. An updated collaboration site, which is based at least in part on the specified collaboration site, is generated to provide the second feature(s) in addition to at least some of the first features based at least in part on a determination that the second feature(s) have the likelihood of adding value to the users that is greater than or equal to the likelihood threshold. A preview of the updated collaboration site is presented for viewing by person(s) associated with the specified collaboration site. An offer is presented to the person(s) to replace the specified collaboration site with the updated collaboration site.

In a third example approach, a deployed version of a collaboration site, which is configured to facilitate collaboration among users of the collaboration site, is iteratively updated in accordance with a machine learning technique. For each of multiple iterations that update the deployed version of the collaboration site, a determination is made that available feature(s) that are available to be provided by the deployed version of the collaboration site and that are not included among features provided by the deployed version of the collaboration site have a likelihood of adding value to the users that is greater than or equal to a likelihood threshold based at least in part on information that includes knowledge of operations performed by the users with regard to at least some of the features. For each iteration, an updated version of the collaboration site is generated based at least in part on a determination that the available feature(s) have the likelihood of adding value to the users that is greater than or equal to the likelihood threshold; the updated version is configured to provide the available feature(s) in addition to at least some of the features. For each iteration, a preview of the updated version is presented for viewing by person(s) associated with the collaboration site. For each iteration, a request is provided to the person(s); the request requests that the person(s) choose either the deployed version of the collaboration site or the updated version of the collaboration site. For each iteration, the features that are provided by the deployed version of the collaboration site are updated to include the available feature(s) based at least in part on response(s) that are received to the request. For instance, the features that are provided by the deployed version of the collaboration site may be updated to include the available feature(s) further based at least in part on the extent to which the features in the deployed version are used by the users.

In a fourth example approach, a template is generated for creation of a new collaboration site. The template is iteratively updated in accordance with a machine learning technique. For each of multiple iterations that update the template, a new collaboration site is generated based at least in part on the template; the new collaboration site is configured to facilitate collaboration among users of the new collaboration site; the new collaboration site is configured to provide first features that include second features; the template is configured to provide the second features. For each iteration, a determination is made that third feature(s) that are available to be provided by the new collaboration site have a likelihood of adding value to the users that is greater than or equal to a likelihood threshold based at least in part on information that includes knowledge of operations performed by the users with regard to at least some of the first features. For each iteration, an updated collaboration site, which is based at least in part on the new collaboration site, is generated to provide the third feature(s) in addition to at least some of the first features based at least in part on a determination that the third feature(s) have the likelihood of adding value to the users that is greater than or equal to the likelihood threshold. For each iteration, a preview of the updated collaboration site is presented for viewing by person(s) associated with the new collaboration site. For each iteration, an offer is presented to the person(s) to replace the new collaboration site with the updated collaboration site. For each iteration, the new collaboration site is replaced with the updated collaboration site based at least in part on an acceptance of the offer; the acceptance is received from at least one of the person(s). For each iteration, the template is updated by causing the updated collaboration site to serve as the template for creation of another new collaboration site based at least in part on the new collaboration site being replaced with the updated collaboration site.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 2-9 are example screenshots of a user interface in accordance with embodiments.

FIGS. 10-11, 13, and 15 depict flowcharts of example methods for updating a collaboration site in accordance with embodiments.

Figure 12:
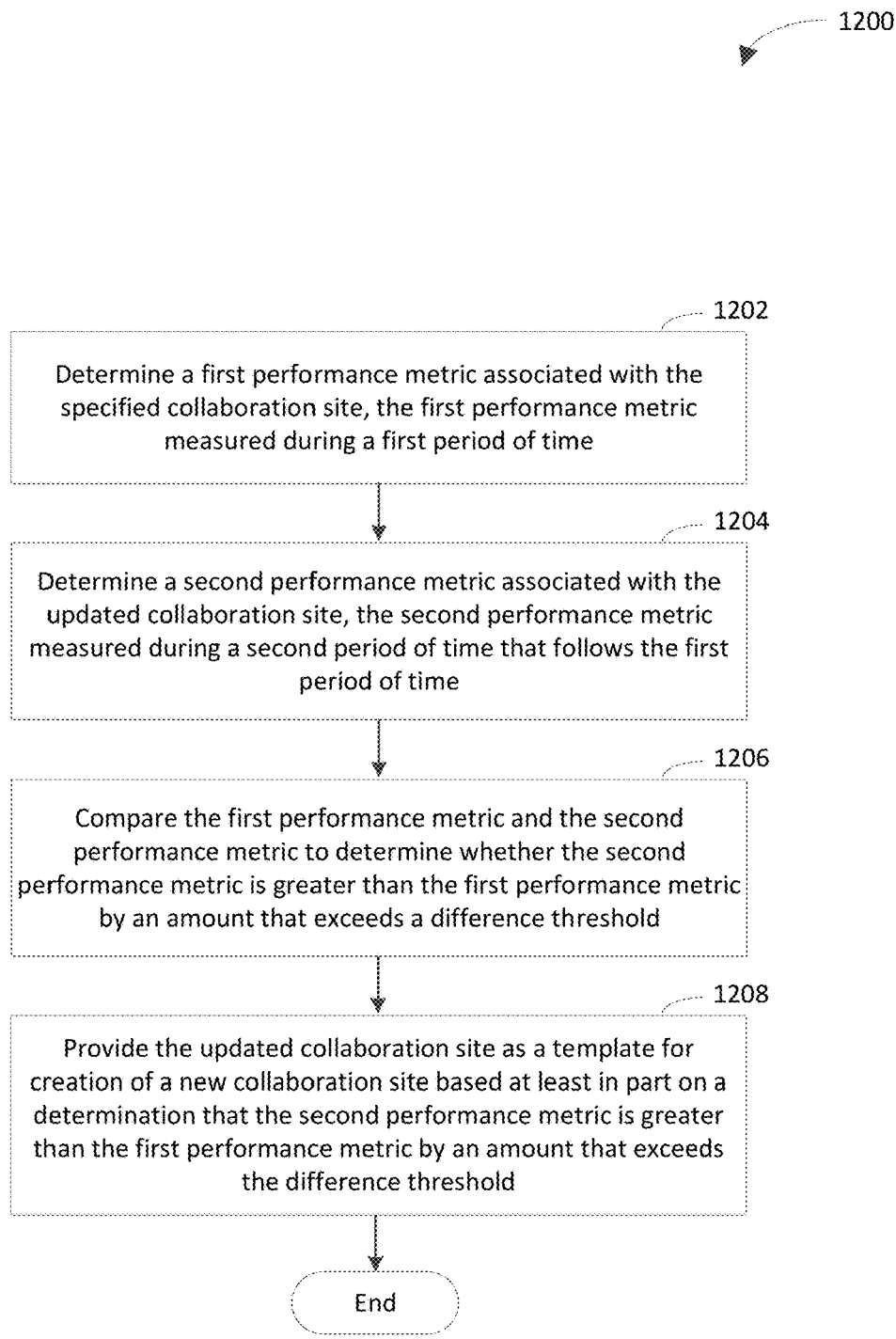
Figure 14:
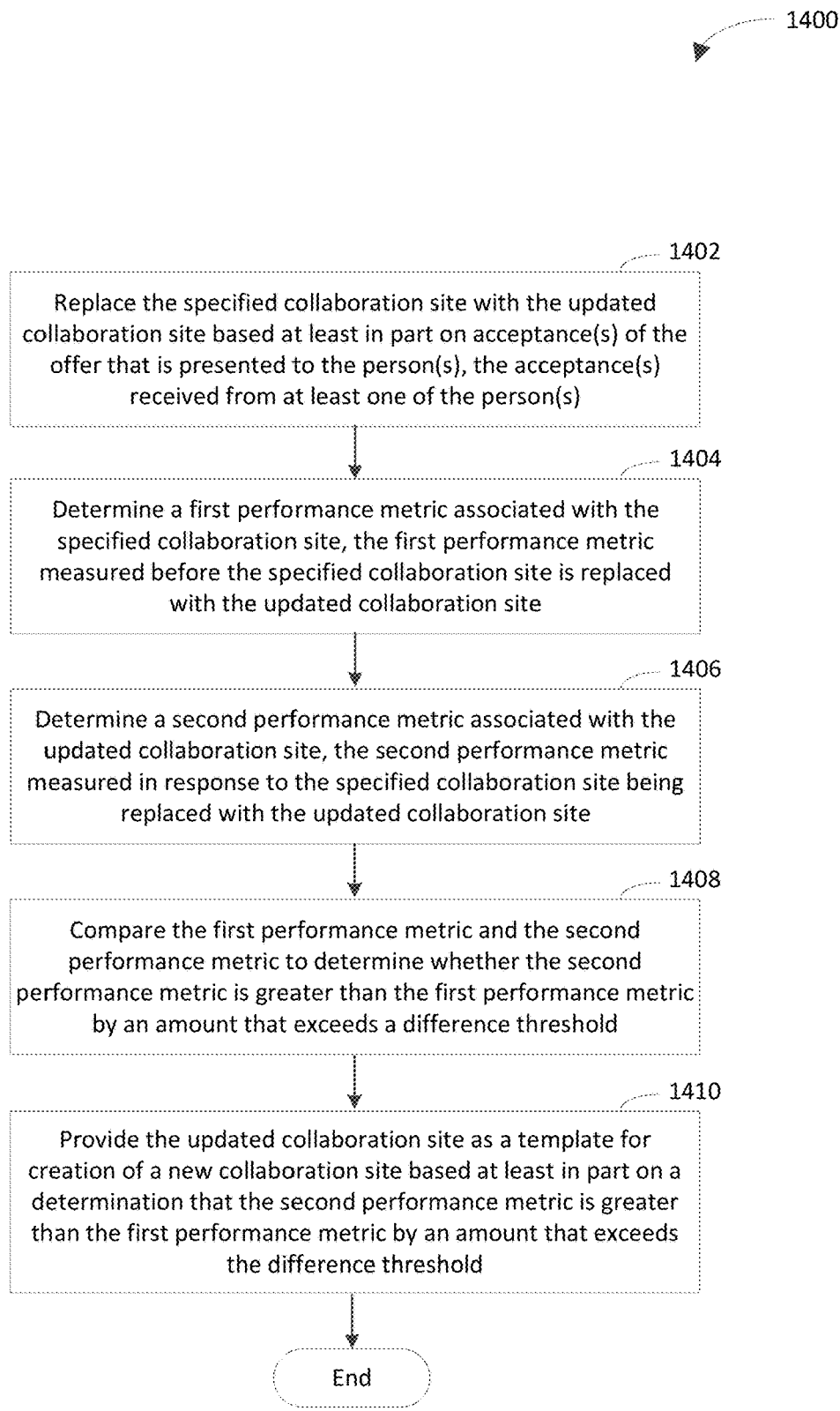
Figure 16:
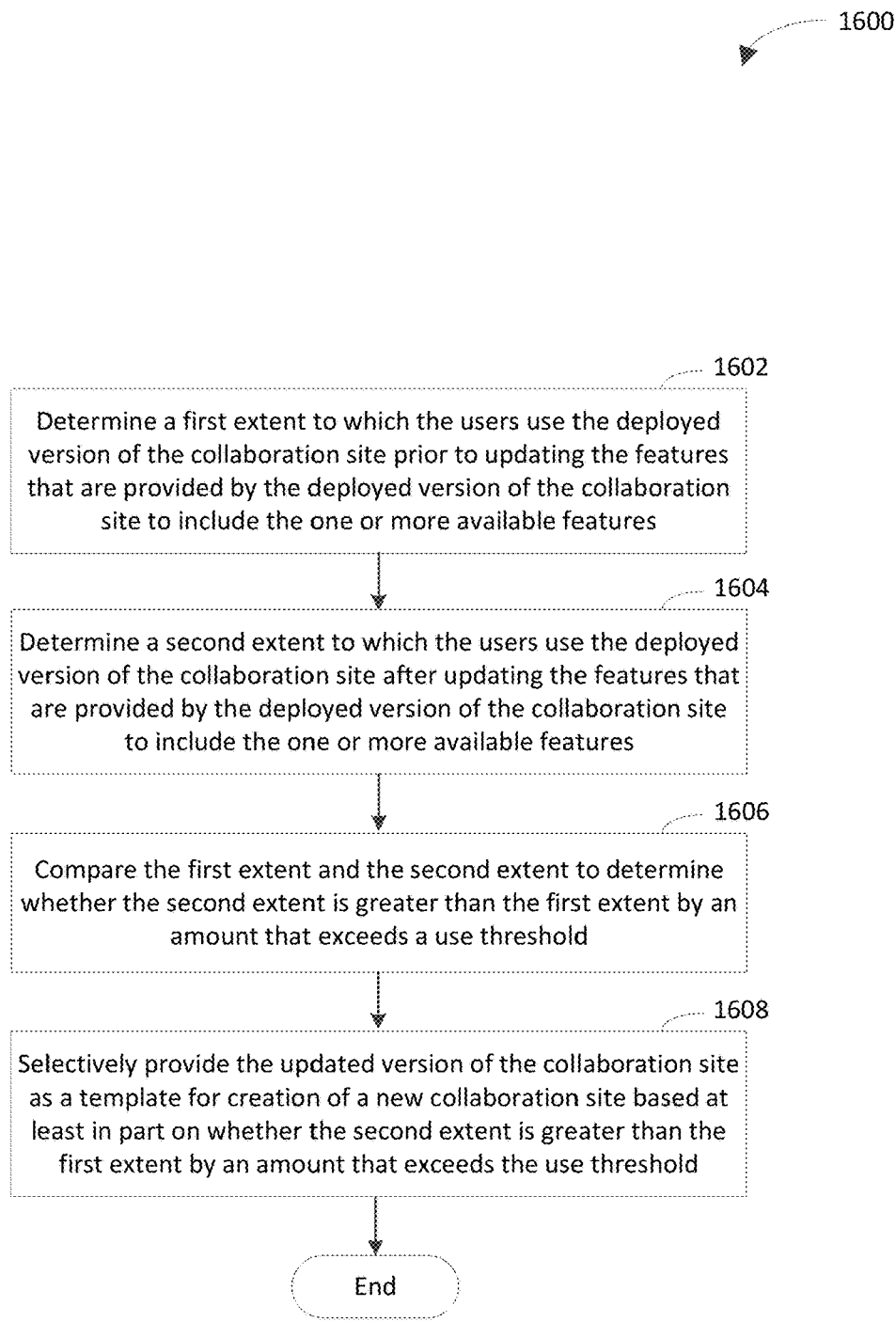

FIGS. 12, 14, and 16 depict flowcharts of example methods for providing an updated collaboration site as a template in accordance with embodiments.

Figure 17:
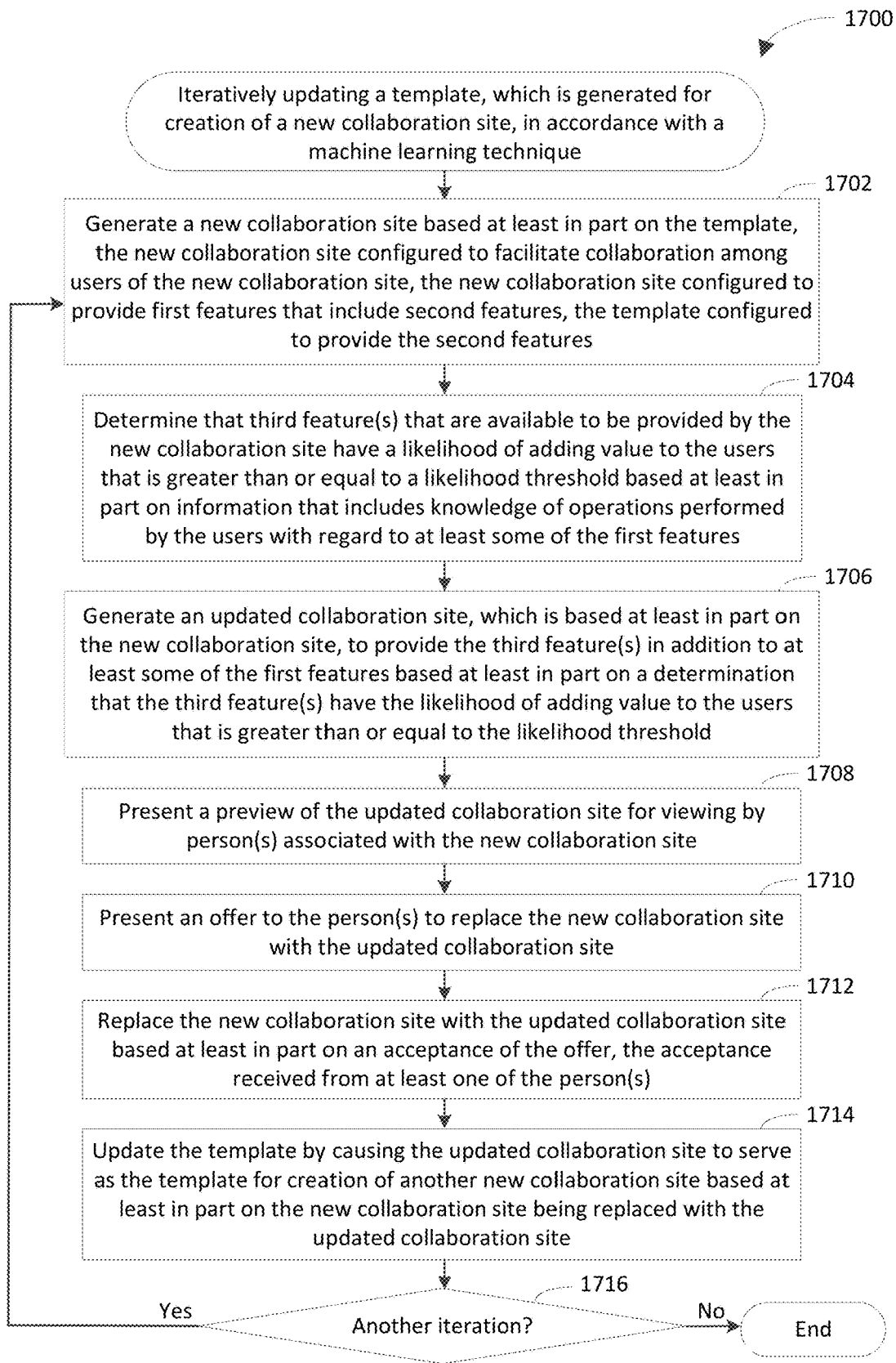

FIG. 17 depicts a flowchart of an example method for updating a template in accordance with an embodiment.

Figure 18:
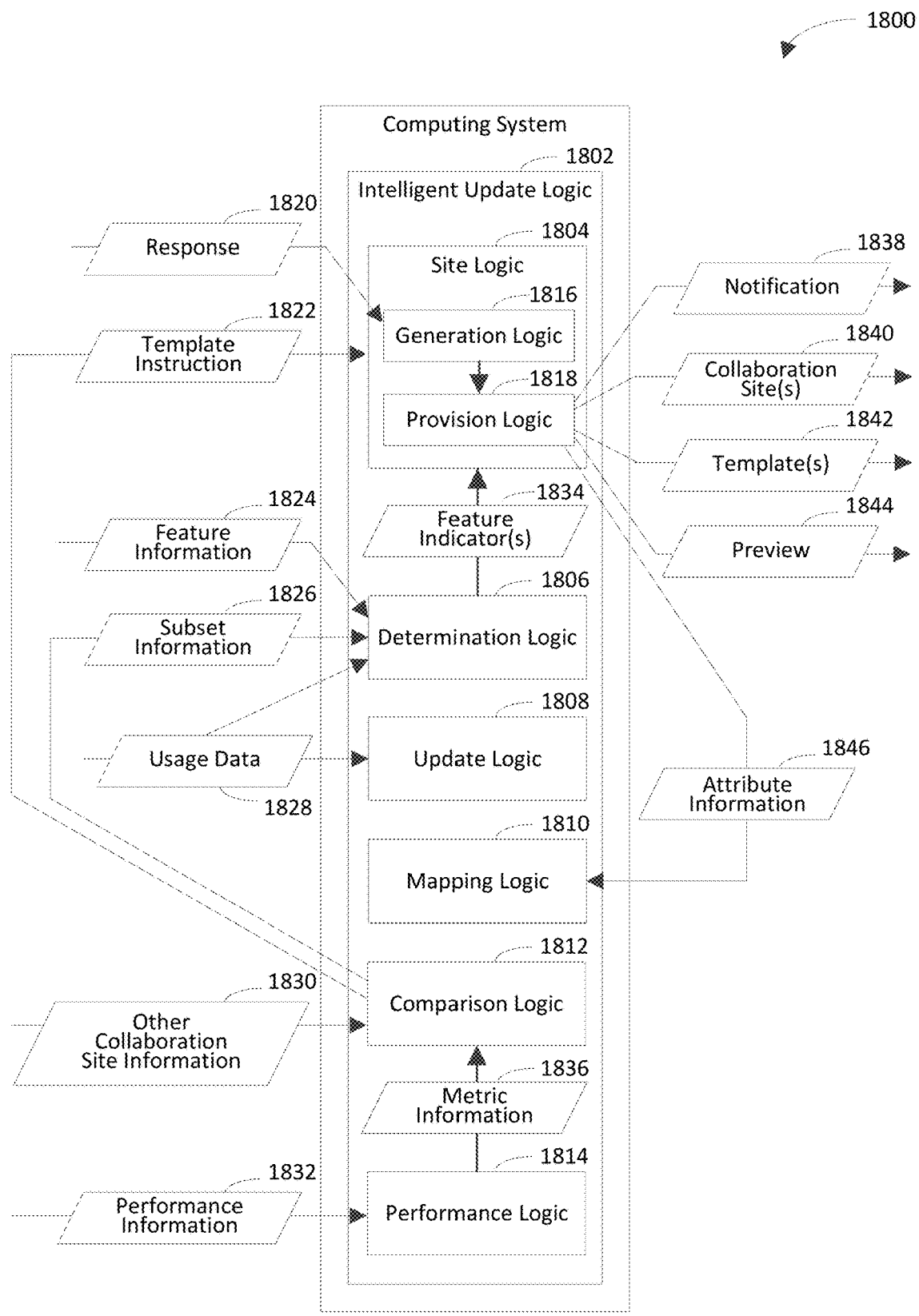

FIG. 18 is a block diagram of an example computing system in accordance with an embodiment.

Figure 19:
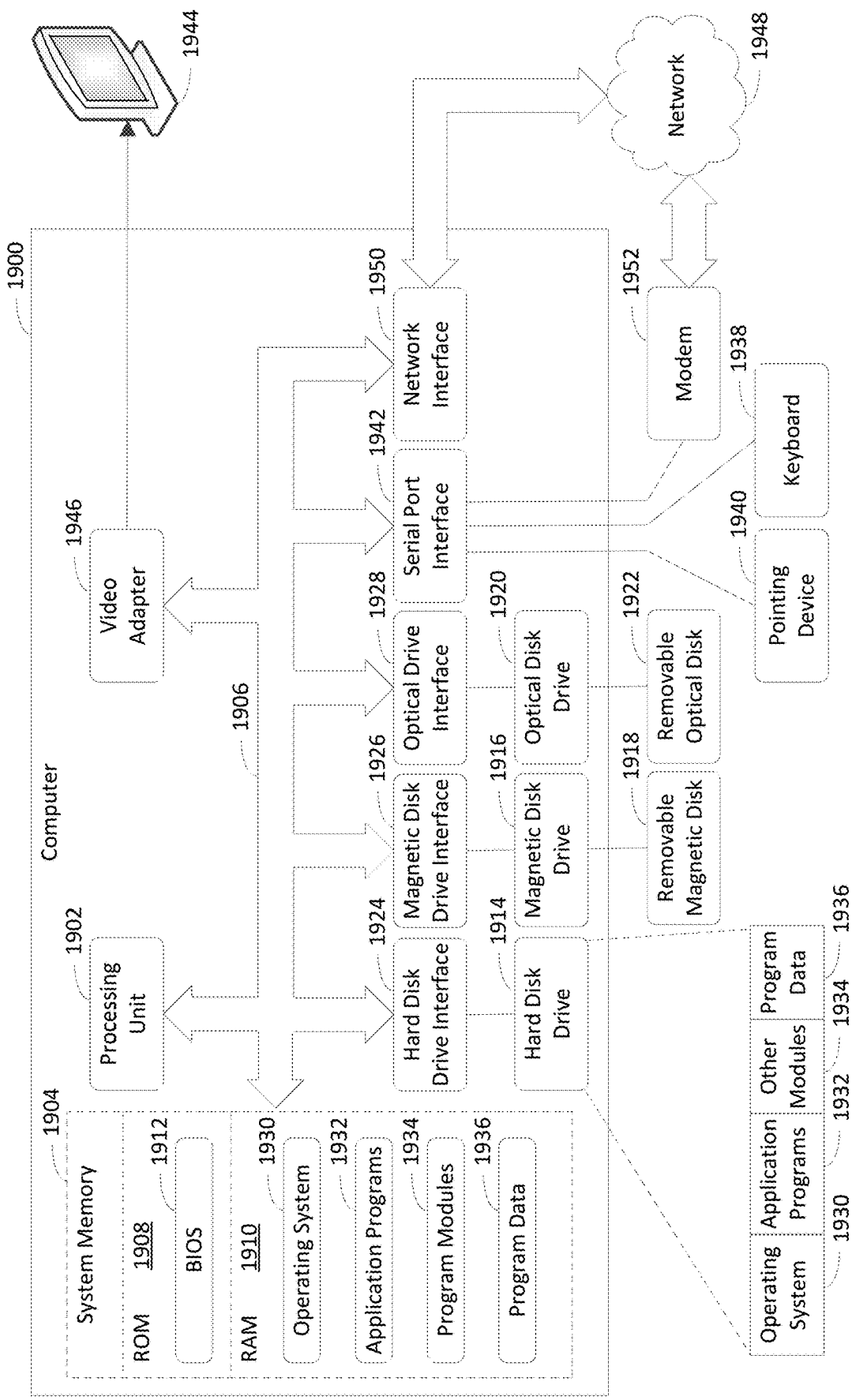

FIG. 19 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of intelligently updating a collaboration site or a template that may be used to create a new collaboration site. For instance, the example embodiments may be capable of intelligently updating a default version of the collaboration site or the template, which is made available to users of a service by default. The collaboration site or the template may be updated to include new features based on (e.g., based at least in part on) a likelihood that the new features will be valuable to users. The likelihood that new features will be valuable to the users may be determined (e.g., derived) using heuristics, machine learning, intelligent user experiences, and/or an understanding of user behavior gathered by a service that provides the collaboration site or the template. An intelligent user experience is a user experience in which a computing system (e.g., that provides the collaboration site or template) selects an operation from multiple possible operation to be performed with regard to the collaboration site or template based on the response of user(s) to a previous operation that is performed with regard to the collaboration site or template by the computing system. The likelihood that the new features will be valuable to the users may be compared to a likelihood threshold to determine whether the collaboration site or the template is to be updated. In accordance with this example, the update may be made if the likelihood is greater than or equal to the likelihood threshold.

The likelihood that the new features will be valuable to the users of the collaboration site may be determined based on usage data indicating operations performed by the users of the collaboration site with regard to at least some of the features provided by the collaboration site; a purpose of the collaboration site that is derived from information, such as the usage data; features that are common among highly-used collaboration sites that have the same purpose as the present collaboration site; and/or a difference in retention rate of users, number of users, and/or number of operations performed by users of other collaboration sites with regard to features of those sites before and after the new features are implemented in those sites. A highly used collaboration site is a collaboration site that is used to an extent that is greater than or equal to a designated threshold. The derived purpose of the collaboration site may change over time based at least in part on changes in the usage data and/or new features that become available for incorporation into the collaboration site. The usage data may indicate which features of the collaboration site have been used by the users in the past, how the users have used the features, which of the features tend to be used together by the users (e.g., if feature A is used, then feature B tends to be used, as well), and/or the extent to which features of other collaboration sites (e.g., having the same purpose as the present collaboration site) are used by users of those sites.

For instance, a "timer job" may be utilized to periodically iterate over collaboration sites and determine features that are used by each site (e.g., by examining the state of the site, such as the parts that are present on a homepage of the site). Information regarding the features of each site may be stored as an object on the respective site (e.g., like a JavaScript Object Notation (JSON) blob), which may be subsequently retrieved with relative ease. Each site may be examined to determine how active the site is. A score may be assigned to each site to indicate how active the site is. For instance, a site that is used relatively frequently may be given a relatively high score; whereas, a site that is not used much (or at all) may be given a relatively low score. This assumes that sites that are used more often provide more value (e.g., are more useful) to their users than sites that are neglected. The score that is assigned to each site may be stored as a property on the site. The "timer job" may be used to pre-provision an updated collaboration site to include feature(s) from those sites having a relatively high score (e.g., a score that is greater than or equal to a threshold score). To pre-provision the updated collaboration site means to generate the updated collaboration site before a determination is made to replace an existing collaboration site with the updated collaboration site (e.g., before the replacement is approved by the users and/or the owner of the existing collaboration site).

The content of the updated collaboration site may be the same as the content of the existing collaboration site that the updated collaboration site replaces. The feature(s) that are added to the updated collaboration site may provide additional ways that users can interact with the content and with each other. Accordingly, updating a collaboration site or a template need not necessarily include updating the content of the collaboration site or the template.

Example techniques described herein have a variety of benefits as compared to conventional techniques for updating a collaboration site or a template that may be used to create new collaboration sites. For instance, intelligently updating collaboration sites and templates in accordance with the example techniques described herein may lead to increased usage, engagement, and productivity of users with regard to a service that provides the collaboration sites and the templates. The example techniques may give person(s) associated with a collaboration site or a template (e.g., users or an owner thereof) control over updating the collaboration site or the template. The example techniques may provide a notification to the person(s) about features that may be added to the collaboration site or the template and enable the person(s) to choose whether such features are to be added. The notification may be provided via any suitable means, including but not limited to as an email, a push notification, or a banner placed at the top of the collaboration site or the template.

The example techniques may simplify a process for adding new features to a collaboration site or a template. For instance, upon receiving a notification about the new features, the person(s) may simply approve the new features in order for the new features to be added to the collaboration site or the template. The example techniques may enable such person(s) to update (e.g., upgrade) a classic version of the collaboration site, which may have been created long ago, to include modern features, which may be automatically incorporated as default features in newly created collaboration sites. When the classic version of the collaboration site is updated to include the modern features, some of the modern features may replace some of the features that were provided by the classic version of the collaboration site (a.k.a. classic features). The example techniques may be capable of mapping the modern features to the classic features that they replace. Such mapping may be performed automatically (e.g., without assistance from the users or the owner of the collaboration site) or with assistance from the users or the owner of the collaboration site. The example techniques may be capable of taking siloed features that are provided by a classic version of a collaboration site and inter-relating those features in an updated version of the collaboration site.

The example techniques may reduce an amount of time and/or resources (e.g., processor, memory, network bandwidth) that are consumed to update a collaboration site or a template. For instance, correlating usage data regarding existing features of the collaboration site or the template and information regarding new features and/or obtaining approval from the users or owner before incorporating the new features into the collaboration site or the template may reduce a risk that time and/or resources will thereafter be consumed to remove the new features from the updated collaboration site or template. The example techniques may present a preview of the updated collaboration site to the users or owner, which may eliminate a need to perform operations that enable the users or owner to find information indicating how the new features will impact the collaboration site prior to determining whether the collaboration site is to be updated to include the new features.

The example embodiments may increase efficiency of a computing system that is used to update a collaboration site or a template. The example techniques may increase user efficiency (e.g., by reducing a number of steps that a user takes to update the collaboration site or the template). For example, proactively generating an updated version of a collaboration site or template to include new features so that the updated version may be deployed upon approval by the users or owner of the collaboration site or template may reduce (e.g., eliminate) a need for a user to manually search for information that indicates how the new features will impact the collaboration site or template. In another example, incorporating interface elements into the collaboration site to guide the users through setting up or using the new features may reduce the need for the user to manually search for information to discover how to set up or use the new features.

Intelligently updating collaboration sites and templates may lead to increased usage, engagement, and productivity of users with regard to a service that provides the collaboration sites and templates.

Figure 1:
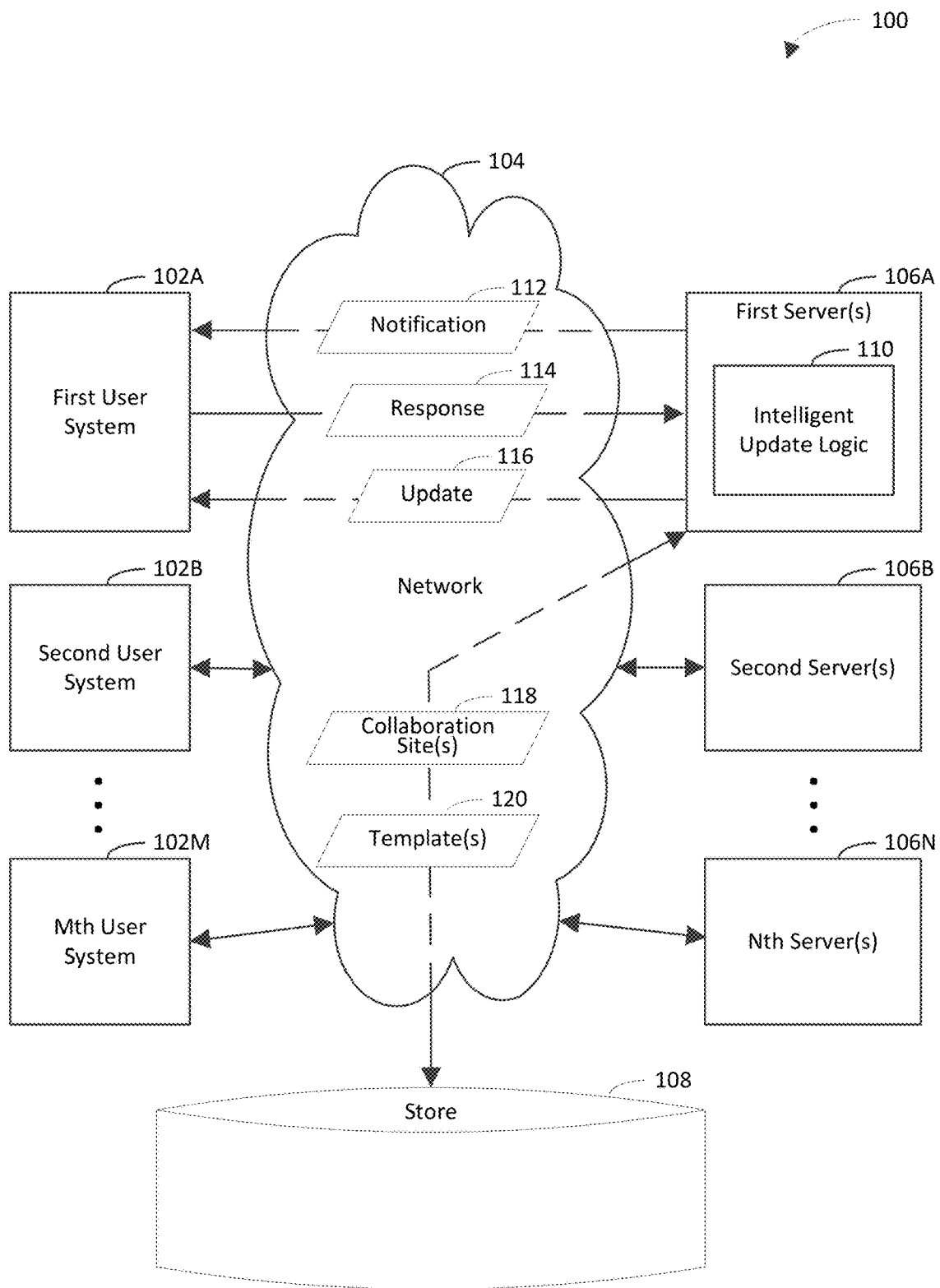
FIG. 1 is a block diagram of an example intelligent update system in accordance with an embodiment.

FIG. 1 is a block diagram of an example intelligent update system 100 in accordance with an embodiment. Generally speaking, the intelligent update system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the intelligent update system 100 intelligently updates collaboration site(s) 118 and template(s) 120. In some example embodiments, the template(s) 120 are used to create new collaboration sites.

As shown in FIG. 1, the intelligent update system 100 includes a plurality of user systems 102A-102M, a network 104, a plurality of servers 106A-106N, and a store 108. Communication among the user systems 102A-102M and the servers 106A-106N is carried out over the network 104 using well-known network communication protocols. The network 104 may be a wide-area network (e.g., the Internet), a local area network (LAN), another type of network, or a combination thereof.

The user systems 102A-102M are processing systems that are capable of communicating with the servers 106A-106N. An example of a processing system is a system that includes at least one processor that is capable of manipulating data in accordance with a set of instructions. For instance, a processing system may be a computer, a personal digital assistant, etc. The user systems 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, the user systems 102A-102M are capable of accessing domains (e.g., Web sites) hosted by the servers 104A-104N, so that the user systems 102A-102M may access information that is available via the domains. Such domain may include Web pages, which may be provided as hypertext markup language (HTML) documents and objects (e.g., files) that are linked therein, for example.

The user systems 102A-102M may include any client-enabled system or device, including but not limited to a desktop computer, a laptop computer, a tablet computer, a personal digital assistant, a cellular telephone, a wearable device, or the like. It will be recognized that any one or more user systems 102A-102M may communicate with any one or more servers 106A-106N.

The servers 106A-106N are processing systems that are capable of communicating with the user systems 102A-102M. The servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, the servers 106A-106N are configured to host respective Web sites, so that the Web sites are accessible to users of the intelligent update system 100.

One example type of a computer program that may be executed by one or more of the servers 106A-106N is a content collaboration program. A content collaboration program is a computer program that enables users (e.g., at any of the user systems 102A-102M) to perform collaborative operations with regard to content (e.g., of any of the collaboration site(s) 118 and/or template(s) 120). Examples of a content collaboration program include but are not limited to SharePoint® and OneDrive® developed and distributed by Microsoft Corporation, Google Drive™ developed and distributed by Google Inc., Box™ developed and distributed by Box, Inc., Dropbox® developed and distributed by Dropbox, Inc., Slack® developed and distributed by Slack Technologies, Inc., and Confluence® developed and distributed by Atlassian Pty Ltd. It will be recognized that the example techniques described herein may be implemented using a content collaboration program. For instance, a software product (e.g., a non-subscription service) may include the content collaboration program, and the software product may be configured to perform the example techniques, though the scope of the example embodiments is not limited in this respect.

The first server(s) 106A are shown to include intelligent update logic 110 for illustrative purposes. The intelligent update logic 110 is configured to intelligently update the collaboration site(s) 118 and the template(s) 120. For example, the intelligent update logic 110 may identify features that are available to be incorporated into a designated collaboration site (or template). The intelligent update logic 110 may determine that one or more of the features are likely to provide at least a threshold amount of value to users of the designated collaboration site in accordance with the techniques described herein. The intelligent update logic 110 may provide a notification 112 to one or more of the user systems 102A-102M, indicating that the one or more features are available to be incorporated into the designated collaboration site. For instance, the notification 112 may include a recommendation to incorporate at least one of the feature(s) into the designated collaboration site and/or a request to choose whether the feature(s) are to be incorporated. The intelligent update logic 110 may receive response(s) (e.g., response 114) regarding the notification 112 from the user systems 102A-102M. Each response may indicate approval or disapproval of incorporating the new feature(s) into the designated collaboration site. The intelligent update logic 110 determines, based on the response(s), whether the one or more features are to be incorporated into the designated collaboration site. If so, the intelligent update logic 110 proceeds with updating the designated collaboration site to include the one or more features; the intelligent update logic 110 may then provide an update 116, which includes the updated collaboration site, to the user systems 102A-102M. Otherwise, the intelligent update logic 110 does not update the designated collaboration site.

The notification 112 and the update 116 are shown to be provided to the first user system 102A, and the response 114 is shown to be received from the first user system 102A, for illustrative purposes and are not intended to be limiting. It will be recognized that the notification 112 and the update 116 may be provided to any one or more of the user systems 102A-102M. It will be further recognized that the response 114 may be received from any one or more of the user systems 102A-102M. For instance, the response 114 may include a distinct response from each of the user systems 102A-102M.

The store 108 stores information that is accessible to the intelligent update logic 110. For example, the store 108 stores the collaboration site(s) 118 and the template(s) 120. In accordance with this example, the intelligent update logic 110 may receive (e.g., collect or retrieve) the collaboration site(s) 118 and the template(s) 120 from the store 108. The store 108 may be any suitable type of store. One type of store is a database. For instance, the store 108 may be a relational database, an entity-relationship database, an object database, an object relational database, an extensible markup language (XML) database, etc.

In a first intelligent updating example, intelligent update logic 110 generates a specified collaboration site that provides first features. The specified collaboration site is configured to facilitate collaboration among users of the specified collaboration site (e.g., users of the user systems 102A-102M). Intelligent update logic 110 correlates usage data, which indicates operations performed by the users with regard to at least some of the first features, and information regarding second features that are provided by other collaboration sites to identify feature(s) included in the second features that have a likelihood of adding value to the users that is greater than or equal to a likelihood threshold. For instance, the collaboration site(s) 118 may include the specified collaboration site and the other collaboration sites. Intelligent update logic 110 generates an updated collaboration site, which is based at least in part on the specified collaboration site, to provide the feature(s) in addition to at least some of the first features based at least in part on the feature(s) having the likelihood of adding value to the users that is greater than or equal to the likelihood threshold.

In a second intelligent updating example, intelligent update logic 110 generates a specified collaboration site that provides first features. The specified collaboration site is configured to facilitate collaboration among users of the specified collaboration site. Intelligent update logic 110 determines that second feature(s) that are available to be provided by the specified collaboration site have a likelihood of adding value to the users that is greater than or equal to a likelihood threshold based at least in part on knowledge of operations performed by the users with regard to at least some of the first features. Intelligent update logic 110 generates an updated collaboration site, which is based at least in part on the specified collaboration site, to provide the second feature(s) in addition to at least some of the first features based at least in part on a determination that the second feature(s) have the likelihood of adding value to the users that is greater than or equal to the likelihood threshold. Intelligent update logic 110 presents a preview of the updated collaboration site for viewing by person(s) associated with the specified collaboration site. Intelligent update logic 110 presents an offer to the person(s) to replace the specified collaboration site with the updated collaboration site. For instance, the notification 112 may include the preview and/or the offer.

In a third intelligent updating example, intelligent update logic 110 iteratively updates a deployed version of a collaboration site, which is configured to facilitate collaboration among users of the collaboration site, in accordance with a machine learning technique. For each of multiple iterations that update the deployed version of the collaboration site, intelligent update logic 110 determines that available feature(s), which are available to be provided by the deployed version of the collaboration site and are not included among features provided by the deployed version of the collaboration site, have a likelihood of adding value to the users that is greater than or equal to a likelihood threshold based at least in part on information that includes knowledge of operations performed by the users with regard to at least some of the features. For each iteration, intelligent update logic 110 generates an updated version of the collaboration site based at least in part on a determination that the available feature(s) have the likelihood of adding value to the users that is greater than or equal to the likelihood threshold; the updated version is configured to provide the available feature(s) in addition to at least some of the features. For each iteration, intelligent update logic 110 presents a preview of the updated version for viewing by person(s) associated with the collaboration site. For each iteration, intelligent update logic 110 provides a request to the person(s); the request requests that the person(s) choose either the deployed version of the collaboration site or the updated version of the collaboration site. For instance, the notification 112 may include the preview and/or the request. For each iteration, intelligent update logic 110 updates the features that are provided by the deployed version of the collaboration site to include the available feature(s) based at least in part on response(s) that are received to the request. For instance, the features that are provided by the deployed version of the collaboration site may be updated to include the available feature(s) further based at least in part on the extent to which the features in the deployed version are used by the users.

In a fourth intelligent updating example, intelligent update logic 110 generates a template for creation of a new collaboration site. intelligent update logic 110 iteratively updates the template in accordance with a machine learning technique. For each of multiple iterations that update the template, intelligent update logic 110 generates a new collaboration site based at least in part on the template; the new collaboration site is configured to facilitate collaboration among users of the new collaboration site; the new collaboration site is configured to provide first features that include second features; the template is configured to provide the second features. For each iteration, intelligent update logic 110 determines that third feature(s) that are available to be provided by the new collaboration site have a likelihood of adding value to the users that is greater than or equal to a likelihood threshold based at least in part on information that includes knowledge of operations performed by the users with regard to at least some of the first features. For each iteration, intelligent update logic 110 generates an updated collaboration site, which is based at least in part on the new collaboration site, to provide the third feature(s) in addition to at least some of the first features based at least in part on a determination that the third feature(s) have the likelihood of adding value to the users that is greater than or equal to the likelihood threshold. For each iteration, intelligent update logic 110 presents a preview of the updated collaboration site for viewing by person(s) associated with the new collaboration site. For each iteration, intelligent update logic 110 presents an offer to the person(s) to replace the new collaboration site with the updated collaboration site. For instance, the notification 112 may include the preview and/or the offer. For each iteration, intelligent update logic 110 replaces the new collaboration site with the updated collaboration site based at least in part on an acceptance of the offer; the acceptance is received from at least one of the person(s). For instance, the response 114 may include the acceptance. For each iteration, intelligent update logic 110 updates the template by causing the updated collaboration site to serve as the template for creation of another new collaboration site based at least in part on the new collaboration site being replaced with the updated collaboration site.

It should be noted that as users of collaboration sites perform more operations with regard to features of those sites and as collaboration sites and templates are iteratively updated, correlations of usage data regarding those operations and available features and the estimates of the likelihood that the available features will provide value to the users may become more accurate. For instance, intelligent update logic 110 may develop a model of each of the users or of a group to which the users belong. Intelligent update logic 110 may develop and/or refine the model using online learning, for example.

It will be recognized that intelligent update logic 110 may be (or may be included in) a content collaboration program, though the scope of the example embodiments is not limited in this respect. Example techniques for intelligently updating a collaboration site or template are discussed in greater detail below with reference to FIGS. 2-18.

Intelligent update logic 110 may be implemented in various ways to intelligently update a collaboration site or template, including being implemented in hardware, software, firmware, or any combination thereof. For example, intelligent update logic 110 may be implemented as computer program code configured to be executed in one or more processors. In another example, intelligent update logic 110 may be implemented as hardware logic/electrical circuitry. For instance, intelligent update logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Intelligent update logic 110 is shown to be incorporated in first server(s) 106A for illustrative purposes and is not intended to be limiting. It will be recognized that intelligent update logic 110 (or any portion(s) thereof) may be incorporated in any one or more of the user systems 102A-102M. For example, client-side aspects of intelligent update logic 110 may be incorporated in one or more of the user systems 102A-102M, and server-side aspects of intelligent update logic 110 may be incorporated in first server(s) 106A. In another example, intelligent update logic 110 may be distributed among the user systems 102A-102M. In yet another example, intelligent update logic 110 may be incorporated in a single one of the user systems 102A-102M. In another example, intelligent update logic 110 may be distributed among the server(s) 106A-106N. In still another example, intelligent update logic 110 may be incorporated in a single one of the server(s) 106A-106N.

Figure 2:
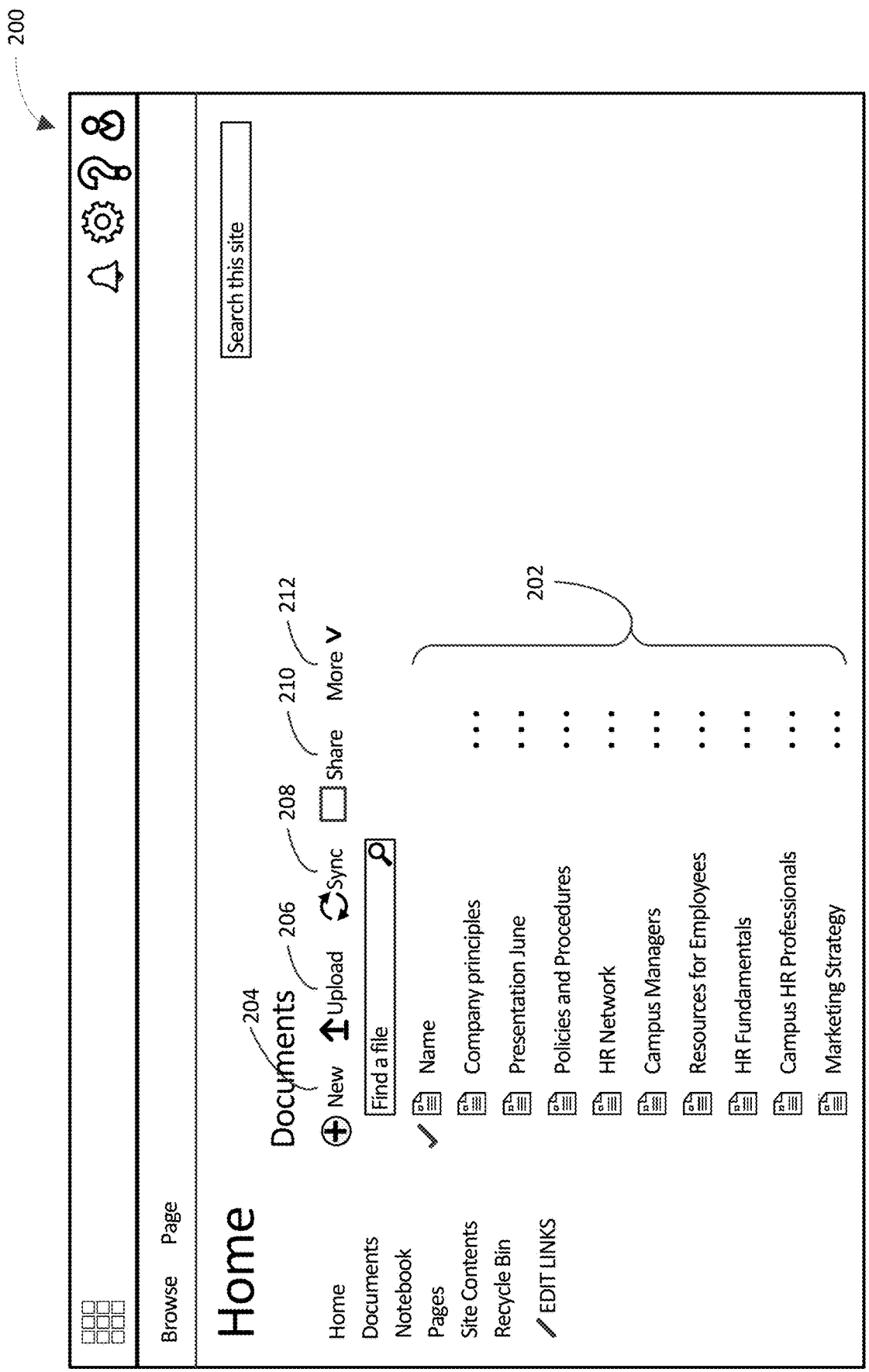

FIGS. 2-9 are example screenshots 200, 300, 400, 500, 600, 700, 800, and 900 of a user interface in accordance with embodiments. As shown in FIG. 2, screenshot 200 shows a homepage of a team site for non-limiting, illustrative purposes. The team site is a collaboration site in which members of a team in an organization may perform operations with regard to features that are provided by the site. The homepage provides a list of documents 202. A user of the team site may cause the documents 202 to be synchronized to a computing device on which the user interface is displayed by selecting a "Sync" icon 208. The user may cause a document to be shared by selecting the document and then selecting a "Share" icon 210. The user may cause a new document to be created by selecting a "New" icon 204. The user may cause a document to be uploaded from the computing device on which the user interface is displayed to server(s) that provide the team site by selecting an "Upload" icon 206. Displaying, synchronizing, sharing, creating, and uploading documents are features that are provided by the team site. The user may access more features of the team site by selecting a "More" icon 212.

Figure 3:
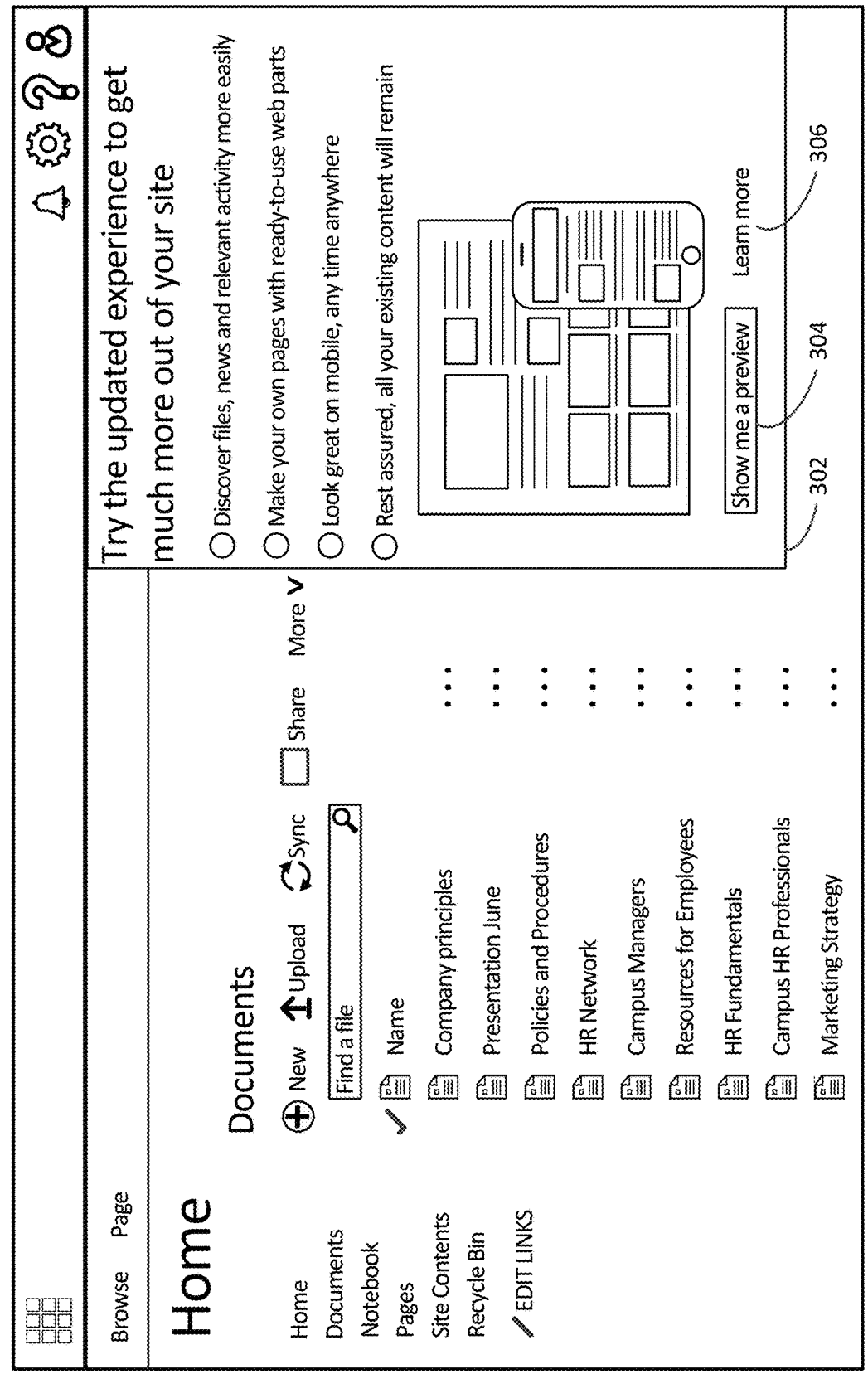

FIG. 3 is a screenshot 300 of the homepage of the team site shown in FIG. 2 in which a notification 302 is presented. The notification 302 indicates that new features are available to be provided by the team site. For instance, the notification 302 indicates that the new features enable users to discover files, news, and relevant activity more easily and enable the users to make their own pages with ready-to-use web parts. The notification 302 also indicates that the new features cause the team site to look great on a mobile device. The notification 302 also assures the users that all their existing content will remain. The notification 302 includes a preview button 304 and a textual interface element 306. The user may cause a preview of an updated version of the team site, including the new features, to be presented in the user interface by selecting the preview button 304. The user may cause information regarding the new features to be displayed in the user interface by selecting the textual interface element 306. The information may include further description of the functionality of each new feature, an explanation of how to set up the new features, and an explanation of how to use the new features.

Figure 4:
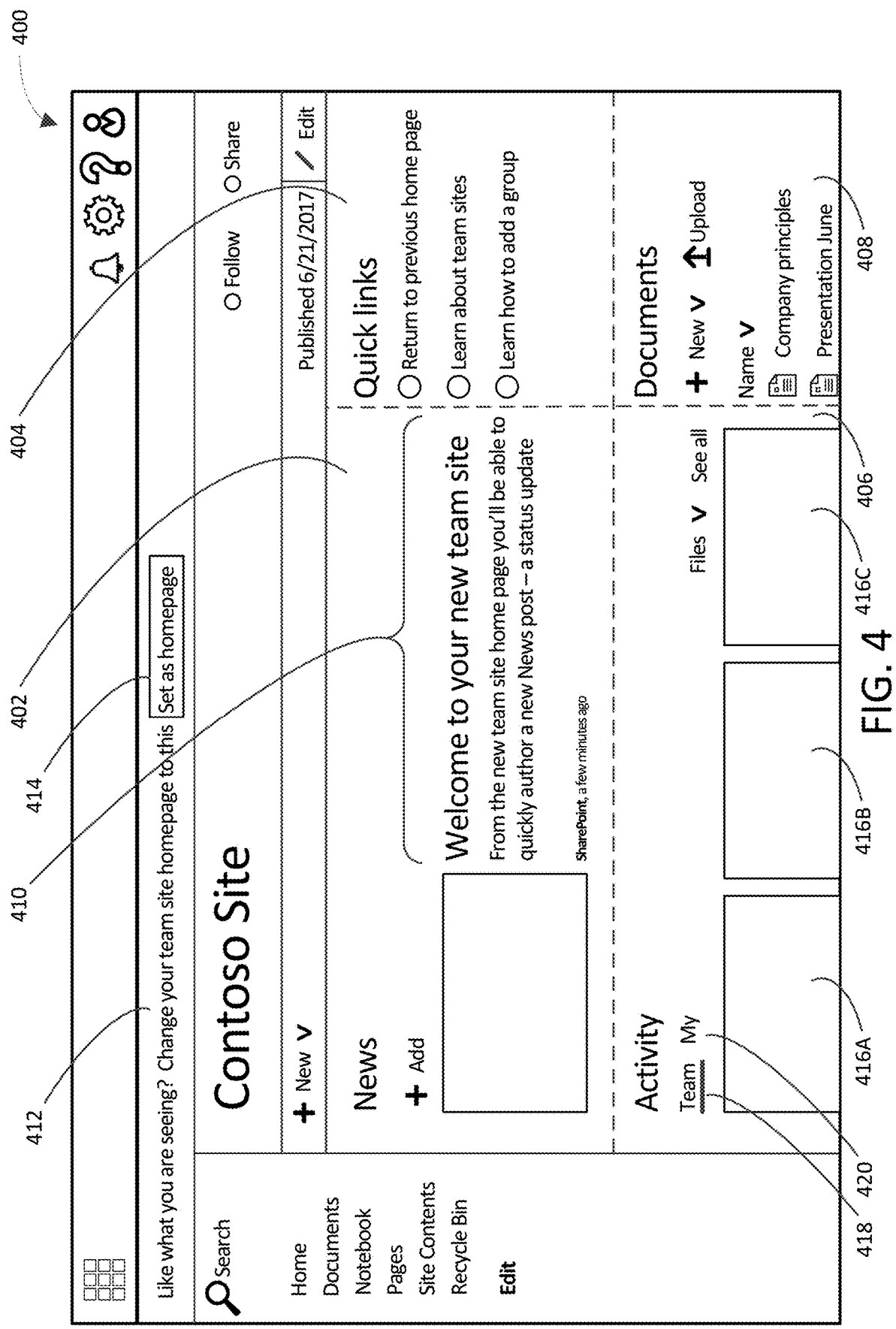

FIG. 4 is a screenshot 400 of an example result of selecting the preview button 304 shown in FIG. 3. The screenshot 400 shows a preview of the updated version of the team site. In particular, screenshot 400 shows an updated version of the homepage in the updated team site. As shown in the preview, the updated version of the homepage provides a "News" section, a "Quick Links" section, an "Activity" section, and a "Documents" section. Accordingly, the "News", "Quick Links," and "Activity" sections represent new features that are available to be incorporated into the homepage. The "News" section 402 includes text 410 that describes at least one feature that is provided by the "News" section. For instance, the text 410 explains that the user may author a new News post, which is a status update, via the "News" section. The "Activity" section 406 includes tiles 416A-416C that represent documents. The user may select whether the tiles 416A-416C are to represent documents created by other members of the team (e.g., by selecting a "Team" interface element 418) or documents created by the user (e.g., by selecting a "My" interface element 420). The "Team" interface element 418 is shown to be selected for non-limiting, illustrative purposes. The screenshot 400 further shows a banner 412 along the top of the homepage that offers to update the homepage to the updated version shown in the preview. The banner 412 includes a setting button 414 that may be selected by the user to cause the homepage to be updated to the updated version shown in the preview.

FIG. 5 is a screenshot 500 of the user interface showing the preview of the updated version of the homepage of the team site, as depicted in FIG. 4, in which an interface element 502 informs the user that the updated version of the team site is mobile friendly such that the information in the updated version of the team site may be accessed via a mobile device.

Figure 6:
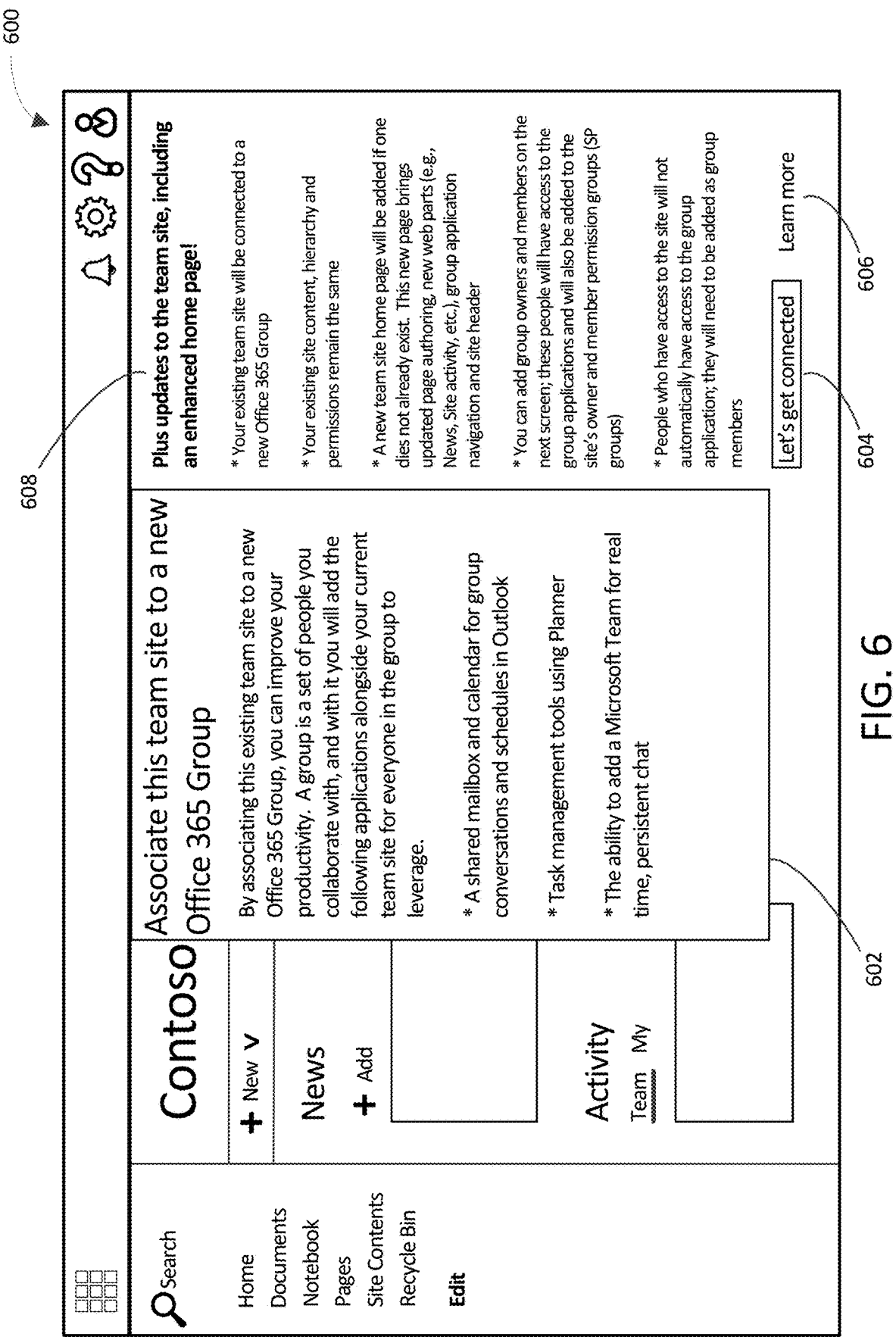

FIG. 6 is a screenshot 600 of an example result of selecting the setting button 414 shown in FIG. 4. The screenshot 600 shows the updated version of the team site (a.k.a. the "updated team site") in which the new features have been incorporated. In particular, screenshot 600 shows the updated version of the homepage (a.k.a. the "updated homepage") in the updated team site. A notification 602 is presented in the updated homepage. The notification 602 indicates that the updated team site may be associated with a new Office 365 Group. The notification 602 also provides information regarding functionality and benefits of associating the updated team site with a new Office 365 Group. Additional information 608 is presented in the updated homepage, providing further detail regarding the functionality and benefits of performing the association and assuring users that the content, hierarchy, and permissions of the team site will not changed as a result of the team site being associated with a new Office 365 Group. A connection button 604 and a textual interface element 606 are also presented in the updated homepage. The user may cause the team site to be associated with a new Office 365 Group by selecting the connection button 604. The user may cause information regarding association of a team site to an Office 365 Group to be displayed in the user interface by selecting the textual interface element 606.

Figure 7:
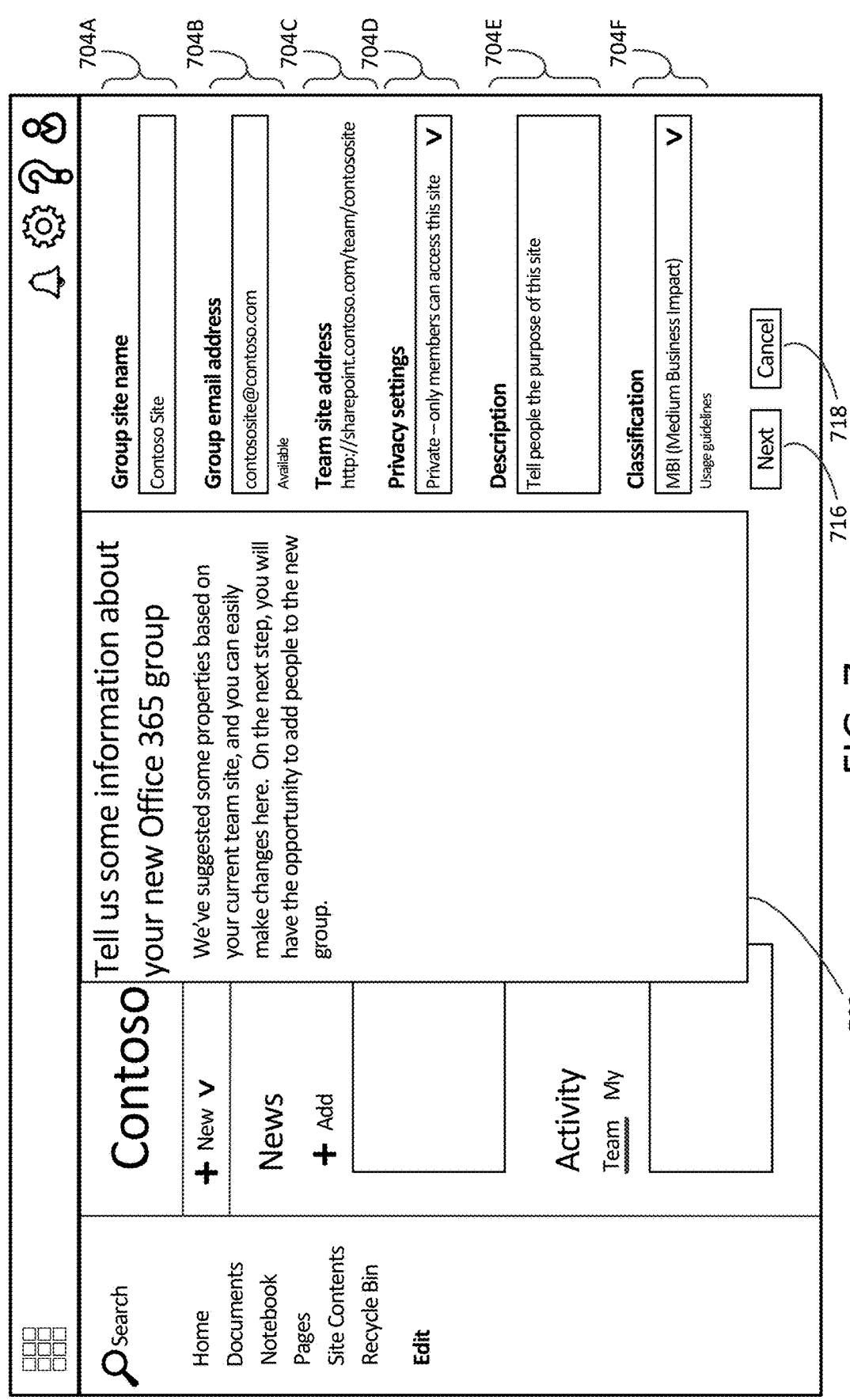

FIG. 7 is a screenshot 700 of an example result of selecting the connection button 604 shown in FIG. 6. The screenshot 700 shows the updated homepage in which an information block 702 is presented. The information block 702 includes a request for the user to provide some information about the new Office 365 Group that is to be created as a result of selecting the connection button 604. The information block 702 states that properties have been suggested for the new Office 365 Group based on the updated team site and that changes can be made to those properties. The information block 702 also indicates that the user will be given an opportunity to add people to the new Office 365 Group. The suggested properties are presented in property sections 704A-704F. Property section 704A suggests a group site name of "Contoso Site." Property section 704B suggests a group email address of "contososite at contoso dot com" and indicates that the suggested group email address is available. Property section 704C suggests a team site address of "http colon slash slash sharepoint dot contoso dot com slash team slash contososite." Property section 704D suggests a privacy setting of "Private," which allows only members of the team to access the team site. Property section 704D enables the user to change the privacy setting using a drop-down menu. Property section 704E includes a request for the user to provide a description of the purpose of the team site. Property section 704F suggests a classification of "(MBI) Medium Business Impact" for the team site. Property section 704F enables the user to change the classification using a drop-down menu. The user may proceed with the next step to associate the team site with a new Office 365 Group by selecting a "Next" button 716. The user may cancel the process of associating the team site with a new Office 365 Group by selecting a "Cancel" button 718.

Figure 8:
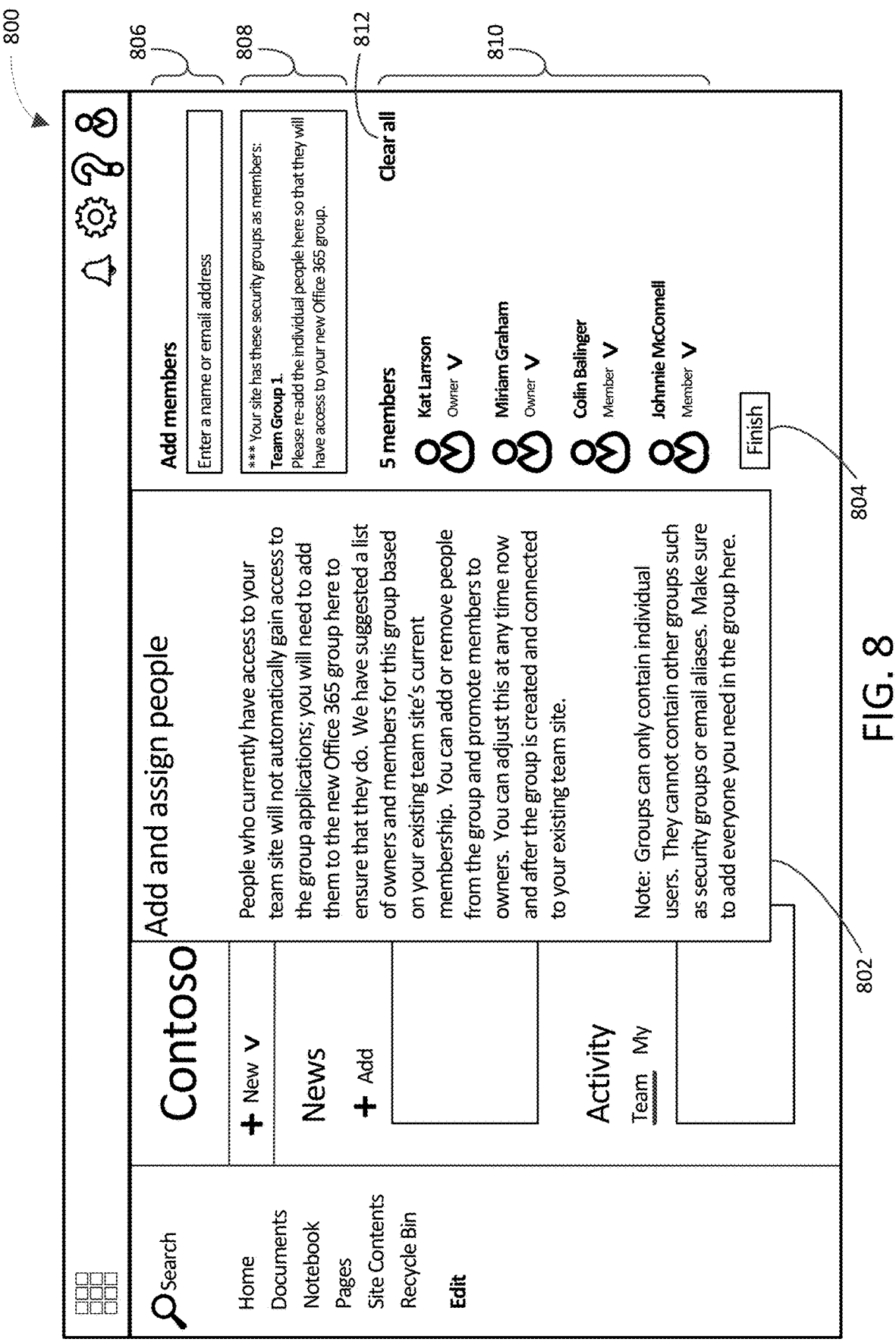

FIG. 8 is a screenshot 800 of an example result of selecting the "Next" button 716 shown in FIG. 7. The screenshot 800 shows the updated homepage in which an information block 802 is presented. The information block 802 indicates that people can be added and assigned to the new Office 365 Group. The information block 802 also indicates that people who have access to the team site will need to be added to the new Office 365 Group to gain access to the group applications. The information block 802 also indicates that a list of owners and members has been suggested for the new Office 365 Group and that the user can make changes. An adding section 806 is presented in the updated homepage to enable the user to add members to the new Office 365 Group. A warning section 808 indicates that the team site has a designated security group as a member and requires that the user add the individuals who are in the designated security group to the new Office 365 Group. The warning section 808 is shown in FIG. 8 to illustrate that mapping of old features to new features may not necessarily be automatic. For instance, user input may be necessary to map some old features to some new features (e.g., mapping the old feature of security groups to the new feature of Office 365 Group membership, as depicted in FIG. 8). A list of members 810 of the new Office 365 Group is presented in the updated homepage, and the user may clear all members from the new Office 365 Group by selecting a "Clear All" interface element 812. The user may finish the process of adding and assigning people to the new Office 365 Group by selecting a "Finish" button 804.

Figure 9:
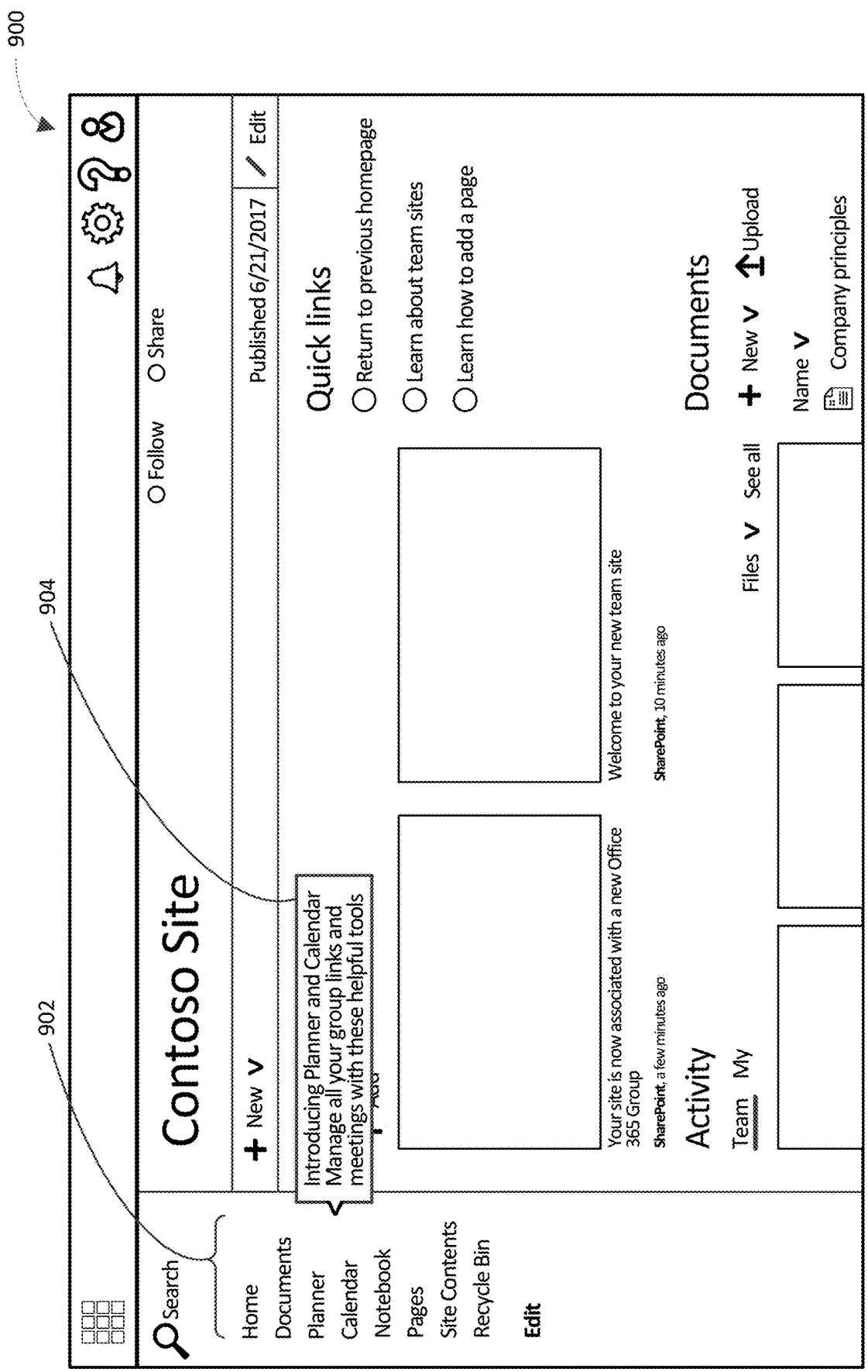

FIG. 9 is a screenshot 900 of an example result of selecting the "Finish" button 804 shown in FIG. 8. The screenshot 900 shows the updated homepage in which "Planner" and "Calendar" identifiers have been added to a list of identifiers 902 that may be selected by the user to access corresponding pages in the team site. For instance, the user may select the "Planner" identifier to access a planner of the team. The user may select the "Calendar" identifier to access a calendar of the team.

A notification 904 is presented in the updated homepage. The notification 904 indicates that the planner and the calendar of the team are accessible through the "Planner" and "Calendar" identifiers. The notification 904 also indicates that the user can manage group links and meetings via the planner and the calendar of the team.

FIGS. 10-11, 13, and 15 depict flowcharts 1000, 1100, 1300, and 1500 of example methods for updating a collaboration site in accordance with embodiments. FIGS. 12, 14, and 16 depict flowcharts 1200, 1400, and 1600 of example methods for providing an updated collaboration site as a template in accordance with embodiments. FIG. 17 depicts a flowchart 1700 of an example method for updating a template in accordance with an embodiment. Flowcharts 1000, 1100, 1200, 1300, 1400, 1500, 1600, and 1700 may be performed by intelligent update logic 110 shown in FIG. 1, for example. For illustrative purposes, flowcharts 1000, 1100, 1200, 1300, 1400, 1500, 1600, and 1700 are described with respect to computing system 1800 shown in FIG. 18. Computing system 1800 may include one or more of user systems 102A-102M, one or more of server(s) 106A-106N, or any combination thereof, though the scope of the example embodiments is not limited in this respect. Computing system 1800 includes intelligent update logic 1802, which is an example of intelligent update logic 110, according to an embodiment. As shown in FIG. 18, intelligent update logic 1802 includes site logic 1804, determination logic 1806, update logic 1808, mapping logic 1810, comparison logic 1812, and performance logic 1814. The site logic 1804 includes generation logic 1816 and provision logic 1818. Further structural and operational embodiments will be apparent to persons skilled in the relevant art(s) based on the discussion regarding flowcharts 1000, 1100, 1200, 1300, 1400, 1500, 1600, and 1700.

Figure 10:
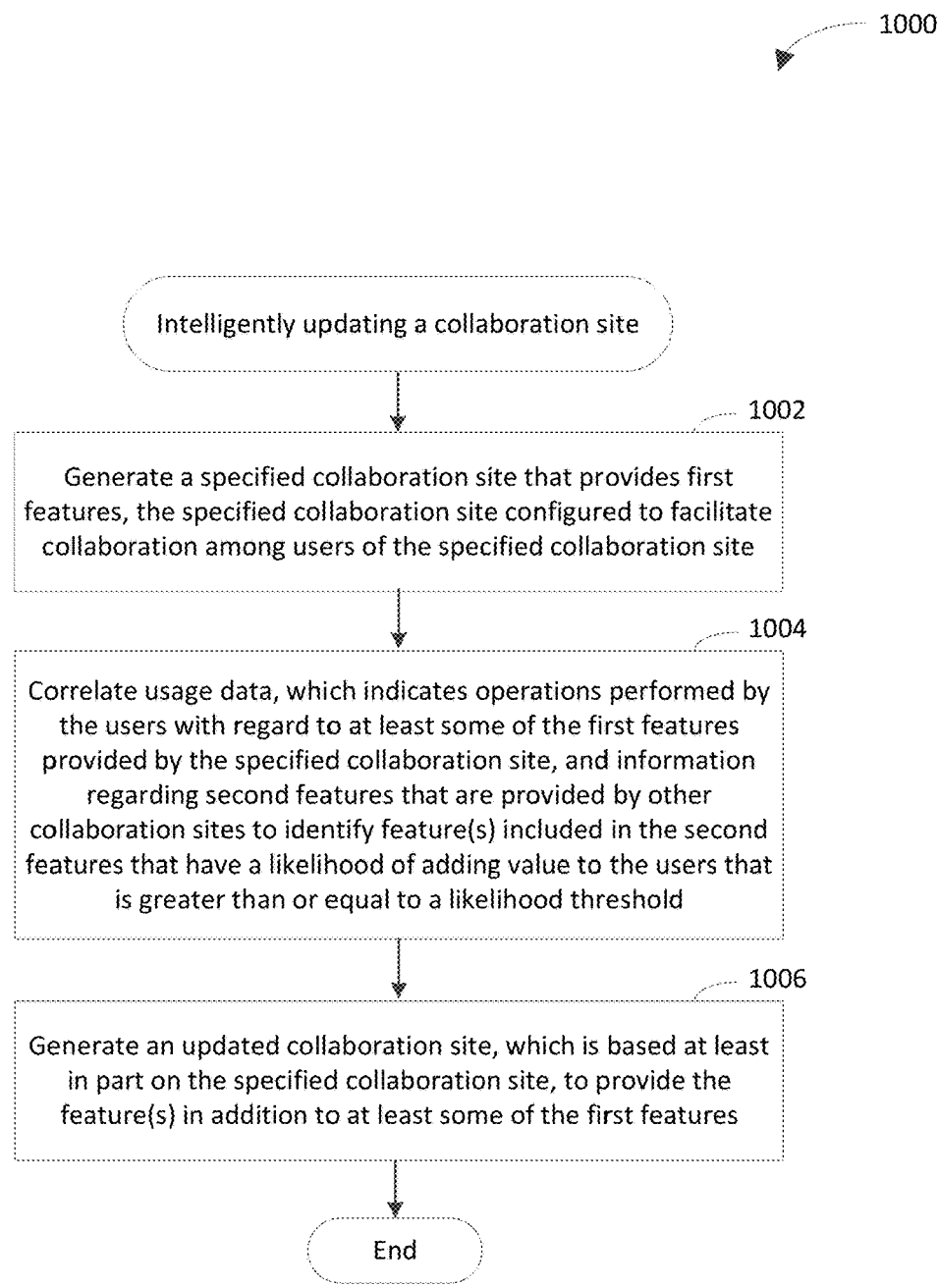

As shown in FIG. 10, the method of flowchart 1000 begins at step 1002. In step 1002, a specified collaboration site that provides first features is generated. The specified collaboration site is configured to facilitate collaboration among users of the specified collaboration site. In an example implementation, the generation logic 1816 generates the specified collaboration site. The generation logic 1816 may provide the specified collaboration site to the provision logic 1818 so that the provision logic 1818 may send the specified collaboration site to the users. For instance, collaboration site(s) 1840 may include the specified collaboration site.

At step 1004, usage data, which indicates operations performed by the users with regard to at least some of the first features provided by the specified collaboration site, and information regarding second features that are provided by other collaboration sites (i.e., collaboration sites other than the specified collaboration site) are correlated to identify feature(s) included in the second features that have a likelihood of adding value to the users that is greater than or equal to a likelihood threshold. In an example implementation, the determination logic 1806 correlates usage data 1828 and feature information 1824. The usage data 1828 indicates the operations performed by the users with regards to at least some of the first features. The feature information 1824 includes the information regarding the second features. The determination logic 1806 may generate feature indicator(s) 1834 to specify the feature(s), which have the likelihood of adding value to the users that is greater than or equal to the likelihood threshold.

In an example embodiment, the information regarding the second features includes second usage data. The second usage data indicates operations performed by users of the other collaboration sites with regard to the second features. In accordance with this embodiment, a correlation of the usage data and the information regarding the second features may indicate that the users of the other collaboration sites who perform operations with regard to one or more of the first features tend to (e.g., are statistically likely to) perform operations with regard to at least one of the feature(s) included in the second features. For instance, a determination may be made that the users of the other collaboration sites who perform operations with regard to one or more of the first features are statistically likely to perform operations with regard to at least one of the feature(s) included in the second features based at least in part on an extent (e.g., number of times or frequency) to which those users perform operations with regard to at least one of the feature(s) being greater than or equal to a threshold extent. In further accordance with this embodiment, a determination may be made that the feature(s) have the likelihood of adding value to the users of the specified collaboration site based at least in part on the tendency of the users of the other collaboration sites who perform operations with regard to one or more of the first features to perform operations with regard to at least one of the feature(s).

In another example embodiment, correlating the usage data and the information regarding the second features at step 1004 includes using heuristics and/or machine learning to correlate the usage data and the information regarding the second features. In an aspect of this embodiment, correlating the usage data and the information regarding the second features at step 1004 may include iteratively correlating the usage data and the information regarding the second features over successive time periods in accordance with a machine learning technique to identify the one or more features having the likelihood of adding value to the users that is greater than or equal to the likelihood threshold.

At step 1006, an updated collaboration site, which is based at least in part on the specified collaboration site, is generated to provide the feature(s) in addition to at least some of the first features. For instance, the specified collaboration site may be rebuilt to provide the feature(s), and the rebuilt site may serve as the updated collaboration site. In an example, the updated collaboration site may be automatically generated. In another example, the updated collaboration site may be generated based at least in part on the feature(s) having the likelihood of adding value to the users that is greater than or equal to the likelihood threshold. In an example implementation, the generation logic 1816 generates the updated collaboration site. The generation logic 1816 may generate the updated collaboration site in response to receipt of the feature indicator(s) 1834. For instance, the generation logic 1816 may generate the updated collaboration site based at least in part on the feature indicator(s) 1834 specifying the feature(s), which have the likelihood of adding value to the users that is greater than or equal to the likelihood threshold. The generation logic 1816 may provide the updated collaboration site to the provision logic 1818 so that the provision logic 1818 may send the updated collaboration site to the users. For instance, collaboration site(s) 1840 may include the updated collaboration site.

In an example embodiment, generating the updated collaboration site at step 1006 includes tailoring the updated collaboration site to the users in a specified organization based at least in part on a determination that a specified feature that is included in the feature(s) has a likelihood of adding value to the users in the specified organization that is greater than or equal to the likelihood threshold. In an aspect of this embodiment, generating the updated collaboration site at step 1006 includes tailoring the updated collaboration site to the users in a specified division of the specified organization based at least in part on a determination that the specified feature has a likelihood of adding value to the users in the specified division that is greater than or equal to the likelihood threshold.

In another example embodiment, generating the updated collaboration site at step 1006 includes generating multiple versions of the updated collaboration site that are tailored to the respective users based at least in part on respective instances of information regarding the respective users.

In yet another example embodiment, the information regarding the second features indicates (a) a proportion of users of each of the other collaboration sites who open a file on the respective other collaboration site, (b) a proportion of the users of each of the other collaboration sites who share a file on the respective other collaboration site, and/or (c) a proportion of the users of each of the other collaboration sites who share the respective other collaboration site.

In still another example embodiment, the information regarding the second features indicates a number of files dirtied in each of the other collaboration sites. To dirty a file means to change the file and then save the changed file.

In some example embodiments, one or more steps 1002, 1004, and/or 1006 of flowchart 1000 may not be performed. Moreover, steps in addition to or in lieu of steps 1002, 1004, and/or 1006 may be performed. For instance, in an example embodiment, generating the updated collaboration site at step 1006 includes generating the updated collaboration site to provide a specified feature of the feature(s) in lieu of a designated feature of the first features. In accordance with this embodiment, the method of flowchart 1000 further includes mapping attributes of the specified feature to attributes of the designated feature. In an example implementation, the mapping logic 1810 maps the attributes of the specified feature to the attributes of the designated feature. For example, the provision logic 1818 may generate attribute information 1846, which indicates attributes of the first features and attributes of the second features. In accordance with this example, the mapping logic 1810 may analyze the attribute information 1846 to map the attributes of the specified feature to the attributes of the designated feature.

In another example embodiment, the method of flowchart 1000 further includes providing a recommendation that recommends replacing the specified collaboration site with the updated collaboration site based at least in part on the feature(s) having the likelihood of adding value to the users that is greater than or equal to the likelihood threshold. In an example implementation, provision logic 1818 provides the recommendation. For instance, the notification 1838 may include the recommendation. In an aspect of this embodiment, the generation logic 1816 may generate the recommendation based at least in part on the feature(s) having the likelihood of adding value to the users that is greater than or equal to the likelihood threshold. The generation logic 1816 may provide the recommendation to the provision logic 1818 so that the provision logic 1818 may provide the recommendation (e.g., to the users of the specified collaboration site).

In yet another example embodiment, the method of flowchart 1000 further includes comparing an extent to which each of the other collaboration sites is used by users of the respective other collaboration site to a use threshold to determine a subset of the other collaboration sites such that the extent to which each other collaboration site in the subset is used by the users of the respective other collaboration site exceeds the use threshold. For example, the comparison logic 1812 may compare the extent to which each of the other collaboration sites is used by users of the respective other collaboration site to the use threshold. In an aspect of this example, other collaboration site information 1830 may indicate (e.g., specify) the extent to which each of the other collaboration sites is used by the users of the respective other collaboration site. In accordance with this aspect, the comparison logic 1812 may review the other collaboration site information 1830 to determine the extent to which each of the other collaboration sites is used by the users of the respective other collaboration site. The comparison logic 1812 may generate subset information 1826, which indicates each of the other collaboration sites that is included in the subset.

In accordance with this embodiment, correlating the usage data and the information regarding the second features at step 1004 includes correlating the usage data, the information regarding the second features, and information indicating which of the other collaboration sites are included in the subset to identify the feature(s) having the likelihood of adding value to the users of the specified collaboration site that is greater than or equal to the likelihood threshold. For instance, the determination logic 1806 may correlate the usage data 1828, the information regarding the second features, and the subset information 1826 to identify the feature(s) having the likelihood of adding value to the users of the specified collaboration site that is greater than or equal to the likelihood threshold. The subset of the other collaboration sites includes at least one of the other collaboration sites. For example, the subset may include fewer than all of the other collaboration sites. In another example, the subset may include all of the other collaboration sites. The extent to which each of the other collaboration sites is used by users of the respective other collaboration site may indicate a number of times that the respective other collaboration site is visited by those users, a number of operations performed with regard to the second plurality of features, a cumulative duration of time that the respective other collaboration site is used by those users, a number of those users (e.g., a number of distinct visitors to the respective other collaboration site).

In still another example embodiment, the method of flowchart 1000 further includes comparing a retention rate of each of the other collaboration sites to a retention threshold to determine a subset of the other collaboration sites such that the retention rate of each other collaboration site in the subset exceeds the retention threshold. The retention rate of each of the other collaboration sites indicates a proportion of users of the respective other collaboration site that visits the respective other collaboration site at least once during a first designated time period and at least once during a second designated time period that is consecutive with the first designated time period. For example, the comparison logic 1812 may compare the retention rate of each of the other collaboration sites to the retention threshold. In accordance with this example, the other collaboration site information 1830 may indicate the retention rate of each of the other collaboration sites. The comparison logic 1812 may generate subset information 1826, which indicates each of the other collaboration sites that is included in the subset.

In accordance with this embodiment, correlating the usage data and the information regarding the second features at step 1004 includes correlating the usage data, the information regarding the second features, and information indicating which of the other collaboration sites are included in the subset to identify the feature(s) having the likelihood of adding value to the users of the specified collaboration site that is greater than or equal to the likelihood threshold. For instance, the determination logic 1806 may correlate the usage data 1828, the information regarding the second features, and the subset information 1826 to identify the feature(s) having the likelihood of adding value to the users of the specified collaboration site that is greater than or equal to the likelihood threshold. A duration of the first designated time period and a duration of the second designated time period may be same or different. For instance, the first and second designated time periods may be consecutive days, consecutive weeks, or consecutive months.

In another example embodiment, the method of flowchart 1000 further includes replacing the specified collaboration site with the updated collaboration site. For instance, the generation logic 1816 may replace the specified collaboration site with the updated collaboration site. In an aspect this embodiment, the method of flowchart 1000 further includes incorporating a description of functionality associated with the feature(s) into the updated collaboration site to facilitate use of the feature(s) by users of the updated collaboration site. For instance, the generation logic 1816 may incorporate the description of the functionality into the updated collaboration site. In another aspect of this embodiment, the method of flowchart 1000 further includes incorporating an interface element into the updated collaboration site. In accordance with this aspect, the interface element enables users of the updated collaboration site to replace the updated collaboration site with the specified collaboration site. For instance, selection of the interface element may initiate reversal of the update that replaced the specified collaboration site with the updated collaboration site. In an example, the generation logic 1816 may incorporate the interface element into the updated collaboration site.

In yet another example embodiment, the method of flowchart 1000 further includes presenting a preview of the updated collaboration site for viewing by one or more users of the specified collaboration site. In an example implementation, the provision logic 1818 presents a preview 1844 of the updated collaboration site. For example, the generation logic 1816 may generate the preview 1844. In accordance with this example, the generation logic 1816 may provide the preview 1844 to the provision logic 1818 so that the provision logic 1818 may present the preview 1844. In accordance with this embodiment, the method of flowchart 1000 further includes presenting an offer to the one or more users to replace the specified collaboration site with the updated collaboration site. In an example implementation, the provision logic 1818 presents the offer to the one or more users. The notification 1838 may include the offer. For example, the generation logic 1816 may generate the offer. In accordance with this example, the generation logic 1816 may provide the offer to the provision logic 1818 for presentation to the one or more users.

In an aspect of this embodiment, the one or more users include multiple users. In accordance with this aspect, presenting the offer includes soliciting a vote from each of the multiple users. Each vote indicates whether the respective user is in favor of replacing the specified collaboration site with the updated collaboration site. In further accordance with this aspect, presenting the offer further includes determining whether to replace the specified collaboration site with the updated collaboration site based at least in part on votes that are received from the multiple users. For example, the generation logic 1816 may receive a response 1820 from the multiple users. In accordance with this example, the response 1820 may include the votes.

In another aspect of this embodiment, presenting the offer includes suggesting that each of the one or more users informs an entity, which has authority to authorize replacing the collaboration site with the updated collaboration site, whether the respective user is in favor of replacing the collaboration site with the updated collaboration site. For instance, the entity may be an owner of the specified collaboration site.

In still another example embodiment, generating the updated collaboration site at step 1006 includes generating a plurality of updated collaboration sites. Each updated collaboration site is based at least in part on the specified collaboration site and provides at least one respective feature in addition to at least some of the first features. Each updated collaboration site is generated based at least in part on the at least one respective feature having the likelihood of adding value to the users that is greater than or equal to the likelihood threshold. In accordance with this embodiment, the method of flowchart 1000 further includes presenting a preview of each of the plurality of updated collaboration sites for viewing by person(s) associated with the specified collaboration site. The person(s) may include one or more users of the specified collaboration site and/or an owner of the specified collaboration site. In an example implementation, the provision logic 1818 may present a preview 1844 of each of the plurality of updated collaboration sites. In further accordance with this embodiment, the method of flowchart 1000 further includes presenting an offer to the person(s) to replace the specified collaboration site with one of the plurality of updated collaboration sites that is to be selected by the person(s). In an example implementation, the provision logic 1818 may present the offer to the person(s).

Figure 11:
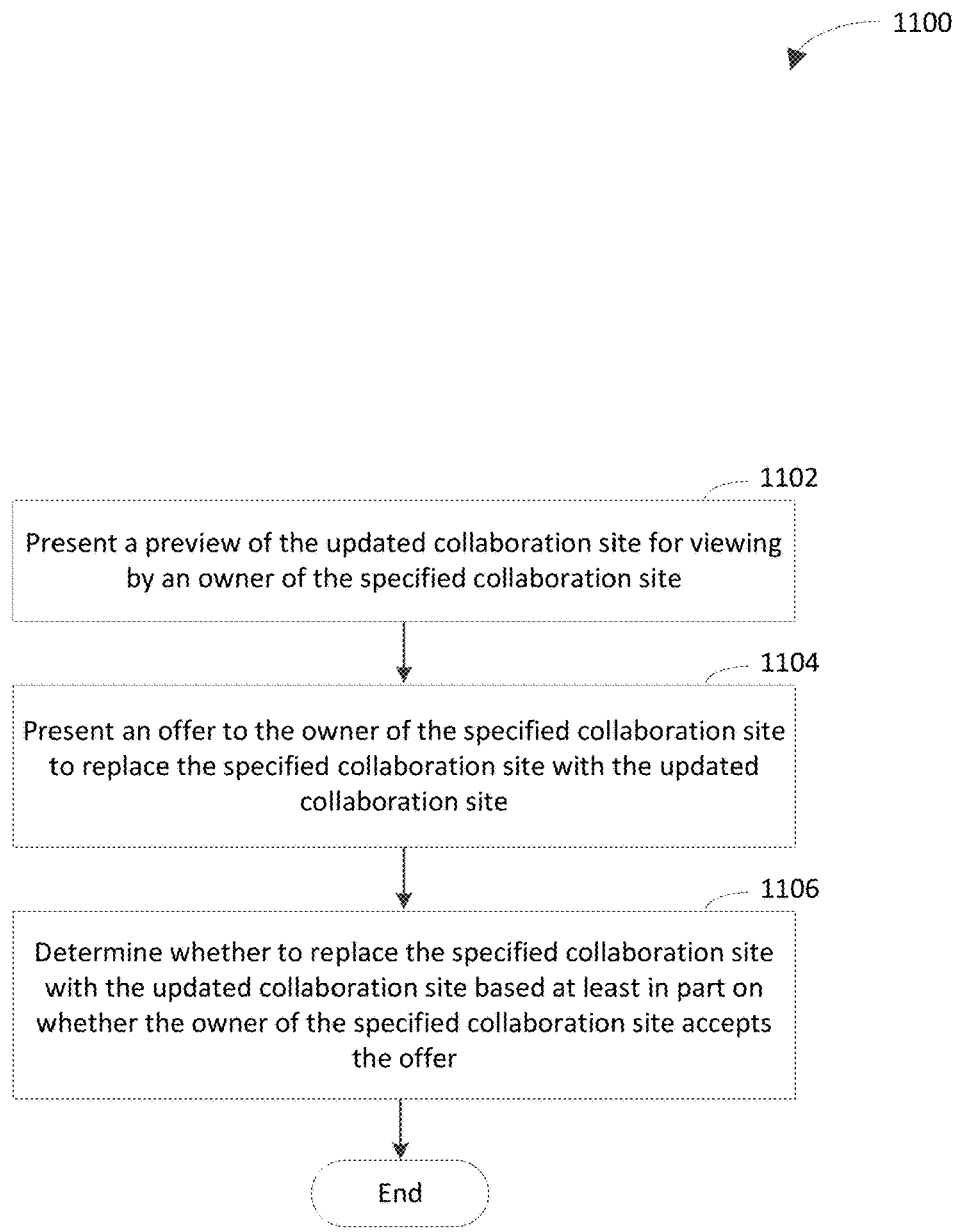

In another example embodiment, the method of flowchart 1000 further includes one or more of the steps shown in flowchart 1100 of FIG. 11. As shown in FIG. 11, the method of flowchart 1100 starts at step 1102. In step 1102, a preview of the updated collaboration site is presented for viewing by an owner of the specified collaboration site. In an example implementation, the provision logic 1818 presents a preview 1844 of the updated collaboration site.

At step 1104, an offer to replace the specified collaboration site with the updated collaboration site is presented to the owner of the specified collaboration site. In an example implementation, the provision logic 1818 presents the offer.

At step 1106, a determination is made whether to replace the specified collaboration site with the updated collaboration site based at least in part on whether the owner of the specified collaboration site accepts the offer. In an example implementation, the generation logic 1816 determines whether to replace the specified collaboration site with the updated collaboration site. For example, the generation logic 1816 may make the determination based at least in part on receipt of the response 1820. In accordance with this example, the response 1820 may include an acceptance of the offer from the owner.

In an example embodiment, the method of flowchart 1000 further includes one or more of the steps shown in flowchart 1200 of FIG. 12. As shown in FIG. 12, the method of flowchart 1200 starts at step 1202. In step 1202, a first performance metric associated with the specified collaboration site is determined. The first performance metric is measured during a first period of time. In an example implementation, the performance logic 1814 determines the first performance metric. For example, the performance logic 1814 may receive performance information 1832, which includes information regarding performance of the specified collaboration site. For instance, the information regarding the performance of the specified collaboration site may indicate operations performed with regard to the specified collaboration site. The information regarding the performance of the specified collaboration site may specify a time and/or an order in which each of the operations is performed. The information regarding the performance of the specified collaboration site may cross-reference each operation with (a) the time and/or order of the operation, (b) the user who performed the operation, and (c) an operation category (e.g., open file, dirty file, share file, or share site) with which the operation is associated. In accordance with this example, the performance logic 1814 may determine the first performance metric based at least in part on the performance information 1832. For instance, the performance logic 1814 may analyze the information regarding the performance of the specified collaboration site that pertains to the first period of time to calculate the first performance metric. The first performance metric may indicate an extent to which the specified collaboration site is used during the first period; a retention rate during the first period; a proportion of the users of the specified collaboration site who open a file during the first period; a proportion of the users who share a file during the first period; a proportion of the users who share the specified collaboration site during the first period; a number of distinct visitors to the specified collaboration site during the first period; and/or a number of files dirties by users of the specified collaboration site during the first period.

At step 1204, a second performance metric associated with the updated collaboration site is determined. The second performance metric is measured during a second period of time that follows the first period of time. In an example implementation, the performance logic 1814 determines the second performance metric. For example, the performance logic 1814 may determine the second performance metric based at least in part on the performance information 1832. For instance, the performance logic 1814 may analyze the information regarding the performance of the specified collaboration site that pertains to the second period of time to calculate the second performance metric. The second performance metric may indicate an extent to which the specified collaboration site is used during the second period; a retention rate during the second period; a proportion of the users of the specified collaboration site who open a file during the second period; a proportion of the users who share a file during the second period; a proportion of the users who share the specified collaboration site during the second period; a number of distinct visitors to the specified collaboration site during the second period; and/or a number of files dirties by users of the specified collaboration site during the second period. The performance logic 1814 may generate metric information 1836 to indicate the first and second performance metrics.

At step 1206, the first performance metric and the second performance metric are compared to determine whether the second performance metric is greater than the first performance metric by an amount that exceeds a difference threshold. In an example implementation, the comparison logic 1812 compares the first and second performance metrics. For instance, the comparison logic 1812 may analyze the metric information 1836 to determine the first and second performance metrics. In accordance with this implementation, the comparison logic 1812 may be configured to generate a template instruction in response to the second performance metric being greater than the first performance metric by an amount that exceeds the difference threshold. For instance, the template instruction 1822 may specify that the updated collaboration site is to be provided as a template.

At step 1208, the updated collaboration site is provided as a template for creation of a new collaboration site based at least in part on a determination that the second performance metric is greater than the first performance metric by an amount that exceeds the difference threshold. In an example implementation, provision logic 1818 provides the updated collaboration site as the template. For example, template(s) 1842 may include the template. In another example, the provision logic 1818 may provide the updated collaboration site as the template in response to receipt of the template instruction 1822. For instance, the provision logic 1818 may provide the updated collaboration site as the template in response to the template instruction 1822 specifying that the updated collaboration site is to be provided as a template.

Figure 13:
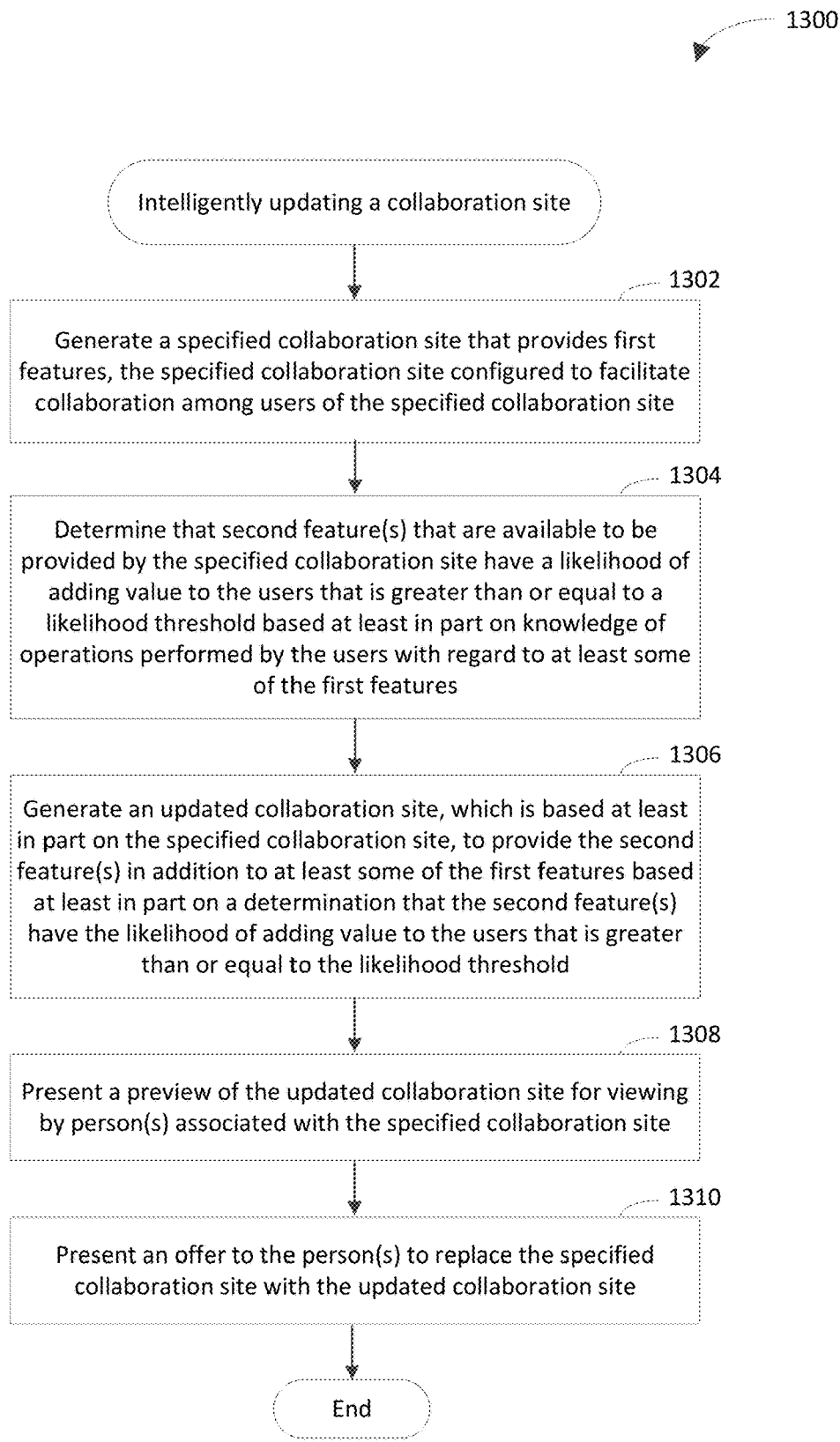

As shown in FIG. 13, the method of flowchart 1300 begins at step 1302. In step 1302, a specified collaboration site that provides first features is generated. The specified collaboration site is configured to facilitate collaboration among users of the specified collaboration site. In an example implementation, the generation logic 1816 generates the specified collaboration site.

At step 1304, a determination is made that second feature(s) that are available to be provided by the specified collaboration site have a likelihood of adding value to the users that is greater than or equal to a likelihood threshold based at least in part on knowledge of operations performed by the users with regard to at least some of the first features. In an example implementation, the determination logic 1806 determines that the second feature(s) have the likelihood of adding value to the users that is greater than or equal to the likelihood threshold.

In an example embodiment, determining that the second feature(s) have the likelihood of adding value to the users that is greater than or equal to the likelihood threshold at step 1304 is based at least in part on knowledge of (a) a proportion of the users who open a file on the specified collaboration site, (b) a proportion of the users who share a file on the specified collaboration site, (c) a proportion of the users who dirty a file on the specified collaboration site, and/or (d) a proportion of the users who share the specified collaboration site.

At step 1306, an updated collaboration site, which is based at least in part on the specified collaboration site, is generated to provide the second feature(s) in addition to at least some of the first features based at least in part on a determination that the second feature(s) have the likelihood of adding value to the users that is greater than or equal to the likelihood threshold. In an example implementation, the generation logic 1816 generates the updated collaboration site. For instance, the generation logic 1816 may automatically generate the updated collaboration site.

In an example embodiment, generating the updated collaboration site at step 1306 includes tailoring the updated collaboration site to the users in a specified organization based at least in part on a determination that a specified feature that is included in the second feature(s) has a likelihood of adding value to the users in the specified organization that is greater than or equal to the likelihood threshold. In an aspect of this embodiments, step 1306 may include tailoring the updated collaboration site to the users in a specified division of the specified organization based at least in part on a determination that a specified feature that is included in the second feature(s) has a likelihood of adding value to the users in the specified division of the specified organization that is greater than or equal to the likelihood threshold.

In another example embodiment, generating the updated collaboration site at step 1306 includes generating multiple versions of the updated collaboration site that are tailored to the respective users based at least in part on respective instances of information regarding the respective users.

At step 1308, a preview of the updated collaboration site is presented for viewing by person(s) associated with the specified collaboration site. For instance, the person(s) may include one or more of the users of the specified collaboration site and/or an owner of the specified collaboration site. In an example implementation, provision logic 1818 provides a preview 1844 of the updated collaboration site.

At step 1310, an offer to replace the specified collaboration site with the updated collaboration site is presented to the person(s). In an example implementation, provision logic 1818 presents the offer.

In an example embodiment, the person(s) include multiple designated users of the specified collaboration site. In accordance with this embodiment, presenting the offer at step 1310 includes soliciting a vote from each of the designated users. Each vote indicates whether the respective designated user is in favor of replacing the specified collaboration site with the updated collaboration site. In further accordance with this embodiment, presenting the offer at step 1310 further includes determining whether to replace the specified collaboration site with the updated collaboration site based at least in part on votes that are received from the designated users.

In another example embodiment, the person(s) include one or more users of the specified collaboration site. In accordance with this embodiment, presenting the offer at step 1310 includes suggesting that each of the one or more users informs an entity, which has authority to authorize replacing the specified collaboration site with the updated collaboration site, whether the respective user is in favor of replacing the specified collaboration site with the updated collaboration site. For instance, the entity may be an owner of the specified collaboration site.

In yet another example embodiment, generating the updated collaboration site at step 1306 includes generating a plurality of updated collaboration sites. Each updated collaboration site is based at least in part on the specified collaboration site and provides at least one respective feature in addition to at least some of the first features. Each updated collaboration site is generated based at least in part on the at least one respective feature having the likelihood of adding value to the users that is greater than or equal to the likelihood threshold. In accordance with this embodiment, presenting the preview at step 1308 includes presenting a preview of each of the plurality of updated collaboration sites for viewing by the person(s) associated with the specified collaboration site. In further accordance with this embodiment, presenting the offer at step 1310 includes presenting the offer to the person(s) to replace the specified collaboration site with one of the plurality of updated collaboration sites that is to be selected by the one or more persons.

In some example embodiments, one or more steps 1302, 1304, 1306, 1308, and/or 1310 of flowchart 1300 may not be performed. Moreover, steps in addition to or in lieu of steps 1302, 1304, 1306, 1308, and/or 1310 may be performed. For instance, in an example embodiment, presenting the preview at step 1308 includes presenting the preview of the updated collaboration site for viewing by an owner of the specified collaboration site. In accordance with this embodiment, presenting the offer at step 1310 includes presenting the offer to the owner of the specified collaboration site to replace the specified collaboration site with the updated collaboration site. In further accordance with this embodiment, the method of flowchart 1300 further includes determining whether to replace the specified collaboration site with the updated collaboration site based at least in part on whether the owner of the specified collaboration site accepts the offer. For instance, the generation logic 1816 may determine whether to replace the specified collaboration site with the update the collaboration site.

In another example embodiment, generating the updated collaboration site at step 1306 includes generating the updated collaboration site to provide a specified feature of the second feature(s) in lieu of a designated feature of the first features. In accordance with this embodiment, the method of flowchart 1300 further includes mapping attributes of the specified feature to attributes of the designated feature. For instance, the mapping logic 1810 may map the attributes of the specified feature to the attributes of the designated feature.

In yet another example embodiment, the method of flowchart 1300 further includes replacing the specified collaboration site with the updated collaboration site. For instance, the generation logic 1816 may replace the specified collaboration site with the updated collaboration site. In an aspect of this embodiment, the method of flowchart 1300 may further include incorporating a description of functionality associated with the second feature(s) into the updated collaboration site to facilitate use of the second feature(s) by users of the updated collaboration site. For instance, the generation logic 1816 may incorporate the description of the functionality into the updated collaboration site. In another example of this embodiment, the method of flowchart 1300 may further include incorporating an interface element into the updated collaboration site. The interface element enables users of the updated collaboration site to replace the updated collaboration site with the specified collaboration site. For instance, the generation logic 1816 may incorporate the interface element into the updated collaboration site.

In still another example embodiment, the method of flowchart 1300 further includes one or more of the steps shown in flowchart 1400 of FIG. 14. As shown in FIG. 14, the method of flowchart 1400 starts at step 1402. In step 1402, the specified collaboration site is replaced with the updated collaboration site based at least in part on acceptance(s) of the offer that is presented to the person(s). The acceptance(s) are received from at least one of the person(s). In an example implementation, the generation logic 1816 replaces the specified collaboration site with the updated collaboration site.

At step 1404, a first performance metric associated with the specified collaboration site is determined. The first performance metric is measured before the specified collaboration site is replaced with the updated collaboration site. In an example implementation, the performance logic 1814 determines the first performance metric.

At step 1406, a second performance metric associated with the updated collaboration site is determined. The second performance metric is measured in response to the specified collaboration site being replaced with the updated collaboration site. In an example implementation, the performance logic 1814 determines the second performance metric.

At step 1408, the first performance metric and the second performance metric are compared to determine whether the second performance metric is greater than the first performance metric by an amount that exceeds a difference threshold. In an example implementation, comparison logic 1812 compares the first performance metric and the second performance metric.

At step 1410, the updated collaboration site is provided as a template for creation of a new collaboration site based at least in part on a determination that the second performance metric is greater than the first performance metric by an amount that exceeds the difference threshold. In an example implementation, the provision logic 1818 provides the updated collaboration site as the template.

Figure 15:
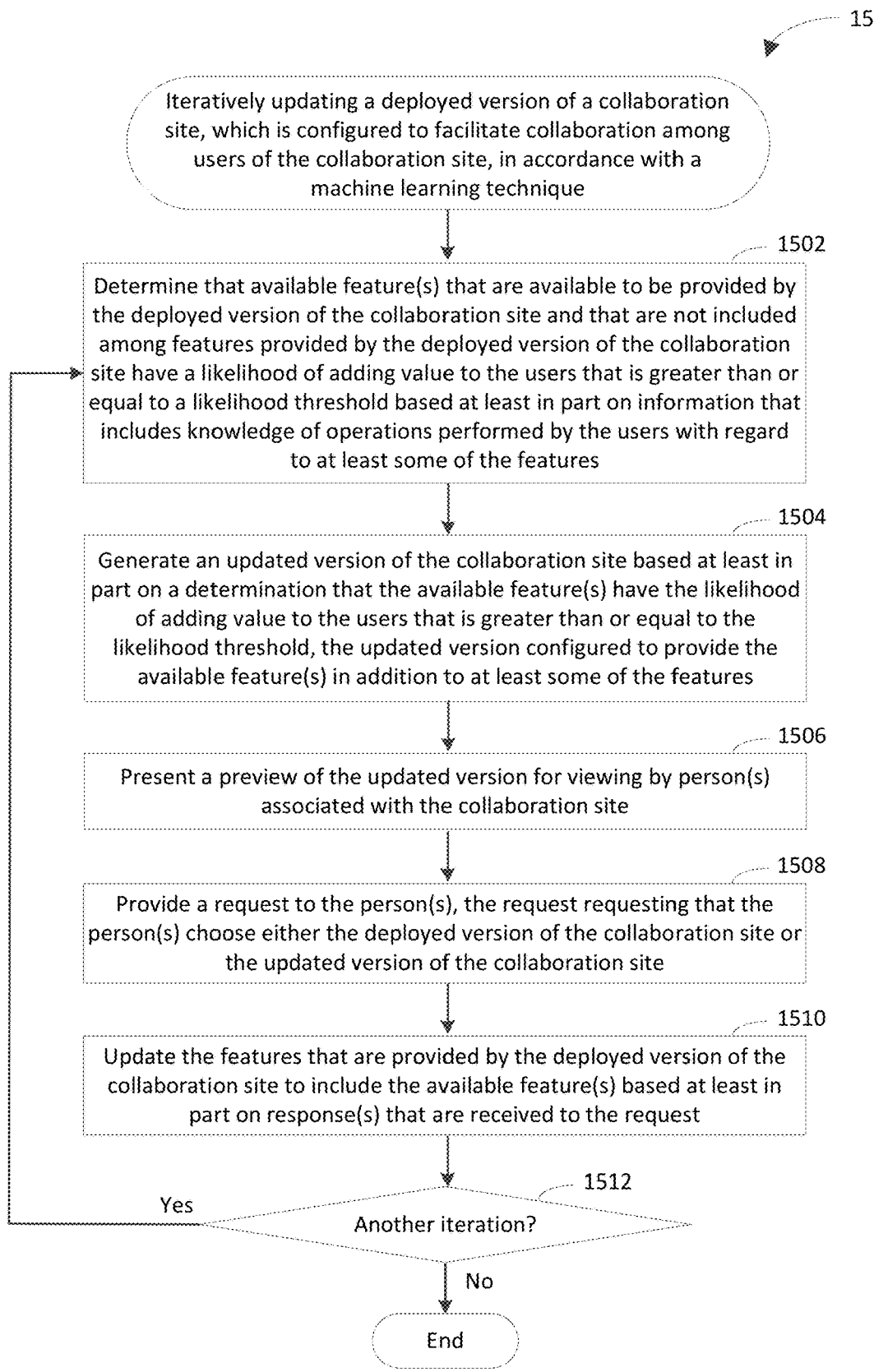

As shown in FIG. 15, the method of flowchart 1500 is directed to iteratively updating a deployed version of a collaboration site, which is configured to facilitate collaboration among users of the collaboration site, in accordance with a machine learning technique. For instance, the intelligent update logic 1802 may iteratively update the deployed version of the collaboration site. Each iteration of a plurality of iterations that update the deployed version of the collaboration site includes steps 1502, 1504, 1506, 1508, 1510, and 1512. At step 1502, a determination is made that available feature(s) that are available to be provided by the deployed version of the collaboration site and that are not included among features provided by the deployed version of the collaboration site have a likelihood of adding value to the users that is greater than or equal to a likelihood threshold based at least in part on information that includes knowledge of operations performed by the users with regard to at least some of the features. In an example implementation, determination logic 1806 determines that the available feature(s) have the likelihood of adding value to the users that is greater than or equal to the likelihood threshold.

At step 1504, an updated version of the collaboration site is generated (e.g., automatically generated) based at least in part on a determination that the available feature(s) have the likelihood of adding value to the users that is greater than or equal to the likelihood threshold, the updated version configured to provide the available feature(s) in addition to at least some of the features. In an example implementation, the generation logic 1816 generates the updated version of the collaboration site.

In an example embodiment, generating the updated version of the collaboration site at step 1504 includes tailoring the updated version of the collaboration site to the users in a specified organization based at least in part on a determination that a specified feature of the available feature(s) has a likelihood of adding value to the users in the specified organization that is greater than or equal to the likelihood threshold. In an aspect of this embodiment, generating the updated version of the collaboration site at step 1504 includes tailoring the updated version of the collaboration site to the users in a specified division of the specified organization based at least in part on a determination that a specified feature of the available feature(s) has a likelihood of adding value to the users in the specified division of the specified organization that is greater than or equal to the likelihood threshold.

In another example embodiment, generating the updated version of the collaboration site at step 1504 includes generating a plurality of updated versions of the collaboration site that are tailored to the respective users based at least in part on respective instances of information regarding the respective users.

At step 1506, a preview of the updated version is presented for viewing by person(s) associated with the collaboration site. For instance, the person(s) may include the users of collaboration site and/or an owner of the collaboration site. In an example implementation, the provision logic 1818 presents a preview 1844 of the updated version of the collaboration site.

At step 1508, a request is provided to the person(s). The request requests that the person(s) choose either the deployed version of the collaboration site or the updated version of the collaboration site. In an example implementation, provision logic 1818 provides the request to the person(s). For example, the generation logic 1816 may generate the request so that the provision logic 1818 may provide the request.

At step 1510, the features that are provided by the deployed version of the collaboration site are updated to include the available feature(s) based at least in part on response(s) that are received to the request. For instance, the features that are provided by the deployed version of the collaboration site may be updated to include the available feature(s) based at least in part on at least one of the response(s) indicating that the updated version of the collaboration site is chosen. In an example implementation, the generation logic 1816 updates the features that are provided by the deployed version of the collaboration site to include the available feature(s) based at least in part on a response 1820. For instance, the response 1820 may include the response(s) that are received to the request.

At step 1512, a determination is made whether another iteration of steps 1502, 1504, 1506, 1508, 1510, and 1512 is to be performed. In an example implementation, the determination logic 1806 determines whether another iteration is to be performed. For example, the determination may be based at least in part on whether other available feature(s) are available to be provided by the deployed version of the collaboration site and are not included among features provided by the deployed version of the collaboration site. In accordance with this example, other available feature(s) being available to be provided by the deployed version of the collaboration site and not being included among features provided by the deployed version of the collaboration site may indicate that another iteration is to be performed. In further accordance with this example, other available feature(s) not being available to be provided by the deployed version of the collaboration site or such available feature(s) being available but already being included among features provided by the deployed version of the collaboration site may indicate that another iteration is not to be performed. If another iteration is to be performed, control returns to step 1502. Otherwise, flowchart 1500 ends.

In an example embodiment, presenting the preview at step 1506 includes presenting the preview of the updated version for viewing by one or more users of the collaboration site. In accordance with this embodiment, providing the request at step 1508 includes providing the request to the one or more users. In further accordance with this embodiment, updating the features at step 1510 includes updating the features that are provided by the deployed version of the collaboration site to include the available feature(s) based at least in part on the response(s) to the request that are received from at least one of the one or more users (e.g., based at least in part on the one or more responses indicating that a number of the one or more users who choose the updated version of the collaboration site is greater than a number of the users who choose the deployed version of the collaboration site).

In another example embodiment, presenting the preview at step 1506 includes presenting the preview of the updated version for viewing by an owner of the collaboration site. In accordance with this embodiment, providing the request at step 1508 includes providing the request to the owner of the collaboration site. In further accordance with this embodiment, updating the features at step 1510 includes updating the features that are provided by the deployed version of the collaboration site to include the available feature(s) based at least in part on a response to the request that is received from the owner of the collaboration site.

In yet another example embodiment, the person(s) include multiple designated users of the collaboration site. In accordance with this embodiment, providing the request at step 1508 includes soliciting a vote from each of the designated users. Each vote indicates either that the respective designated user chooses the deployed version of the collaboration site or that the respective designated user chooses the updated version of the collaboration site. In further accordance with this embodiment, updating the features that are provided by the deployed version of the collaboration site to include the available feature(s) at step 1510 is based at least in part on votes that are received from the designated users.

In still another example embodiment, generating the updated version of the collaboration site at step 1504 includes generating a plurality of updated versions of the collaboration site. Each updated version is configured to provide at least one respective available feature in addition to at least some of the features. Each updated version is generated based at least in part on a determination that the at least one respective available feature has the likelihood of adding value to the users that is greater than or equal to the likelihood threshold. In accordance with this embodiment, presenting the preview at step 1506 includes presenting a preview of each of the plurality of updated versions for viewing by the person(s) associated with the collaboration site. In further accordance with this embodiment, the request requests that the person(s) choose either the deployed version of the collaboration site or one of the plurality of updated versions of the collaboration site. In further accordance with this embodiment, updating the features at step 1510 further includes updating the features that are provided by the deployed version of the collaboration site to include the at least one available feature provided by the updated version of the collaboration site that is chosen in response to the request.

In some example embodiments, one or more steps 1502, 1504, 1506, 1508, 1510, and/or 1512 of flowchart 1500 may not be performed. Moreover, steps in addition to or in lieu of steps 1502, 1504, 1506, 1508, 1510, and/or 1512 may be performed. For instance, in an example embodiment, each iteration of the plurality of iterations that update the deployed version of the collaboration site further includes updating the information that includes the knowledge of the operations performed by the users with regard to at least some of the features to indicate that the features that are provided by the deployed version of the collaboration site are updated to include the available feature(s). In an example implementation, the update logic 1808 updates the information that includes the knowledge. For example, the usage data 1828 may include the information that includes the knowledge. In accordance with this example, the update logic 1808 may update the usage data 1828 to reflect that the features that are provided by the deployed version of the collaboration site are updated to include the available feature(s).

In another example embodiment, at least one iteration (e.g., each iteration) of the plurality of iterations that update the deployed version of the collaboration site further includes incorporating a description of functionality associated with the available feature(s) into the deployed version of the collaboration site to facilitate use of the available feature(s) by users of the deployed version of the collaboration site. In an example implementation, the generation logic 1816 incorporates the description of the functionality into the deployed version of the collaboration site.

In yet another example embodiment, each iteration of the plurality of iterations that update the deployed version of the collaboration site further includes providing an interface element in the deployed version of the collaboration site that enables users of the deployed version of the collaboration site to, in response to updating the features that are provided by the deployed version of the collaboration site to include the available feature(s), update the deployed version of the collaboration site to remove the available feature(s) from the features that are provided by the deployed version of the collaboration site. For instance, selection of the interface element may initiate reversal of the updating of the features that are provided by the deployed version of the collaboration site. In an example implementation, the provision logic 1818 provides the interface element in the deployed version of the collaboration site.

In still another example embodiment, for a designated iteration of the plurality of iterations that update the deployed version of the collaboration, generating the updated version of the collaboration site at step 1504 includes generating the updated version of the collaboration site to provide a specified feature of the available feature(s) in lieu of a designated feature of the features provided by the deployed version of the collaboration site. In accordance with this embodiment, the designated iteration further includes mapping attributes of the specified feature to attributes of the designated feature. In an example implementation, the mapping logic 1810 maps the attributes of the specified feature to the attributes of the designated feature.

In another example embodiment, each iteration of the plurality of iterations that update the deployed version of the collaboration site further includes correlating usage data, which indicates the operations performed by the users with regard to at least some of the features provided by the deployed version of the collaboration site, and information regarding a plurality of available features that are provided by other collaboration sites to determine that the available feature(s), which are included in the plurality of available features, have a likelihood of adding value to the users that is greater than or equal to the likelihood threshold. In an example implementation, the determination logic 1806 correlates the usage data 1828 and the feature information 1824. The usage data 1828 indicates the operations performed by the users with regard to at least some of the features provided by the deployed version of the collaboration site. The feature information 1824 includes the information regarding the plurality of available features.

In an aspect of this embodiment, each iteration of the plurality of iterations that update the deployed version of the collaboration site further includes comparing an extent to which each of the other collaboration sites is used by users of the respective other collaboration site to a use threshold to determine a subset of the other collaboration sites such that the extent to which each other collaboration site in the subset is used by the users of the respective other collaboration site exceeds the use threshold. The extent to which each of the other collaboration sites is used by the users of the respective other collaboration site may indicate a number of times the respective other collaboration site is visited, a number of operations performed with regard to each of the plurality of available features, a cumulative duration of time that the respective other collaboration site is used, and/or a number of the users (e.g., distinct visitors) of the respective other collaboration site. The subset includes at least one of the other collaboration sites. For example, the subset may include fewer than all of the other collaboration sites. In another example, the subset may include all of the other collaboration sites. In an example implementation, the comparison logic 1812 compares the extent to which each of the other collaboration sites is used by the users of the respective other collaboration site to the use threshold to determine the subset. For instance, the comparison logic 1812 may generate the subset information 1826 to indicate which of the other collaboration sites are included in the subset.

In accordance with this aspect, correlating the usage data and the information regarding the plurality of available features includes correlating the usage data, the information regarding the plurality of available features, and information indicating which of the other collaboration sites are included in the subset to determine that the available feature(s), which are included in the plurality of available features, have a likelihood of adding value to the users of the collaboration site that is greater than or equal to the likelihood threshold. In an example implementation, the determination logic 1806 correlates the usage data 1828, the feature information 1824, and the subset information 1826 to determine that the available feature(s) have a likelihood of adding value to the users of the collaboration site that is greater than or equal to the likelihood threshold. The subset information 1826 indicates each of the other collaboration sites that is included in the subset.

In another aspect of this embodiment, each iteration of the plurality of iterations that update the deployed version of the collaboration site further includes comparing a retention rate of each of the other collaboration sites to a retention threshold to determine a subset of the other collaboration sites such that the retention rate of each other collaboration site in the subset exceeds the retention threshold. The retention rate of each of the other collaboration sites indicates a proportion of users of the respective other collaboration site that visits the respective other collaboration site at least once during a first designated time period and at least once during a second designated time period that is consecutive with the first designated time period. In an example implementation, the comparison logic 1812 compares the retention rate of each of the other collaboration sites to the retention threshold to determine the subset. In accordance with this aspect, correlating the usage data and the information regarding the plurality of available features includes correlating the usage data, the information regarding the plurality of available features, and information indicating which of the other collaboration sites are included in the subset to determine that the available feature(s), which are included in the plurality of available features, have a likelihood of adding value to the users of the collaboration site that is greater than or equal to the likelihood threshold. In an example implementation, the determination logic 1806 correlates the usage data 1828, the feature information 1824, and the subset information 1826 to determine that the available feature(s) have a likelihood of adding value to the users of the collaboration site that is greater than or equal to the likelihood threshold.

In yet another aspect of this embodiment, the information regarding the plurality of available features indicates (a) a proportion of users of each of the other collaboration sites who open a file on the respective other collaboration site, (b) a proportion of the users of each of the other collaboration sites who share a file on the respective other collaboration site, and/or (c) a proportion of the users of each of the other collaboration sites who share the respective other collaboration site.

In still another aspect of this embodiment, the information regarding the plurality of available features indicates a number of files dirtied in each of the other collaboration sites.

In yet another example embodiment, the method of flowchart 1500 further includes one or more of the steps shown in flowchart 1600 of FIG. 16. As shown in FIG. 16, the method of flowchart 1600 begins at step 1602. In step 1602, a first extent to which the users use the deployed version of the collaboration site prior to updating the features that are provided by the deployed version of the collaboration site to include the one or more available features is determined. In an example implementation, the performance logic 1814 determines the first extent.

At step 1604, a second extent to which the users use the deployed version of the collaboration site after updating the features that are provided by the deployed version of the collaboration site to include the one or more available features is determined. In an example implementation, the performance logic 1814 determines the second extent.

At step 1606, the first extent and the second extent are compared to determine whether the second extent is greater than the first extent by an amount that exceeds a use threshold. In an example implementation, the comparison logic 1812 compares the first extent and the second extent.

At step 1608, the updated version of the collaboration site is selectively provided as a template for creation of a new collaboration site based at least in part on whether the second extent is greater than the first extent by an amount that exceeds the use threshold. In an example implementation, provision logic 1818 selectively provides the updated version of the collaboration site as the template.

As shown in FIG. 17, the method of flowchart 1700 is directed to iteratively updating a template, which is generated for creation of a new collaboration site, in accordance with a machine learning technique. For instance, the intelligent update logic 1802 may iteratively update the template. Each iteration of a plurality of iterations that update the template includes steps 1702, 1704, 1706, 1708, 1710, 1712, 1714, 1716, and 1718. At step 1702, a new collaboration site is generated based at least in part on the template. The new collaboration site is configured to facilitate collaboration among users of the new collaboration site. The new collaboration site is configured to provide first features that include second features. The template is configured to provide the second features. In an example implementation, the generation logic 1816 generates the new collaboration site.

At step 1704, a determination is made that third feature(s) that are available to be provided by the new collaboration site have a likelihood of adding value to the users that is greater than or equal to a likelihood threshold based at least in part on information that includes knowledge of operations performed by the users with regard to at least some of the first features. In an example implementation, the determination logic 1806 determines that the third feature(s) that are available to be provided by the new collaboration site have a likelihood of adding value to the users that is greater than or equal to the likelihood threshold.

At step 1706, an updated collaboration site, which is based at least in part on the new collaboration site, is generated to provide the third feature(s) in addition to at least some of the first features based at least in part on a determination that the third feature(s) have the likelihood of adding value to the users that is greater than or equal to the likelihood threshold. In an example implementation, the generation logic 1816 generates the updated collaboration site.

In an example embodiment, generating the updated collaboration site at step 1706 includes tailoring the updated collaboration site to the users in a specified organization based at least in part on a determination that a specified feature that is included in the third feature(s) has a likelihood of adding value to the users in the specified organization that is greater than or equal to the likelihood threshold. In an aspect of this embodiment, generating the updated collaboration site at step 1706 includes tailoring the updated collaboration site to the users in a specified division of the specified organization based at least in part on a determination that a specified feature that is included in the third feature(s) has a likelihood of adding value to the users in the specified division of the specified organization that is greater than or equal to the likelihood threshold.

In another example embodiment, generating the updated collaboration site at step 1706 includes generating a plurality of versions of the updated collaboration site that are tailored to the respective users based at least in part on respective instances of information regarding the respective users.

At step 1708, a preview of the updated collaboration site is presented for viewing by person(s) associated with the new collaboration site. In an example implementation, the provision logic 1818 presents a preview 1844 of the updated collaboration site for viewing by the person(s) associated with the new collaboration site.

At step 1710, an offer is presented to the person(s) to replace the new collaboration site with the updated collaboration site. In an example implementation, the provision logic 1818 presents the offer.

At step 1712, the new collaboration site is replaced with the updated collaboration site based at least in part on an acceptance of the offer. The acceptance is received from at least one of the person(s). In an example implementation, the generation logic 1816 replaces the new collaboration site with the updated collaboration site.

At step 1714, the template is updated by causing the updated collaboration site to serve as the template for creation of another new collaboration site based at least in part on the new collaboration site being replaced with the updated collaboration site. In an example implementation, the generation logic 1816 updates the template by causing the updated collaboration site to serve as the template for creation of another new collaboration site.

At step 1716, a determination is made whether another iteration of steps 1702, 1704, 1706, 1708, 1710, 1712, 1714, 1716, and 1718 is to be performed. In an example implementation, the determination logic 1806 determines whether another iteration is to be performed. For example, the determination may be based at least in part on whether an instruction has been received to use the template to create a new collaboration site. In accordance with this example, receipt of an instruction to use the template to create a new collaboration site may indicate that another iteration is to be performed. In further accordance with this example, not receiving an instruction to use the template to create a new collaboration site may indicate that another iteration is not to be performed. If another iteration is to be performed, control returns to step 1702. Otherwise, flowchart 1700 ends.

In example embodiment, presenting the preview at step 1708 includes presenting the preview of the updated collaboration site for viewing by one or more users of the new collaboration site. In accordance with this embodiment, presenting the offer at step 1710 includes presenting the offer to the one or more users. In further accordance with this embodiment, the acceptance is received from at least one of the one or more users.

In another example embodiment, presenting the preview at step 1708 includes presenting the preview of the updated collaboration site for viewing by an owner of the collaboration site. In accordance with this embodiment, presenting the offer at step 1710 includes presenting the offer to the owner of the collaboration site. In further accordance with this embodiment, the acceptance is received from the owner of the collaboration site.

In yet another example embodiment, the person(s) include multiple designated users of the new collaboration site. In accordance with this embodiment, presenting the offer at step 1710 includes soliciting a vote from each of the designated users. Each vote indicates whether the respective designated user is in favor of replacing the new collaboration site with the updated collaboration site. In accordance with this embodiment, replacing the new collaboration site with the updated collaboration site at step 1712 includes replacing the new collaboration site with the updated collaboration site based at least in part on votes that are received from the designated users indicating the acceptance of the offer.

In still another example embodiment, generating the updated collaboration site at step 1706 includes generating a plurality of versions of the updated collaboration site. Each version is configured to provide at least one respective third feature in addition to at least some of the first features. Each version is generated based at least in part on a determination that the at least one respective third feature has the likelihood of adding value to the users that is greater than or equal to the likelihood threshold. In accordance with this embodiment, presenting the preview at step 1708 includes presenting a preview of each of the plurality of versions for viewing by the person(s) associated with the collaboration site. In further accordance with this embodiment, presenting the offer at step 1710 includes presenting the offer to the person(s) to replace the new collaboration site with one of the plurality of versions that is to be selected by at least one of the one or more persons. In further accordance with this embodiment, replacing the new collaboration site with the updated collaboration site at step 1712 includes replacing the new collaboration site with the version of the updated collaboration site that is selected by at least one of the one or more persons.

In some example embodiments, one or more steps 1702, 1704, 1706, 1708, 1710, 1712, 1714, 1716, and/or 1718 of flowchart 1700 may not be performed. Moreover, steps in addition to or in lieu of steps 1702, 1704, 1706, 1708, 1710, 1712, 1714, 1716, and/or 1718 may be performed. For instance, in an example embodiment, each iteration of the plurality of iterations that update the template further includes updating the information that includes the knowledge of the operations performed by the users with regard to at least some of the first features to indicate that the new collaboration site is replaced with the updated collaboration site. In an example implementation, the update logic 1808 updates the information that includes the knowledge of the operations performed by the users with regard to at least some of the first features to indicate that the new collaboration site is replaced with the updated collaboration site.

In another example embodiment, each iteration of the plurality of iterations that update the template further includes determining a first extent to which the users use the new collaboration site. For instance, the performance logic 1814 may determine the first extent. In accordance with this embodiment, each iteration further includes determining a second extent to which users of the updated collaboration site use the updated collaboration site. For instance, the performance logic 1814 may determine the second extent. In further accordance with this embodiment, each iteration further includes comparing the first extent and the second extent to determine whether the second extent is greater than the first extent by an amount that exceeds a use threshold. For instance, the comparison logic 1812 may compare the first extent and the second extent. In further accordance with this embodiment, updating the template at step 1714 is further based at least in part on whether the second extent is greater than the first extent by an amount that exceeds the use threshold. For instance, the second extent being greater than the first extent by an amount that exceeds the use threshold may weigh in favor of updating the template. The second extent not being greater than the first extent by an amount that exceeds the use threshold may weigh against updating the template. In an example, the generation logic 1816 may update the template further based at least in part on whether the second extent is greater than the first extent by an amount that exceeds the use threshold.

In yet another example embodiment, a designated iteration of the plurality of iterations that update the template further includes providing an interface element in the template that enables a user of the template to, in response to the template being updated, reverse the updating of the template. In an example implementation, the generation logic 1816 provides the interface element in the template.

In still another example embodiment, for a designated iteration of the plurality of iterations that update the template, generating the updated collaboration site at step 1706 includes generating the updated collaboration site to provide a specified feature that is included in the third feature(s) in lieu of a designated feature of the first features. In accordance with this embodiment, the designated iteration further includes mapping attributes of the specified feature to attributes of the designated feature. In an example implementation, the mapping logic 1810 maps the attributes of the specified feature to the attributes of the designated feature.

In another example embodiment, each iteration of the plurality of iterations that update the template further includes correlating usage data, which indicates the operations performed by the users with regard to at least some of the first features, and information regarding a plurality of third features that are provided by other collaboration sites to determine that the third feature(s), which are included in the plurality of third features, have a likelihood of adding value to the users that is greater than or equal to the likelihood threshold. In an example implementation, the determination logic 1806 correlates the usage data 1828 and the feature information 1824. The usage data 1828 indicates the operations performed by the users with regard to at least some of the first features. The feature information 1824 includes the information regarding the plurality of third features.

In an aspect of this embodiment, each iteration of the plurality of iterations that update the template further includes comparing an extent to which each of the other collaboration sites is used by users of the respective other collaboration site to a use threshold to determine a subset of the other collaboration sites such that the extent to which each other collaboration site in the subset is used by the users of the respective other collaboration site exceeds the use threshold. The extent to which each of the other collaboration sites is used by the users of the respective other collaboration site may indicate a number of times the respective other collaboration site is visited, a number of operations performed with regard to each of the plurality of third features, a cumulative duration of time that the respective other collaboration site is used, and/or a number of the users (e.g., distinct visitors) of the respective other collaboration site. The subset includes at least one of the other collaboration sites. For example, the subset may include fewer than all of the other collaboration sites. In another example, the subset may include all of the other collaboration sites. In an example implementation, the comparison logic 1812 may compare the extent to which each of the other collaboration sites is used by users of the respective other collaboration site to the use threshold. In accordance with this aspect, correlating the usage data and the information regarding the plurality of third features includes correlating the usage data, the information regarding the plurality of third features, and information indicating which of the other collaboration sites are included in the subset to determine that the third feature(s), which are included in the plurality of third features, have a likelihood of adding value to the users of the new collaboration site that is greater than or equal to the likelihood threshold.

In another aspect of this embodiment, each iteration of the plurality of iterations that update the template further includes comparing a retention rate of each of the other collaboration sites to a retention threshold to determine a subset of the other collaboration sites such that the retention rate of each other collaboration site in the subset exceeds the retention threshold. The retention rate of each of the other collaboration sites indicates a proportion of users of the respective other collaboration site that visits the respective other collaboration site at least once during a first designated time period and at least once during a second designated time period that is consecutive with the first designated time period. In an example implementation, the comparison logic 1812 compares the retention rate of each of the other collaboration sites to the retention threshold to determine the subset. In accordance with this aspect, correlating the usage data and the information regarding the plurality of third features includes correlating the usage data, the information regarding the plurality of third features, and information indicating which of the other collaboration sites are included in the subset to determine that the third feature(s), which are included in the plurality of third features, have a likelihood of adding value to the users of the new collaboration site that is greater than or equal to the likelihood threshold.

In yet another aspect of this embodiment, the information regarding the plurality of third features indicates (a) a proportion of users of each of the other collaboration sites who open a file on the respective other collaboration site, (b) a proportion of the users of each of the other collaboration sites who share a file on the respective other collaboration site, and/or (c) a proportion of the users of each of the other collaboration sites who share the respective other collaboration site.

In still another aspect of this embodiment, the information regarding the plurality of third features indicates a number of files dirtied in each of the other collaboration sites.

In yet another example embodiment, at least one (e.g., each) iteration of the plurality of iterations that update the template further includes designating the template as a highest-rated sample template among a plurality of sample templates that are to be provided to a user when an instruction to create a new collaboration site is received from the user.

It will be recognized that computing system 1800 may not include one or more of intelligent update logic 1802, site logic 1804, determination logic 1806, update logic 1808, mapping logic 1810, comparison logic 1812, and/or performance logic 1814. Furthermore, computing system 1800 may include components in addition to or in lieu of intelligent update logic 1802, site logic 1804, determination logic 1806, update logic 1808, mapping logic 1810, comparison logic 1812, and/or performance logic 1814.

Any one or more of intelligent update logic 110, intelligent update logic 1802, site logic 1804, determination logic 1806, update logic 1808, mapping logic 1810, comparison logic 1812, performance logic 1814, flowchart 1000, flowchart 1100, flowchart 1200, flowchart 1300, flowchart 1400, flowchart 1500, flowchart 1600, and/or flowchart 1700 may be implemented in hardware, software, firmware, or any combination thereof.

For example, any one or more of intelligent update logic 110, intelligent update logic 1802, site logic 1804, determination logic 1806, update logic 1808, mapping logic 1810, comparison logic 1812, performance logic 1814, flowchart 1000, flowchart 1100, flowchart 1200, flowchart 1300, flowchart 1400, flowchart 1500, flowchart 1600, and/or flowchart 1700 may be implemented, at least in part, as computer program code configured to be executed in one or more processors.

In another example, any one or more of intelligent update logic 110, intelligent update logic 1802, site logic 1804, determination logic 1806, update logic 1808, mapping logic 1810, comparison logic 1812, performance logic 1814, flowchart 1000, flowchart 1100, flowchart 1200, flowchart 1300, flowchart 1400, flowchart 1500, flowchart 1600, and/or flowchart 1700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system comprises a memory and one or more processors coupled to the memory. The one or more processors are configured to generate a specified collaboration site that provides first features, the specified collaboration site configured to facilitate collaboration among users of the specified collaboration site. The one or more processors are further configured to correlate usage data, which indicates operations performed by the users with regard to at least some of the first features provided by the specified collaboration site, and information regarding second features that are provided by other collaboration sites to identify one or more features included in the second features that have a likelihood of adding value to the users that is greater than or equal to a likelihood threshold. The one or more processors are further configured to generate an updated collaboration site, which is based at least in part on the specified collaboration site, to provide the one or more features in addition to at least some of the first features based at least in part on the one or more features having the likelihood of adding value to the users that is greater than or equal to the likelihood threshold.

In a first aspect of the first example system, the one or more processors are further configured to provide a recommendation that recommends replacing the specified collaboration site with the updated collaboration site based at least in part on the one or more features having the likelihood of adding value to the users that is greater than or equal to the likelihood threshold.

In a second aspect of the first example system, the one or more processors are further configured to replace the specified collaboration site with the updated collaboration site. In accordance with the second aspect, the one or more processors are further configured to incorporate a description of functionality associated with the one or more features into the updated collaboration site to facilitate use of the one or more features by users of the updated collaboration site. The second aspect of the first example system may be implemented in combination with the first aspect of the first example system, though the example embodiments are not limited in this respect.

In a third aspect of the first example system, the one or more processors are further configured to replace the specified collaboration site with the updated collaboration site. In accordance with the third aspect, the one or more processors are further configured to incorporate an interface element into the updated collaboration site, the interface element configured to enable users of the updated collaboration site to replace the updated collaboration site with the specified collaboration site. The third aspect of the first example system may be implemented in combination with the first and/or second aspect of the first example system, though the example embodiments are not limited in this respect.

In a fourth aspect of the first example system, the one or more processors are configured to generate the updated collaboration site to provide a specified feature of the one or more features in lieu of a designated feature of the first features. In accordance with the fourth aspect, the one or more processors are configured to map attributes of the specified feature to attributes of the designated feature. The fourth aspect of the first example system may be implemented in combination with the first, second, and/or third aspect of the first example system, though the example embodiments are not limited in this respect.

In a fifth aspect of the first example system, the one or more processors are configured to compare an extent to which each of the other collaboration sites is used by users of the respective other collaboration site to a use threshold to determine a subset of the other collaboration sites such that the extent to which each other collaboration site in the subset is used by the users of the respective other collaboration site exceeds the use threshold. In accordance with the fifth aspect, the one or more processors are configured to correlate the usage data, the information regarding the second features, and information indicating which of the other collaboration sites are included in the subset to identify the one or more features having the likelihood of adding value to the users of the specified collaboration site that is greater than or equal to the likelihood threshold. The fifth aspect of the first example system may be implemented in combination with the first, second, third, and/or fourth aspect of the first example system, though the example embodiments are not limited in this respect.

In a sixth aspect of the first example system, the one or more processors are configured to compare a retention rate of each of the other collaboration sites to a retention threshold to determine a subset of the other collaboration sites such that the retention rate of each other collaboration site in the subset exceeds the retention threshold, the retention rate of each of the other collaboration sites indicating a proportion of users of the respective other collaboration site that visits the respective other collaboration site at least once during a first designated time period and at least once during a second designated time period that is consecutive with the first designated time period. In accordance with the sixth aspect, the one or more processors are configured to correlate the usage data, the information regarding the second features, and information indicating which of the other collaboration sites are included in the subset to identify the one or more features having the likelihood of adding value to the users of the specified collaboration site that is greater than or equal to the likelihood threshold. The sixth aspect of the first example system may be implemented in combination with the first, second, third, fourth, and/or fifth aspect of the first example system, though the example embodiments are not limited in this respect.

In a seventh aspect of the first example system, the information regarding the second features indicates at least one of (a) a proportion of users of each of the other collaboration sites who open a file on the respective other collaboration site, (b) a proportion of the users of each of the other collaboration sites who share a file on the respective other collaboration site, (c) a proportion of the users of each of the other collaboration sites who share the respective other collaboration site, or (d) a number of files edited in each of the other collaboration sites. The seventh aspect of the first example system may be implemented in combination with the first, second, third, fourth, fifth, and/or sixth aspect of the first example system, though the example embodiments are not limited in this respect.

In an eighth aspect of the first example system, the one or more processors are configured to iteratively correlate the usage data and the information regarding the second features over successive time periods in accordance with a machine learning technique to identify the one or more features having the likelihood of adding value to the users that is greater than or equal to the likelihood threshold. The eighth aspect of the first example system may be implemented in combination with the first, second, third, fourth, fifth, sixth, and/or seventh aspect of the first example system, though the example embodiments are not limited in this respect.

In a ninth aspect of the first example system, the one or more processors are further configured to determine a first performance metric associated with the specified collaboration site, the first performance metric measured during a first period of time. In accordance with the ninth aspect, the one or more processors are further configured to determine a second performance metric associated with the updated collaboration site, the second performance metric measured during a second period of time that follows the first period of time. In further accordance with the ninth aspect, the one or more processors are further configured to compare the first performance metric and the second performance metric to determine whether the second performance metric is greater than the first performance metric by an amount that exceeds a difference threshold. In further accordance with the ninth aspect, the one or more processors are further configured to provide the updated collaboration site as a template for creation of a new collaboration site based at least in part on a determination that the second performance metric is greater than the first performance metric by an amount that exceeds the difference threshold. The ninth aspect of the first example system may be implemented in combination with the first, second, third, fourth, fifth, sixth, seventh, and/or eighth aspect of the first example system, though the example embodiments are not limited in this respect.

A second example system comprises a memory and one or more processors coupled to the memory. The one or more processors are configured to generate a specified collaboration site that provides first features, the specified collaboration site configured to facilitate collaboration among users of the specified collaboration site. The one or more processors are further configured to determine whether one or more second features that are available to be provided by the specified collaboration site have a likelihood of adding value to the users that is greater than or equal to a likelihood threshold based at least in part on knowledge of operations performed by the users with regard to at least some of the first features. The one or more processors are further configured to generate an updated collaboration site, which is based at least in part on the specified collaboration site, to provide the one or more second features in addition to at least some of the first features based at least in part on a determination that the one or more second features have the likelihood of adding value to the users that is greater than or equal to the likelihood threshold. The one or more processors are further configured to present a preview of the updated collaboration site for viewing by one or more persons associated with the specified collaboration site. The one or more processors are further configured to present an offer to the one or more persons to replace the specified collaboration site with the updated collaboration site.

In a first aspect of the second example system, one or more persons include multiple designated users of the specified collaboration site. In accordance with the first aspect, the one or more processors are configured to solicit a vote from each of the designated users, each vote indicating whether the respective designated user is in favor of replacing the specified collaboration site with the updated collaboration site. In further accordance with the first aspect, the one or more processors are configured to determine whether to replace the specified collaboration site with the updated collaboration site based at least in part on votes that are received from the designated users.

In a second aspect of the second example system, the one or more persons include one or more users of the specified collaboration site. In accordance with the second aspect, the one or more processors are configured to suggest that each of the one or more users informs an entity, which has authority to authorize replacing the specified collaboration site with the updated collaboration site, whether the respective user is in favor of replacing the specified collaboration site with the updated collaboration site. The second aspect of the second example system may be implemented in combination with the first aspect of the second example system, though the example embodiments are not limited in this respect.

In a third aspect of the second example system, the one or more processors are configured to present the preview of the updated collaboration site for viewing by an owner of the specified collaboration site. In accordance with the third aspect, the one or more processors are configured to present the offer to the owner of the specified collaboration site to replace the specified collaboration site with the updated collaboration site. In further accordance with the third aspect, the one or more processors are configured to determine whether to replace the specified collaboration site with the updated collaboration site based at least in part on whether the owner of the specified collaboration site accepts the offer. The third aspect of the second example system may be implemented in combination with the first and/or second aspect of the second example system, though the example embodiments are not limited in this respect.

In a fourth aspect of the second example system, the one or more processors are configured to generate a plurality of updated collaboration sites, each updated collaboration site based at least in part on the specified collaboration site and configured to provide at least one respective feature in addition to at least some of the first features, wherein each updated collaboration site is generated based at least in part on the at least one respective feature having the likelihood of adding value to the users that is greater than or equal to the likelihood threshold. In accordance with the fourth aspect, the one or more processors are configured to present a preview of each of the plurality of updated collaboration sites for viewing by the one or more persons associated with the specified collaboration site. In further accordance with the fourth aspect, the one or more processors are configured to present the offer to the one or more persons to replace the specified collaboration site with one of the plurality of updated collaboration sites that is to be selected by the one or more persons. The fourth aspect of the second example system may be implemented in combination with the first, second, and/or third aspect of the second example system, though the example embodiments are not limited in this respect.

In a fifth aspect of the second example system, the one or more processors are configured to tailor the updated collaboration site to the users in a specified organization based at least in part on a determination that a specified feature of the one or more second features has a likelihood of adding value to the users in the specified organization that is greater than or equal to the likelihood threshold. The fifth aspect of the second example system may be implemented in combination with the first, second, third, and/or fourth aspect of the second example system, though the example embodiments are not limited in this respect.

In a sixth aspect of the second example system, the one or more processors are configured to generate multiple versions of the updated collaboration site that are tailored to the respective users based at least in part on respective instances of information regarding the respective users. The sixth aspect of the second example system may be implemented in combination with the first, second, third, fourth, and/or fifth aspect of the second example system, though the example embodiments are not limited in this respect.

A third example system comprises a memory and one or more processors coupled to the memory. The one or more processors are configured to iteratively update a deployed version of a collaboration site, which is configured to facilitate collaboration among users of the collaboration site, in accordance with a machine learning technique. The one or more processors are configured to, for each iteration of a plurality of iterations that update the deployed version of the collaboration site, determine whether one or more available features that are available to be provided by the deployed version of the collaboration site and that are not included among features provided by the deployed version of the collaboration site have a likelihood of adding value to the users that is greater than or equal to a likelihood threshold based at least in part on information that includes knowledge of operations performed by the users with regard to at least some of the features. The one or more processors are further configured to, for each iteration, generate an updated version of the collaboration site based at least in part on a determination that the one or more available features have the likelihood of adding value to the users that is greater than or equal to the likelihood threshold, the updated version configured to provide the one or more available features in addition to at least some of the features. The one or more processors are further configured to, for each iteration, present a preview of the updated version for viewing by one or more persons associated with the collaboration site. The one or more processors are further configured to, for each iteration, provide a request to the one or more persons, the request requesting that the one or more persons choose either the deployed version of the collaboration site or the updated version of the collaboration site. The one or more processors are further configured to, for each iteration, update the features that are provided by the deployed version of the collaboration site to include the one or more available features based at least in part on one or more responses that are received to the request.

In a first aspect of the third example system, the one or more processors are configured to, for each iteration of the plurality of iterations that update the deployed version of the collaboration site, update the information that includes the knowledge of the operations performed by the users with regard to at least some of the features to indicate that the features that are provided by the deployed version of the collaboration site are updated to include the one or more available features.

In a second aspect of the third example system, the one or more persons include multiple designated users of the collaboration site. In accordance with the second aspect, the one or more processors are configured to, for each iteration of the plurality of iterations that update the deployed version of the collaboration site, solicit a vote from each of the designated users, each vote indicating either that the respective designated user chooses the deployed version of the collaboration site or that the respective designated user chooses the updated version of the collaboration site. In further accordance with the second aspect, the one or more processors are configured to, for each iteration, update the features that are provided by the deployed version of the collaboration site to include the one or more available features based at least in part on votes that are received from the designated users. The second aspect of the third example system may be implemented in combination with the first aspect of the third example system, though the example embodiments are not limited in this respect.

In a third aspect of the third example system, the one or more processors are configured to, for each iteration of the plurality of iterations that update the deployed version of the collaboration site, generate a plurality of updated versions of the collaboration site, each updated version configured to provide at least one respective available feature in addition to at least some of the features, wherein each updated version is generated based at least in part on a determination that the at least one respective available feature has the likelihood of adding value to the users that is greater than or equal to the likelihood threshold. In accordance with the third aspect, the one or more processors are configured to, for each iteration, present a preview of each of the plurality of updated versions for viewing by the one or more persons associated with the collaboration site. The request requests that the one or more persons choose either the deployed version of the collaboration site or one of the plurality of updated versions of the collaboration site. In further accordance with the third aspect, the one or more processors are configured to, for each iteration, update the features that are provided by the deployed version of the collaboration site to include the at least one available feature provided by the updated version of the collaboration site that is chosen in response to the request. The third aspect of the third example system may be implemented in combination with the first and/or second aspect of the third example system, though the example embodiments are not limited in this respect In a fourth aspect of the third example system, the one or more processors are configured to, for at least one iteration of the plurality of iterations that update the deployed version of the collaboration site, incorporate a description of functionality associated with the one or more available features into the deployed version of the collaboration site to facilitate use of the one or more available features by users of the deployed version of the collaboration site. The fourth aspect of the third example system may be implemented in combination with the first, second, and/or third aspect of the third example system, though the example embodiments are not limited in this respect.

In a fifth aspect of the third example system, the one or more processors are configured to, for each iteration of the plurality of iterations that update the deployed version of the collaboration site, provide an interface element in the deployed version of the collaboration site that enables users of the deployed version of the collaboration site to, in response to the features that are provided by the deployed version of the collaboration site being updated to include the one or more available features, update the deployed version of the collaboration site to remove the one or more available features from the features that are provided by the deployed version of the collaboration site. The fifth aspect of the third example system may be implemented in combination with the first, second, third, and/or fourth aspect of the third example system, though the example embodiments are not limited in this respect.

In a sixth aspect of the third example system, the one or more processors are configured to, for a designated iteration of the plurality of iterations that update the deployed version of the collaboration site, generate the updated version of the collaboration site to provide a specified feature of the one or more available features in lieu of a designated feature of the features provided by the deployed version of the collaboration site. In accordance with the sixth aspect, the one or more processors are configured to, for the designated iteration, map attributes of the specified feature to attributes of the designated feature. The sixth aspect of the third example system may be implemented in combination with the first, second, third, fourth, and/or fifth aspect of the third example system, though the example embodiments are not limited in this respect.

In a seventh aspect of the third example system, the one or more processors are configured to, for each iteration of the plurality of iterations that update the deployed version of the collaboration site, tailor the updated version of the collaboration site to the users in a specified organization based at least in part on a determination that a specified feature of the one or more available features has a likelihood of adding value to the users in the specified organization that is greater than or equal to the likelihood threshold. The seventh aspect of the third example system may be implemented in combination with the first, second, third, fourth, fifth, and/or sixth aspect of the third example system, though the example embodiments are not limited in this respect.

In an eighth aspect of the third example system, the one or more processors are configured to, for each iteration of the plurality of iterations that update the deployed version of the collaboration site, correlate usage data, which indicates the operations performed by the users with regard to at least some of the features provided by the deployed version of the collaboration site, and information regarding a plurality of available features that are provided by other collaboration sites to determine whether the one or more available features, which are included in the plurality of available features, have a likelihood of adding value to the users that is greater than or equal to the likelihood threshold. The eighth aspect of the third example system may be implemented in combination with the first, second, third, fourth, fifth, sixth, and/or seventh aspect of the third example system, though the example embodiments are not limited in this respect.

A fourth example system comprises a memory and one or more processors coupled to the memory. The one or more processors are configured to generate a template for creation of a new collaboration site and iteratively update the template in accordance with a machine learning technique. The one or more processors are configured to, for each iteration of a plurality of iterations that update the template, generate a new collaboration site based at least in part on the template, the new collaboration site configured to facilitate collaboration among users of the new collaboration site, the new collaboration site configured to provide first features that include second features, the template configured to provide the second features. The one or more processors are further configured to, for each iteration, determine whether one or more third features that are available to be provided by the new collaboration site have a likelihood of adding value to the users that is greater than or equal to a likelihood threshold based at least in part on information that includes knowledge of operations performed by the users with regard to at least some of the first features. The one or more processors are further configured to, for each iteration, generate an updated collaboration site, which is based at least in part on the new collaboration site, to provide the one or more third features in addition to at least some of the first features based at least in part on a determination that the one or more third features have the likelihood of adding value to the users that is greater than or equal to the likelihood threshold. The one or more processors are further configured to, for each iteration, present a preview of the updated collaboration site for viewing by one or more persons associated with the new collaboration site. The one or more processors are further configured to, for each iteration, present an offer to the one or more persons to replace the new collaboration site with the updated collaboration site. The one or more processors are further configured to, for each iteration, replace the new collaboration site with the updated collaboration site based at least in part on an acceptance of the offer, the acceptance received from at least one of the one or more persons. The one or more processors are further configured to, for each iteration, update the template by causing the updated collaboration site to serve as the template for creation of another new collaboration site based at least in part on the new collaboration site being replaced with the updated collaboration site.

In a first aspect of the fourth example system, the one or more processors are configured to, for each iteration of the plurality of iterations that update the template, update the information that includes the knowledge of the operations performed by the users with regard to at least some of the first features to indicate that the new collaboration site is replaced with the updated collaboration site.

In a second aspect of the fourth example system, the one or more processors are configured to, for each iteration of the plurality of iterations that update the template, determine a first extent to which the users use the new collaboration site. In accordance with the second aspect, the one or more processors are configured to, for each iteration, determine a second extent to which users of the updated collaboration site use the updated collaboration site. In further accordance with the second aspect, the one or more processors are configured to, for each iteration, compare the first extent and the second extent to determine whether the second extent is greater than the first extent by an amount that exceeds a use threshold. In further accordance with the second aspect, the one or more processors are configured to, for each iteration, update the template further based at least in part on whether the second extent is greater than the first extent by an amount that exceeds the use threshold. The second aspect of the fourth example system may be implemented in combination with the first aspect of the fourth example system, though the example embodiments are not limited in this respect.

In a third aspect of the fourth example system, the one or more persons include multiple designated users of the new collaboration site. In accordance with the third aspect, the one or more processors are configured to, for each iteration of the plurality of iterations that update the template, solicit a vote from each of the designated users, each vote indicating whether the respective designated user is in favor of replacing the new collaboration site with the updated collaboration site. In further accordance with the third aspect, the one or more processors are configured to, for each iteration, replace the new collaboration site with the updated collaboration site based at least in part on votes that are received from the designated users indicating the acceptance of the offer. The third aspect of the fourth example system may be implemented in combination with the first and/or second aspect of the fourth example system, though the example embodiments are not limited in this respect.

In a fourth aspect of the fourth example system, the one or more processors are configured to, for each iteration of the plurality of iterations that update the template, generate a plurality of versions of the updated collaboration site, each version configured to provide at least one respective third feature in addition to at least some of the first features, wherein each version is generated based at least in part on a determination that the at least one respective third feature has the likelihood of adding value to the users that is greater than or equal to the likelihood threshold. In accordance with the fourth aspect, the one or more processors are configured to, for each iteration, present a preview of each of the plurality of versions for viewing by the one or more persons associated with the collaboration site. In further accordance with the fourth aspect, the one or more processors are configured to, for each iteration, present the offer to the one or more persons to replace the new collaboration site with one of the plurality of versions that is to be selected by at least one of the one or more persons. In further accordance with the fourth aspect, the one or more processors are configured to, for each iteration, replace the new collaboration site with the version of the updated collaboration site that is selected by at least one of the one or more persons. The fourth aspect of the fourth example system may be implemented in combination with the first, second, and/or third aspect of the fourth example system, though the example embodiments are not limited in this respect.

In a fifth aspect of the fourth example system, the one or more processors are configured to, for a designated iteration of the plurality of iterations that update the template, provide an interface element in the template that enables a user of the template to, in response to updating the template, reverse the updating of the template. The fifth aspect of the fourth example system may be implemented in combination with the first, second, third, and/or fourth aspect of the fourth example system, though the example embodiments are not limited in this respect.

In a sixth aspect of the fourth example system, the one or more processors are configured to, for a designated iteration of the plurality of iterations that update the template, generate the updated collaboration site to provide a specified feature of the one or more third features in lieu of a designated feature of the first features. In accordance with the sixth aspect, the one or more processors are configured to, for the designated iteration, map attributes of the specified feature to attributes of the designated feature. The sixth aspect of the fourth example system may be implemented in combination with the first, second, third, fourth, and/or fifth aspect of the fourth example system, though the example embodiments are not limited in this respect.

In a seventh aspect of the fourth example system, the one or more processors are configured to, for each iteration of the plurality of iterations that update the template, tailor the updated collaboration site to the users in a specified organization based at least in part on a determination that a specified feature of the one or more third features has a likelihood of adding value to the users in the specified organization that is greater than or equal to the likelihood threshold. The seventh aspect of the fourth example system may be implemented in combination with the first, second, third, fourth, fifth, and/or sixth aspect of the fourth example system, though the example embodiments are not limited in this respect.

In an eighth aspect of the fourth example system, the one or more processors are configured to, for each iteration of the plurality of iterations that update the template, generate a plurality of versions of the updated collaboration site that are tailored to the respective users based at least in part on respective instances of information regarding the respective users. The eighth aspect of the fourth example system may be implemented in combination with the first, second, third, fourth, fifth, sixth, and/or seventh aspect of the fourth example system, though the example embodiments are not limited in this respect.

In a ninth aspect of the fourth example system, the one or more processors are configured to, for each iteration of the plurality of iterations that update the template, correlate usage data, which indicates the operations performed by the users with regard to at least some of the first features, and information regarding a plurality of third features that are provided by other collaboration sites to determine whether the one or more third features, which are included in the plurality of third features, have a likelihood of adding value to the users that is greater than or equal to the likelihood threshold. The ninth aspect of the fourth example system may be implemented in combination with the first, second, third, fourth, fifth, sixth, seventh, and/or eighth aspect of the fourth example system, though the example embodiments are not limited in this respect.

In a first example method, a specified collaboration site that provides first features is generated. The specified collaboration site is configured to facilitate collaboration among users of the specified collaboration site. A determination is made that one or more second features that are available to be provided by the specified collaboration site have a likelihood of adding value to the users that is greater than or equal to a likelihood threshold based at least in part on knowledge of operations performed by the users with regard to at least some of the first features. An updated collaboration site, which is based at least in part on the specified collaboration site, is generated to provide the one or more second features in addition to at least some of the first features based at least in part on a determination that the one or more second features have the likelihood of adding value to the users that is greater than or equal to the likelihood threshold. A preview of the updated collaboration site is presented for viewing by one or more persons associated with the specified collaboration site. An offer is presented to the one or more persons to replace the specified collaboration site with the updated collaboration site.

In a first aspect of the first example method, the first example method further includes replacing the specified collaboration site with the updated collaboration site. In accordance with the first aspect, the first example method further includes at least one of (a) incorporating a description of functionality associated with the one or more second features into the updated collaboration site to facilitate use of the one or more second features by users of the updated collaboration site or (b) incorporating an interface element into the updated collaboration site, the interface element enabling users of the updated collaboration site to replace the updated collaboration site with the specified collaboration site.

In a second aspect of the first example method, generating the updated collaboration site comprises generating the updated collaboration site to provide a specified feature of the one or more second features in lieu of a designated feature of the first features. In accordance with the second aspect, the method further comprises mapping attributes of the specified feature to attributes of the designated feature. The second aspect of the first example method may be implemented in combination with the first aspect of the first example method, though the example embodiments are not limited in this respect.

In a second example method, a template is generated for creation of a new collaboration site. The template is iteratively updated in accordance with a machine learning technique. Each iteration of a plurality of iterations that update the template comprises generating a new collaboration site based at least in part on the template, the new collaboration site configured to facilitate collaboration among users of the new collaboration site, the new collaboration site configured to provide first features that include second features, the template configured to provide the second features. Each iteration further comprises determining that one or more third features that are available to be provided by the new collaboration site have a likelihood of adding value to the users that is greater than or equal to a likelihood threshold based at least in part on information that includes knowledge of operations performed by the users with regard to at least some of the first features. Each iteration further comprises generating an updated collaboration site, which is based at least in part on the new collaboration site, to provide the one or more third features in addition to at least some of the first features based at least in part on a determination that the one or more third features have the likelihood of adding value to the users that is greater than or equal to the likelihood threshold. Each iteration further comprises presenting a preview of the updated collaboration site for viewing by one or more persons associated with the new collaboration site. Each iteration further comprises presenting an offer to the one or more persons to replace the new collaboration site with the updated collaboration site. Each iteration further comprises replacing the new collaboration site with the updated collaboration site based at least in part on an acceptance of the offer, the acceptance received from at least one of the one or more persons. Each iteration further comprises updating the template by causing the updated collaboration site to serve as the template for creation of another new collaboration site based at least in part on the new collaboration site being replaced with the updated collaboration site.

IV. Example Computer System

FIG. 19 depicts an example computer 1900 in which embodiments may be implemented. Any one or more of user systems 102A-102M and/or any one or more of servers 106A-106N shown in FIG. 1 and/or computing system 1800 shown in FIG. 18 may be implemented using computer 1900, including one or more features of computer 1900 and/or alternative features. Computer 1900 may be a general-purpose computing device in the form of a conventional personal computer, a mobile computer, or a workstation, for example, or computer 1900 may be a special purpose computing device. The description of computer 1900 provided herein is provided for purposes of illustration, and is not intended to be limiting. Embodiments may be implemented in further types of computer systems, as would be known to persons skilled in the relevant art(s).

As shown in FIG. 19, computer 1900 includes a processing unit 1902, a system memory 1904, and a bus 1906 that couples various system components including system memory 1904 to processing unit 1902. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computer 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1930, one or more application programs 1932, other program modules 1934, and program data 1936. Application programs 1932 or program modules 1934 may include, for example, computer program logic for implementing any one or more of intelligent update logic 110, intelligent update logic 1802, site logic 1804, determination logic 1806, update logic 1808, mapping logic 1810, comparison logic 1812, performance logic 1814, flowchart 1000 (including any step of flowchart 1000), flowchart 1100 (including any step of flowchart 1100), flowchart 1200 (including any step of flowchart 1200), flowchart 1300 (including any step of flowchart 1300), flowchart 1400 (including any step of flowchart 1400), flowchart 1500 (including any step of flowchart 1500), flowchart 1600 (including any step of flowchart 1600), and/or flowchart 1700 (including any step of flowchart 1700), as described herein.

A user may enter commands and information into the computer 1900 through input devices such as keyboard 1938 and pointing device 1940. Other input devices (not shown) may include a microphone, joystick, game pad, satellite dish, scanner, touch screen, camera, accelerometer, gyroscope, or the like. These and other input devices are often connected to the processing unit 1902 through a serial port interface 1942 that is coupled to bus 1906, but may be connected by other interfaces, such as a parallel port, game port, or a universal serial bus (USB).

A display device 1944 (e.g., a monitor) is also connected to bus 1906 via an interface, such as a video adapter 1946. In addition to display device 1944, computer 1900 may include other peripheral output devices (not shown) such as speakers and printers.

Computer 1900 is connected to a network 1948 (e.g., the Internet) through a network interface or adapter 1950, a modem 1952, or other means for establishing communications over the network. Modem 1952, which may be internal or external, is connected to bus 1906 via serial port interface 1942.

As used herein, the terms "computer program medium" and "computer-readable storage medium" are used to generally refer to media (e.g., non-transitory media) such as the hard disk associated with hard disk drive 1914, removable magnetic disk 1918, removable optical disk 1922, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1932 and other program modules 1934) may be stored on the hard disk, magnetic disk, optical disk, ROM, or RAM. Such computer programs may also be received via network interface 1950 or serial port interface 1942. Such computer programs, when executed or loaded by an application, enable computer 1900 to implement features of embodiments discussed herein. Accordingly, such computer programs represent controllers of the computer 1900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
    memory; and
    one or more processors coupled to the memory and configured to:
        generate a specified collaboration site that provides first features, the specified collaboration site configured to facilitate collaboration among users of the specified collaboration site;
        compare an extent to which each of a plurality of other collaboration sites is used by users of the respective other collaboration site to a use threshold to determine a subset of the other collaboration sites such that the extent to which each other collaboration site in the subset is used by the users of the respective other collaboration site exceeds the use threshold;
        correlate usage data, which indicates operations performed by the users of the specified collaboration site with regard to at least some of the first features provided by the specified collaboration site, information regarding second features that are provided by the other collaboration sites, and information indicating which of the other collaboration sites are included in the subset to identify one or more features included in the second features that have a statistical likelihood of adding value to the users of the specified collaboration site that is greater than or equal to a likelihood threshold; and
        generate an updated collaboration site, which is based at least in part on the specified collaboration site, to provide the one or more features in addition to at least some of the first features based at least in part on the one or more features having the statistical likelihood of adding value to the users that is greater than or equal to the likelihood threshold.

2. The system of claim 1, wherein the one or more processors are further configured to provide a recommendation that recommends replacing the specified collaboration site with the updated collaboration site based at least in part on the one or more features having the statistical likelihood of adding value to the users that is greater than or equal to the likelihood threshold.

3. The system of claim 1, wherein the one or more processors are further configured to:
    replace the specified collaboration site with the updated collaboration site; and
    incorporate a description of functionality associated with the one or more features into the updated collaboration site to facilitate use of the one or more features by users of the updated collaboration site.

4. The system of claim 1, wherein the one or more processors are further configured to:
    replace the specified collaboration site with the updated collaboration site; and
    incorporate an interface element into the updated collaboration site, the interface element configured to enable users of the updated collaboration site to replace the updated collaboration site with the specified collaboration site.

5. The system of claim 1, wherein the one or more processors are configured to:
    generate the updated collaboration site to provide a specified feature of the one or more features in lieu of a designated feature of the first features; and
    map attributes of the specified feature to attributes of the designated feature.

6. The system of claim 1, wherein the one or more processors are configured to:
    compare a retention rate of each of the other collaboration sites to a retention threshold to determine an other subset of the other collaboration sites such that the retention rate of each other collaboration site in the other subset exceeds the retention threshold, the retention rate of each of the other collaboration sites indicating a proportion of users of the respective other collaboration site that visits the respective other collaboration site at least once during a first designated time period and at least once during a second designated time period that is consecutive with the first designated time period; and
    correlate the usage data, the information regarding the second features, and information indicating which of the other collaboration sites are included in the subsets to identify the one or more features having the statistical likelihood of adding value to the users of the specified collaboration site that is greater than or equal to the likelihood threshold.

7. The system of claim 1, wherein the information regarding the second features indicates at least one of (a) a proportion of users of each of the other collaboration sites who open a file on the respective other collaboration site, (b) a proportion of the users of each of the other collaboration sites who share a file on the respective other collaboration site, (c) a proportion of the users of each of the other collaboration sites who share the respective other collaboration site, or (d) a number of files edited in each of the other collaboration sites.

8. The system of claim 1, wherein the one or more processors are configured to iteratively correlate the usage data and the information regarding the second features over successive time periods in accordance with a machine learning technique to identify the one or more features having the statistical likelihood of adding value to the users that is greater than or equal to the likelihood threshold.

9. The system of claim 1, wherein the one or more processors are further configured to:
determine a first performance metric associated with the specified collaboration site, the first performance metric measured during a first period of time;
determine a second performance metric associated with the updated collaboration site, the second performance metric measured during a second period of time that follows the first period of time;
compare the first performance metric and the second performance metric to determine whether the second performance metric is greater than the first performance metric by an amount that exceeds a difference threshold; and
provide the updated collaboration site as a template for creation of a new collaboration site based at least in part on a determination that the second performance metric is greater than the first performance metric by an amount that exceeds the difference threshold.

10. A method comprising:
generating a specified collaboration site that provides first features, the specified collaboration site configured to facilitate collaboration among users of the specified collaboration site;
comparing a retention rate of each of a plurality of other collaboration sites to a retention threshold to determine a subset of the other collaboration sites such that the retention rate of each other collaboration site in the subset exceeds the retention threshold, the retention rate of each of the other collaboration sites indicating a proportion of users of the respective other collaboration site that visits the respective other collaboration site at least once during a first designated time period and at least once during a second designated time period that is consecutive with the first designated time period;
correlating usage data, which indicates operations performed by the users of the specified collaboration site with regard to at least some of the first features provided by the specified collaboration site, information regarding second features that are provided by other collaboration sites, and information indicating which of the other collaboration sites are included in the subset to identify one or more features included in the second features that have a statistical likelihood of adding value to the users of the specified collaboration site that is greater than or equal to a likelihood threshold; and
generating an updated collaboration site, which is based at least in part on the specified collaboration site, to provide the one or more features in addition to at least some of the first features based at least in part on the one or more features having the statistical likelihood of adding value to the users that is greater than or equal to the likelihood threshold.

11. The method of claim 10, further comprising:
comparing an extent to which each of the other collaboration sites is used by users of the respective other collaboration site to a use threshold to determine an other subset of the other collaboration sites such that the extent to which each other collaboration site in the other subset is used by the users of the respective other collaboration site exceeds the use threshold;
wherein correlating usage data, the information regarding the second features, and the information indicating which of the other collaboration sites are included in the subset comprises:
correlating the usage data, the information regarding the second features, and information indicating which of the other collaboration sites are included in the subsets to identify the one or more features having the statistical likelihood of adding value to the users of the specified collaboration site that is greater than or equal to the likelihood threshold.

12. The method of claim 10, wherein the information regarding the second features indicates at least one of (a) a proportion of users of each of the other collaboration sites who open a file on the respective other collaboration site, (b) a proportion of the users of each of the other collaboration sites who share a file on the respective other collaboration site, (c) a proportion of the users of each of the other collaboration sites who share the respective other collaboration site, or (d) a number of files edited in each of the other collaboration sites.

13. The method of claim 10, wherein generating the updated collaboration site comprises:
generating the updated collaboration site to provide a specified feature of the one or more features in lieu of a designated feature of the first features; and
mapping attributes of the specified feature to attributes of the designated feature.

14. The method of claim 10, further comprising:
determining a first performance metric associated with the specified collaboration site, the first performance metric measured during a first period of time;
determining a second performance metric associated with the updated collaboration site, the second performance metric measured during a second period of time that follows the first period of time;
comparing the first performance metric and the second performance metric to determine whether the second performance metric is greater than the first performance metric by an amount that exceeds a difference threshold; and
providing the updated collaboration site as a template for creation of a new collaboration site based at least in part on a determination that the second performance metric is greater than the first performance metric by an amount that exceeds the difference threshold.

15. The method of claim 10, wherein the first and second designated time periods are consecutive days, consecutive weeks, or consecutive months.

16. A computer program product comprising a non-transitory computer-readable storage medium having instructions recorded thereon for enabling a processor-based system to perform operations, the operations comprising:
generate a specified collaboration site that provides first features, the specified collaboration site configured to facilitate collaboration among users of the specified collaboration site;
correlate usage data, which indicates operations performed by the users with regard to at least some of the first features provided by the specified collaboration site, and information regarding second features that are provided by other collaboration sites to identify one or more features included in the second features that have a statistical likelihood of adding value to the users that is greater than or equal to a likelihood threshold, wherein the information regarding the second features indicates at least one of (a) a proportion of users of each of the other collaboration sites who open a file on the respective other collaboration site, (b) a proportion of the users of each of the other collaboration sites who share a file on the respective other collaboration site, (c) a proportion of the users of each of the other collaboration sites who share the respective other collaboration site, or (d) a number of files edited in each of the other collaboration sites; and generate an updated collaboration site, which is based at least in part on the specified collaboration site, to provide the one or more features in addition to at least some of the first features based at least in part on the one or more features having the statistical likelihood of adding value to the users that is greater than or equal to the likelihood threshold.

17. The computer program product of claim 16, wherein the operations comprise:

generate the updated collaboration site to provide a specified feature of the one or more features in lieu of a designated feature of the first features; and map attributes of the specified feature to attributes of the designated feature.

18. The computer program product of claim 16, wherein the operations comprise:

compare an extent to which each of the other collaboration sites is used by users of the respective other collaboration site to a use threshold to determine a subset of the other collaboration sites such that the extent to which each other collaboration site in the subset is used by the users of the respective other collaboration site exceeds the use threshold; and correlate the usage data, the information regarding the second features, and information indicating which of the other collaboration sites are included in the subset to identify the one or more features having the statistical likelihood of adding value to the users of the specified collaboration site that is greater than or equal to the likelihood threshold.

19. The computer program product of claim 16, wherein the operations comprise:

compare a retention rate of each of the other collaboration sites to a retention threshold to determine a subset of the other collaboration sites such that the retention rate of each other collaboration site in the subset exceeds the retention threshold, the retention rate of each of the other collaboration sites indicating a proportion of users of the respective other collaboration site that visits the respective other collaboration site at least once during a first designated time period and at least once during a second designated time period that is consecutive with the first designated time period; and correlate the usage data, the information regarding the second features, and information indicating which of the other collaboration sites are included in the subset to identify the one or more features having the statistical likelihood of adding value to the users of the specified collaboration site that is greater than or equal to the likelihood threshold.

20. The computer program product of claim 16, wherein the operations further comprise:

determine a first performance metric associated with the specified collaboration site, the first performance metric measured during a first period of time;

determine a second performance metric associated with the updated collaboration site, the second performance metric measured during a second period of time that follows the first period of time;

compare the first performance metric and the second performance metric to determine whether the second performance metric is greater than the first performance metric by an amount that exceeds a difference threshold; and provide the updated collaboration site as a template for creation of a new collaboration site based at least in part on a determination that the second performance metric is greater than the first performance metric by an amount that exceeds the difference threshold.

* * * * *